(12) United States Patent
Chow

(10) Patent No.: US 11,087,316 B2
(45) Date of Patent: Aug. 10, 2021

(54) ELECTRONIC TAG AND SYSTEM AND METHOD FOR SECURING ELECTRONIC TAG

(71) Applicant: Taiwan Development & Construction Co., New Taipei (TW)

(72) Inventor: Jim Tung-Hai Chow, New Taipei (TW)

(73) Assignee: TAIWAN DEVELOPMENT & CONSTRUCTION CO., New Taipei (TW)

( * ) Notice: Subject to any disclaimer, the term of this patent is extended or adjusted under 35 U.S.C. 154(b) by 0 days.

(21) Appl. No.: 16/681,201

(22) Filed: Nov. 12, 2019

(65) Prior Publication Data

US 2020/0082396 A1 Mar. 12, 2020

Related U.S. Application Data

(63) Continuation-in-part of application No. 14/175,630, filed on Feb. 7, 2014, now Pat. No. 10,515,360.

(30) Foreign Application Priority Data

Feb. 8, 2013 (TW) .................................. 102105419

(51) Int. Cl.
*G06Q 20/00* (2012.01)
*G06Q 20/38* (2012.01)
(Continued)

(52) U.S. Cl.
CPC ....... *G06Q 20/3829* (2013.01); *G06K 19/045* (2013.01); *G06Q 20/322* (2013.01); *G06Q 2220/00* (2013.01)

(58) Field of Classification Search
CPC ............ G06Q 20/3829; G06Q 20/322; G06Q 2220/00; G06K 19/045
(Continued)

(56) References Cited

U.S. PATENT DOCUMENTS 6,130,623 A 10/2000 MacLellan
6,925,439 B1 8/2005 Pitroda
(Continued)

FOREIGN PATENT DOCUMENTS

| CN | 101226600 A | 7/2003 |
| CN | 1820279 A | 8/2006 |
| CN | 102867344 A | 1/2013 |

OTHER PUBLICATIONS

Xiang Shen, Dan Liu, Yuqing and Junyu Wang, "A Low-cost UHF RFID Tag Baseband with an IDEA Cryptography Engine", IEEE, 2010.
(Continued)

*Primary Examiner* — Daniel A Hess
(74) *Attorney, Agent, or Firm* — Volpe Koenig

(57) ABSTRACT

An electronic tag to be authenticated by a system in an authentication phase includes a tag memory. The tag memory stores an encryption key and an information table. The information table has a specific storing attribute quantified with a predetermined value, and is read according to the predetermined value by the system after the authentication phase. The encryption key is derived from the predetermined value, and decrypted by the system in the authentication phase for authentication of the electronic tag. A system and method for securing an electronic tag is also provided.

20 Claims, 20 Drawing Sheets

(51) Int. Cl.
    *G06K 19/04*       (2006.01)
    *G06Q 20/32*       (2012.01)
(58) Field of Classification Search
    USPC .......................................................... 235/492
    See application file for complete search history.

(56)                References Cited

U.S. PATENT DOCUMENTS 10,515,360 B2 *  12/2019  Chow .................... G06F 21/44
 2005/0017844 A1     1/2005  Cole
 2008/0147639 A1     6/2008  Hartman
 2008/0244714 A1    10/2008  Kulakowski
 2010/0012721 A1     1/2010  Jain

OTHER PUBLICATIONS

Office Action issued in corresponding TW Patent Application No. 10420732090 dated Jun. 3, 2015, consisting of 4 pp.
Office Action issued in corresponding Chinese Patent Application No. 2016051001469220 dated May 13, 2016, consisting of 6 pp.

* cited by examiner

| | | | | |
|---|---|---|---|---|
| DC0h | 1[63:48]_3E1 | 1[47:32]_3E1 | | 1[15:0]_3E1 | DFFh
| D80h | 2[47:32]_3E1 | 2[31:16]_3E1 | 1[31:16]_3E1 | 1[79:64]_3E1 | DBFh
| D40h | 3[31:16]_3E1 | 3[15:0]_3E1 | 2[15:0]_3E1 | 2[63:48]_3E1 | D7Fh
| D00h | 4[15:0]_3E1 | 3[79:64]_3E1 | 2[79:64]_3E1 | 3[47:32]_3E1 | D3Fh
| CC0h | 4[79:64]_3E1 | 4[63:48]_3E1 | 3[63:48]_3E1 | 4[31:16]_3E1 | CFFh
| C80h | 5[63:48]_3E1 | 5[47:32]_3E1 | 4[47:32]_3E1 | 5[15:0]_3E1 | CBFh
| C40h | 6[47:32]_3E1 | 6[31:16]_3E1 | 5[31:16]_3E1 | 5[79:64]_3E1 | C7Fh
| C00h | [15:0]_Reserved | [15:0]_Reserved | 6[15:0]_3E1 | 6[63:48]_3E1 | C3Fh

3E0 / 3E1 / RBJ / 3G / 3E

ELECTRONIC TAG AND SYSTEM AND METHOD FOR SECURING ELECTRONIC TAG

CROSS-REFERENCE TO RELATED APPLICATION AND CLAIM OF PRIORITY

This application is a continuation-in-part of U.S. patent application Ser. No. 14/175,630, filed on Feb. 7, 2014, claiming foreign priority to TW-102105419, filed on Feb. 8, 2013, the disclosures of which are incorporated herein in their entirety by reference.

TECHNICAL FIELD

The present invention is related an electronic tag, and, more particularly, to a system and method for securing an electronic tag.

BACKGROUND

A radio frequency identification (RFID) system commonly includes an RFID tag, an RFID reader, and a computer or controller. The RFID tag includes an inlay which includes an integrated circuit (IC) and an antenna. The IC is complied with functions in a communication interface protocol, for example, ISO 18000-6C/EPC C1 GEN2, ISO 18000-3M3, or ISO 18000-3. The antenna is laid in the RFID tag by special packaging technique. The reader communicates with the RFID tag and accesses information from it by specified instructions. The RFID tag includes a tag identifier which includes a unique tag serial number and a manufacturer identifier, and further includes a memory space for storing information. Setting program processing parameters of the computer are required for the communication mode between the RFID tag and the reader, wherein the parameters include a communication channel, a session number, a pulse width, a link frequency, a modulation mode, a bit rate, and an antenna transmitting power. When the RFID tag comes within a read range of the reader, the reader can then access information in the RFID tag. In addition, a communication system commonly includes an electronic tag, a reader used to read the electronic tag, and a computer or controller coupled to the reader. For instance, the electronic tag is one of an RFID tag and an integrated circuit tag.

Although there have been more than 1.4 millions of automatic teller machines (ATM) built around the globe to provide 24 hours banking services, yet there are still hundreds and thousands of customers and/or users everyday come to banks everywhere for some financial business. Not only they need to fill out deposit or withdraw or transfer slip, but also are asked in front of bank teller about savings account number, user name, and amount of deposit or withdraw or transfer, also asked to provide signature, seal, credentials for proving one's status, and enter a password to be compared by bank's computer system, after passing the proving one's status and comparing password successfully, can then make a withdraw. These authenticating ways are quite inconvenient for elderly people who cannot hear or see well, therefore, some new RFID tag is expected which will store information necessary for a user to make a financial transaction, and provided with some authentication method for anti-counterfeiting and belonging to the same system, then the drawback of filling transaction slip manually by hand can be eliminated by using such RFID tag.

Currently RFID in HF applications, finance card or credit card has been combined with using cash card to pay expense amount, and widely used in our daily life, for example, paying fees for taking bus, train, mass transit transportation system, making a tour, or shopping, but still sees vehicles stopped in parking lot or toll station on highway to pay the fees, therefore, some new card and system is expected which combines RFID UHF long distance technique and pay cash function, to be placed on vehicle so that fees can be paid while vehicle is moving to eliminate the otherwise required manpower, and suitable to current RFID HF applications as well.

Since in addition to financial business application, RFID tag finds applications in other business fields such as asset management, access control, pay cash, product manufacturing management, hospital drug and care management, and item level tracking, if some method of verifying RFID tag for anti-counterfeiting can be applied to financial business, then the same can be applied to other business fields, therefore the method is also expected to have business category encoded in the RFID tag, then the same can be applied to many business fields at the same time, for example, some device combining business fields such as finance, pay cash, and access control, can be used for making transactions on a new ATM, purchasing in a convenient store, and starting electric facilities in an access control area.

In U.S. Pat. No. 6,130,623, which issued on Oct. 10, 2000 to MacLellan et al, an application filed Dec. 31, 1996, there is disclosed 'Encryption For Modulated Backscatter Systems,' in which tag, interrogator, and techniques of information exchange in between is mentioned, communication session between a tag and interrogator through a RFID system, intercepting of transferring sensitive information like PIN number by eavesdropper, intercepting of data stored in the tag's memory by fraudulent interrogator, obtaining network service and further stealing data stored in the network by fraudulent tag, all result in major security issues. A method of encrypting the user's PIN is thus mentioned for resolving the leak of sensitive information. However, it is still expected to have more effective method for protecting the sensitive information and ensuring the system safety.

In an IEEE paper, which issued on Oct. 10, 2000 titled 'A Low-cost UHF RFID Tag Baseband with an IDEA Cryptography Engine,' in which a mutual authentication scheme based on International Encryption Algorithm (IDEA) is applied to the transferring tag data, but the IDEA engine used between reader and tag needs to add integrated circuit, such implementation not only requires complicated operations, but also increases the system cost.

SUMMARY OF EXEMPLARY EMBODIMENTS

It is therefore an embodiment of the present disclosure to provide a method for securing an electronic tag storing an application code information and a communication target indicator to be used to link to a specific external device. The method includes the following steps. A specific application function for using the application code information is provided. The electronic tag is applied to the specific application function. A transaction message for the specific application function is generated according to the application code information. And, the transaction message is sent to the specific external device according to the communication target indicator.

It is therefore another embodiment of the present disclosure to provide an electronic tag to be authenticated in an authentication phase. The electronic tag includes a tag memory. The tag memory stores an encryption key and an information table. The information table has a specific storing attribute quantified with a predetermined value, and is read after the authentication phase by using the predetermined value. The encryption key is derived from the predetermined value, and decrypted in the authentication phase to authenticate the electronic tag.

It is therefore still another embodiment of the present disclosure to provide a system for securing an electronic tag having a specific identifier. The system includes an operation device and a reader coupled to the operation device. The operation device provides a password mask and a first information table, wherein the first information table includes a plurality of information elements arranged according to an order. The operation device adjusts the order according to the specific identifier and the password mask to generate a second information table.

In view of the drawbacks of the prior art and expectation, the present invention uses RFID technique and combination of decrypting an encrypted key, encoding, sending brief message, and adjusting parameter ordering, according to a method of building a new RFID RFID tag and its device and authenticating an RFID tag by a RFID tag item processing system (TIPS) in plural authentication steps, the system functions of the present invention is applied to many business fields by means of encoding, and sending a brief message is used as an authentication method of system safety. When a local computer proceeds dialogue with RFID tag through a reader according to an instruction of a communication interface protocol, a frame is commonly used for sending instruction and information, and time stamp, instruction code and parameters, protocol control (PC) information, unique item identifier (UII) and CRC are included in the frame. Providing that UII includes item authentication information for multipurpose and multi-function, such as savings account number, savings account password, credit account number, counter service password, credit account password, compare failed count, cash card information, and encrypted keys, these information will have 10 to 44 different number of words, the ordering of some information can even be made different for different RFID tag, then it becomes almost impossible for someone to steal a password information by eavesdropping, therefore the communication link between RFID reader and RFID tag becomes safer, the areas of improving protection and against eavesdropping are fallen in authenticating an RFID tag for its anti-counterfeiting instead.

Also in view of current bank operation procedure, which requires account holder (or user) to fill out a transaction slip for making a deposit, withdraw or transfer, needs to be simplified. The present invention comes to a method of building an item information table used by a RFID TIPS, the method is to build an item information table in an RFID tag with memory for a user, the item information table includes user's savings account number, counter service password, and encrypted key. When comes to a bank, user only needs to place the RFID tag on bank teller's RFID reader, no need to fill out a transaction slip for making a deposit, withdraw or transfer, the bank teller will then execute a RFID TIPS' program on the local computer for the RFID reader to read the item information table from the RFID tag, and ask user to present some credentials for proving the user status prior to the use of savings account number in the item information table, when making a withdraw, the bank teller will ask user to enter a counter service password through a numerical key pad for comparison. After passing the comparing passwords successfully, RFID TIPS can then proceed with a following operating procedure, which includes transfer cash to the RFID tag. When the item information table includes savings account password or credit account password, the RFID tag can be used on a new ATM. When the item information table further includes cash card information including such as cash card balance, cash card store category, cash card merchant serial number, cash card use status, and cash card getting on station number, the RFID tag can then be used for deducting from or adding to the cash card balance an amount at stores. Some device can be made by combining the RFID tag and a UHF antenna, and having an item information table just described above built in the RFID tag, for example, combining savings account number with cash card function, or combining credit account number with cash card function, then having the RFID tag hung in a vehicle or placed in a slot which is attached to the vehicle, and made the RFID tag facing the moving direction of the vehicle and fixed in the slot with ability of being adjusted minutely to turn right and left, or tilt up, then the vehicle can pay fees by deducting an amount while moving on highway or in parking lot. When the item information table combining function to select monetary base for storing the cash card balance, user can then use the RFID tag for storing foreign currency purchased from bank. Providing that the same function to select monetary base can be used at stores in another country, when user makes a purchase, the monetary base of purchase amount set at the store is different from that stored in the RFID tag of user, then RFID TIPS needs only to connect to database device of a financial center through internet, obtain the monetary exchange rate, convert the user's purchase amount to have the same monetary base as the cash card balance, and proceeds to authenticate the RFID tag and deduct or add an amount, thus the RFID tag can be used globally as having cash in hand.

Since the item information table includes item information of multipurpose and multi-function, it is necessary to improve authenticating the RFID tag for anti-counterfeit, therefore, the present invention comes to a method of plural authentication for RFID TIPS, which includes a method of authenticating the RFID tag for anti-counterfeiting and belonging to the same system, and a method of authenticating user password. The former method includes building an item information table with encoded parameters in the RFID tag, the item information table includes item code, item serial number, user serial number, and encrypted key, wherein the encrypted key and the user serial number are used to authenticate the RFID tag for anti-counterfeiting and belonging to the same system. When RFID TIPS selecting RFID tag according to item code in the RFID tag, the RFID TIPS not only is made more efficient, but also can prevent other item information from being exposed prior to the authentication, decrypting the encrypted key can just authenticate the RFID tag for anti-counterfeiting and belonging to the same system. In addition, the plural authentication method further comes to divide the item information table stored in the tag memory space of RFID tag into first memory block information table, second memory block information table and third memory block information table, the first memory block information table only includes the item information needed in first authentication step, for example, item code, item serial number, user serial number, and encrypted key, wherein the encrypted key is created by item serial number, user serial number, and word length of second memory block information table, the user serial number is a serial number starting from 1, or a system code number, and other item information used in second authentication step such as savings account number, savings account password, counter service password, and cash card information, are stored in the second memory block information table. Mechanisms for keeping item information table from exposure and against eavesdropping includes decrypting the encrypted key to obtain word length of second memory block information table, and verifying the same word length for belonging to the same system, and then reading the second memory block information table, in addition, other item information used after passed the second authentication step includes, for example, user's transfer account numbers needed by the processing system, are stored in the third memory block information table. And the plural authentication method is to add another encrypted connecting key to the second memory block information table which includes word length of the third memory block information table, decrypting the encrypted connecting key for obtaining the word length and reading the third memory block information table, in different business fields and systems, the encrypted connecting key is not included in the second memory block information table, but a receiving brief message phone number is included instead, when finishing using item information table of the RFID tag, the processing system will compose a brief message by combining time, location, and transaction summary, and transmit it to the receiving brief message phone number, thus another way of confirming use of the RFID tag is provided for the user. Since no password information is sending alone in every authentication step, the plural authentication method used in the present invention provides a safe and most cost effective way of communication against counterfeiting and eavesdropping.

When bank teller executes RFID TIPS' program to select item code of an RFID tag through a reader for obtaining item information table from RFID tag, the RFID tag will only send back its first memory block information table, which includes first memory block authentication information and first memory block other information, the first memory block authentication information includes item code, user serial number, and encrypted key, the first memory block other information includes item serial number, PC information with an initial value, and 16 bit CRC. The method of authenticating the RFID tag for anti-counterfeiting includes TIPS decrypting the encrypted key, reading tag identifier of the RFID tag through reader according to the same method, and then authenticating the RFID tag for anti-counterfeiting and belonging to the same system, and obtaining word length of the second memory block information table, thus completing the first step of authentication. The method of authenticating user's counter service password includes TIPS asking user to enter an authentication password by numerical key pad, after decrypting the encrypted key successfully, the TIPS will read second memory block information table of the RFID tag through reader, which includes second memory block authentication information and second memory block other information, the second memory block authentication information includes savings account number, counter service password, and encrypted connecting key, the second memory block other information includes savings account password, compare failed count, and cash card information, then compare the authentication password entered by user earlier to the counter service password read from the RFID tag, after passing the comparing passwords successfully, the TIPS will connect to bank database device through internet, using the savings account number as index, for obtaining user's information and displaying on the display unit, which includes information such as user's personal identifier, account name, birthday, address, telephone number, email address, and professions, and then bank teller will compare user's credentials presented earlier to the information shown on the display unit. After passing the comparing passwords successfully, thus the second step of authentication is completed, then bank teller will proceed with the following operating procedure by using the savings account number, therefore user does not need to fill out deposit, withdraw or transfer slip. When user using a new ATM for making transaction, the plural authentication method further includes selecting an authentication type and entering a password by user, the TIPS will select a password from the second memory block authentication information as authentication information, and compare the entered authentication password to the selected authentication information, after passing the comparing passwords successfully, then decrypt the encrypted connecting key, and obtain word length of the third memory block information table, when user selecting transfer service, the TIPS will read third memory block information table stored in the RFID tag through reader which includes transfer account numbers which are preset by user in advance, and shown on the display unit for user to select and proceed with the transaction.

When user makes transaction on a new ATM, transaction types provided by RFID TIPS for user to select includes savings account transaction, credit account transaction, add cash transaction. For selecting savings account transaction, user enters savings account password, for selecting credit account transaction, user enters credit account password, for selecting add cash transaction, user enters cash card password. When user uses cash card for making purchase or adding cash, although comparing authentication information is not required currently for using cash card to pay expense, however for preventing once cash card or credit card with high cash advance amount is lost or account is hacked and illegally used, according to the plural authentication method used in the present invention, it only needs to use the counter service password in the second memory block information table of the RFID tag as cash card password, or include a cash card password to the second memory block information table, and have the TIPS ask user to enter a cash card password, after passing the authenticating cash card password successfully, then proceed with pay cash transaction, thus illegal or unauthorized use of the lost card is prevented.

In addition to financial business, method of authenticating the RFID tag for anti-counterfeiting can be applied to many other business fields such as asset management, access control, pay cash, cross-country product manufacturing resume management, cross-country product tracking management. Therefore, the present invention comes to define an encoded parameter like item code which includes categories such as business field, device, selecting enable function, function, deployment country, and have it stored in item information table of RFID tag, so that the method of authenticating the RFID tag for anti-counterfeiting is used in financial business, the same can be applied to other business fields, or even applied to cross-country business fields other than financial business. For example, in a RFID asset management system, following authenticating the RFID tag for anti-counterfeiting, comparing authentication information can be set up, and after passing the comparing successfully, the authorization limits is obtained for entering the same system to inquire and modify asset records. In such asset management system, item code can be used in selecting RFID tag through reader, and the system can be made more effectively, therefore it is expected that RFID tag to have item code which includes categories like business field, device, selecting enable function, function, deployment country, to improve the overall TIPS' processing efficiency, and extend in applying method of authenticating the RFID tag for anti-counterfeiting. For another example in a RFID access control management system, building item information table in electric tag which includes a RFID access control table, each and every bit of the RFID access control table corresponding to an authorized to pass and use signal of an access control area, the access control area includes sentry box or parking lot with electronic gate, office area or building or health center with electronic lock, and residence or community or building with electronic roll-up doors, when using the electronic gate for passing an access control area, a safe and better method is to authenticate the RFID tag for anti-counterfeiting first, and then verify the setting of a bit in the RFID access control table corresponding to the access control area, providing the corresponding bit value is a 1, then passing through and entering the access control area is allowed, and proceeds to start electronic facilities of the access control area, which includes starting electronic gates, roll-up door, warning lights, warning alarms, electronic door lock, luminaires, display units for access control messages, and other electronic equipment, providing the corresponding bit value is a 0, then passing through and entering the access control area is not allowed, and proceeds to start electronic warning devices for not passing through the access control area including starting warning lights, warning alarms, or sending a warning message, however when building a safe access control management system, no matter what the authentication result of the RFID tag is, system with another improving safety measure is provided by recording each event when authenticating the RFID tag, and sending a brief access control message or email to the receiving brief message phone number in the item information table.

Based upon the concept described above, it is therefore an aspect of the present invention to provide a method of building an item information table in an RFID tag memory for a RFID TIPS, the RFID tag includes tag identifier (TID), reserved memory (RM) space, unique item identifier (UII) space, and user memory (UM) space, the TID includes tag serial number (TagSN) and manufacturing identifier (MID), the method of building the item information table includes building item kill password and item access password, and also includes dividing UII space into first memory block information table and second memory block information table, the UM space includes third memory block information table, and building in the first memory block information table to include first authentication information, first encrypted key, and first other information, wherein the first authentication information includes item code, user serial number, the user serial number indicating a system constant value or a system code number, the first other information includes item serial number and first PC information, the first PC information having a starting value, and building in the second memory block information table to include second authentication information and second other information, wherein the second authentication information includes savings account password, credit account password, counter service password and cash card balance, the second other information includes savings account number, compare failed count, cash card balance monetary base, cash card store category, cash card merchant serial number, cash card use status and cash card getting on station number, and building in the third memory block information table to include third information table, wherein the third information table includes a transfer account number table, or a RFID access control table, or a receiving brief message phone number table, or a combination of the above.

By integrating the concepts described above, it is therefore another aspect of the present invention to provide a method of plural authenticating an RFID tag for a RFID TIPS, the RFID tag includes a tag identifier and a tag memory, the tag memory is divided into memory sectors and blocks, including RM block, UII block, first memory block, second memory block and third memory block, and the RM block stores item kill password and item access password, the first memory block stores first information table, the second memory block stores second information table, the third memory block stores third information table. The method includes the following steps. Selecting and inventorying the RFID tag based on the item code of RFID tag. Reading the first information table which includes first authentication information, first encrypted key and first other information, wherein the first authenticating information includes item code and user serial number, the first other information includes item serial number, first PC information, the first PC information indicates the length of the first information table, the first encrypted key includes encrypted second sub-information, the second sub-information indicates length of the second information table. Asking user to provide personal credentials. Asking user to enter an authentication password. Reading the tag identifier. Decrypting the first encrypted key to obtain the second sub-information. Verifying the second sub-information to authenticate the RFID tag for anti-counterfeiting and belonging to the same system. Reading the second information table which includes second authentication information, second encrypted key and second other information, wherein the second authentication information includes savings account password, counter service password, credit account password, and compare failed count, the second other information includes savings account number and cash card information, the cash card information includes cash card balance monetary base, cash card balance, cash card use status, and cash card getting on station number. Comparing user's credentials, TIPS using the savings account number to access bank database device and obtaining from it user's information which includes user's personal identifier, account name, birthday, address, telephone number, and email address. Comparing the authentication password and the authentication information. After passing both the comparing user's credentials and passwords successfully, then proceeding to the following deposit or withdraw procedure by using the savings account number. Decrypting the encrypted connecting key to obtain word length of the third information table. Reading third information table based on the same word length, the third information table includes a transfer account number table, or a RFID access control table, or a receiving brief message phone number table, or a combination of the above. TIPS proceeding to withdraw or transfer transaction by using the savings account number and the transfer account number table, or proceeding to add withdraw amount to cash card balance of the RFID tag according to the cash card balance monetary base and recording the transaction, or proceeding to compose a brief message by combining time, location, and transaction summary, and transmit it to the receiving brief message phone number.

BRIEF DESCRIPTION OF THE DRAWINGS

The foregoing and other features and advantages of the present invention will be more clearly understood through the following descriptions with reference to the drawings, wherein:

FIG. 4A is a layout diagram showing parameters of an information table built in a UM block of the tag memory of the RFID tag of the finance credit cash authentication card according to various embodiments of the present disclosure;

FIG. 4B is a layout diagram showing parameters of the information table built in the UM block of the tag memory of the RFID tag of the finance credit cash authentication card according to various embodiments of the present disclosure;

DETAIL DESCRIPTION OF THE PREFERRED EMBODIMENTS

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
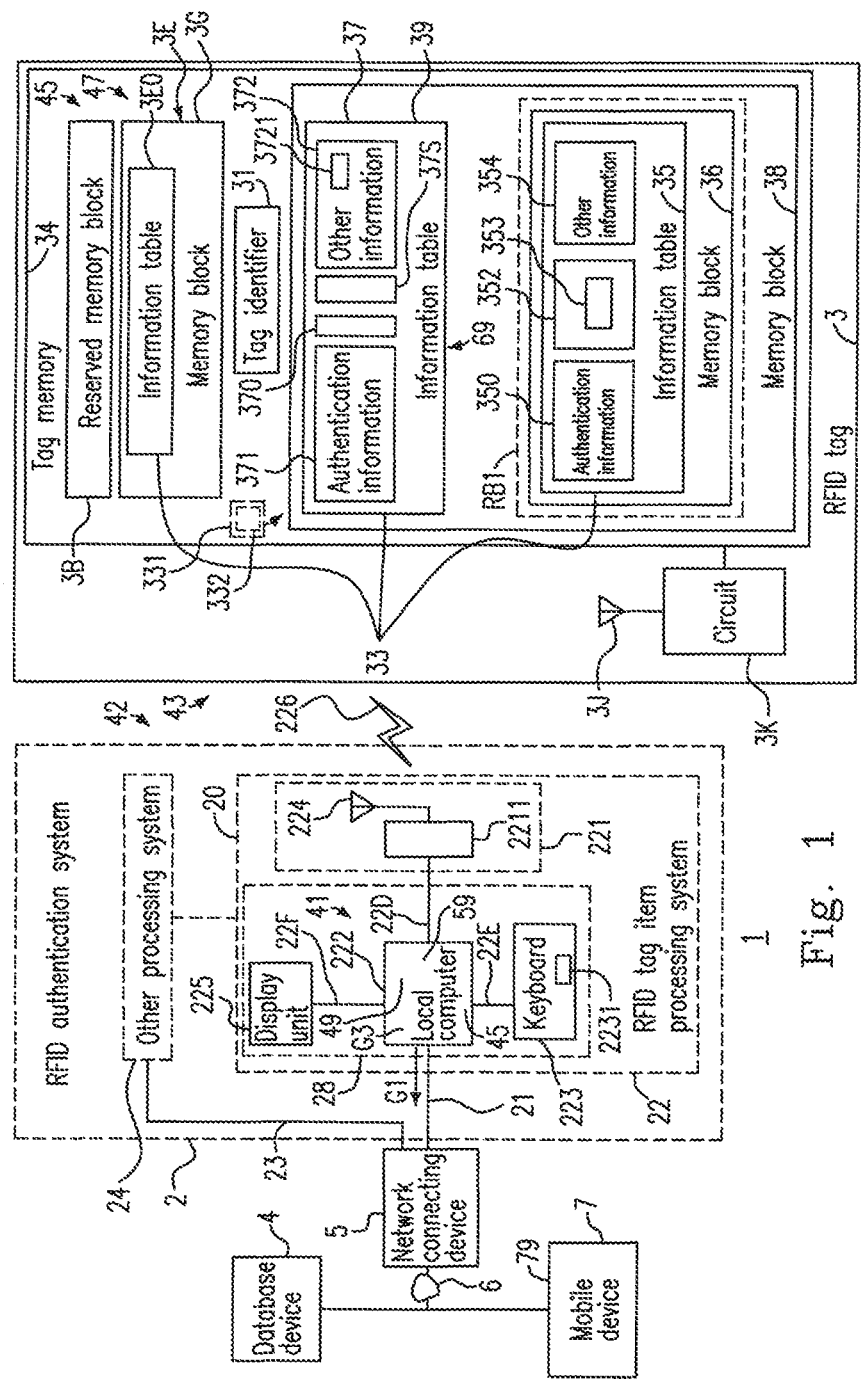
FIG. 1 is a functional diagram showing an RFID information system according to various embodiments of the present disclosure.

Please refer to FIG. 1, which is a functional diagram showing an RFID information system (IS) 1 according to various embodiments of the present disclosure. As shown, the RFID information system 1 includes a RFID authentication system (AS) 2, an RFID tag 3, a network connecting device 5, an internet 6, and a mobile device 7. For instance, the mobile device 7 is a wireless mobile device or a wireless mobile network device. The RFID AS 2 includes RFID tag item processing system (TIPS) 22, network connection 21, other processing system 24, and network connection 23. The mobile device 7 includes mobile radio device and system subscribed to a mobile radio network, for example, an authenticated mobile phone or a display unit using GSM, GPRS and internet service. The RFID tag 3 is a device with an item information table built in its tag memory. In an embodiment, the RFID tag 3 can establish communication with a reader and send information to each other according to ISO 18000-6C communication interface protocol. The RFID tag 3 includes a tag identifier 31 and a tag memory 34, the tag memory 34 is divided into memory sectors and blocks, which includes first memory block 36, second memory block 38, third memory block 3G, and RM block 3B, the second memory block 38 can include the first memory block 36, and the third memory block 3G can be UM block 3E. The RFID tag 3 further includes an interface and communication controlling circuit 3K, an antenna 3J, the antenna 3J is connected to the interface and communication controlling circuit 3K which connects to the tag memory 34. In a better embodiment, the RFID tag 3 can be made into an adhesive label device by combining tag memory 34, the interface and communication controlling circuit 3K, and the antenna 3J, or packaged with insulating material into a card or other shape of device. The antenna 3J can be UHF antenna for transmitting and receiving UHF signals, and the interface and communication controlling circuit 3K converts the UHF signals into interrogator commands, for example, Select tag, Query tag, Access tag, Query report, Request new RN16 or handle, Read tag memory, Write tag memory according to frame format defined in the UHF RFID communication interface protocol. In a better embodiment, the antenna 3J can be HF inductive coils for transmitting and receiving HF signals, the interface and communication controlling circuit 3K converts the HF signals into interrogator commands, for example, Select tag, Begin Round tag, Access tag, Next Slot, Request new RN16 or handle, Read tag memory, Write tag memory according to frame format defined in the ISO 18000-3M3 HF RFID communication interface protocol. In another better embodiment, the antenna 3J can have both UHF antenna and HF inductive coils for transmitting and receiving UHF signals, or HF signals, the interface and communication controlling circuit 3K can select to convert the UHF signals into interrogator commands according to frame format defined in the UHF communication interface protocol, or convert the HF signals into interrogator commands according to frame format defined in the HF RFID communication interface protocol. The tag memory 34 stores item information table 33 which includes first information table 35, second information table 37, and third information table 3E0. The first memory block 36 stores first information table 35 which includes first authentication information 350, first encrypted key 352, and first other information 354. The second memory block 38 stores first information table 35, also stores second information table 37 which includes second authentication information 371, second encrypted key 370, and second other information 372. The third memory block 3G stores third information table 3E0. In another better embodiment, the antenna 3J can be HF inductive coils for transmitting and receiving HF signals, the interface and communication controlling circuit 3K can establish communication with a reader and send information to each other according to ISO 18000-3 communication interface protocol, the RFID tag 3 includes a tag identifier 31 and a tag memory 34, the tag memory 34 is divided into memory sectors and blocks, an item information table 33 can be built in the tag memory 34, which includes first information table 35, second information table 37, and third information table 3E0, the first information table 35 includes first authentication information 350, first encrypted key 352, and first other information 354, the interface and communication controlling circuit 3K converts the HF signals into interrogator commands, for example, Identify tag, Specific or Group Read tag memory address, Specific or Group Write tag memory address, Lock tag memory address according to frame format defined in the HF RFID communication interface protocol.

The RFID TIPS 22 includes an operating device 28, and a reader 221 coupled to the operating device 28. The operating device 28 includes a local computer 222, a keyboard 223 and a display unit 225, wherein the keyboard 223 includes a numerical key pad 2231. The reader 221 includes a reader antenna 224 and an interface and communication controlling circuit 2211 coupled to the reader antenna 224 and the operating device 28.

The local computer 222 connects to the reader 221 through reader connect cable 22D, connects to the keyboard 223 through keyboard cable 22E, connects to the display unit 225 through display unit cable 22F. In an embodiment, the local computer 222 is a computer, in a better embodiment, the local computer 222 can be a personal computer, a micro-controller, a micro-computer, or a workstation. In a better embodiment, the local computer 222 includes multiple USB ports, the reader connect cable 22D, the keyboard cable 22E and the display unit cable 22F all have USB heads connecting to the local computer 222. The TIPS obtains user entered password through local computer 222, keyboard cable 22E and keyboard 223. The TIPS sends visible output message through local computer 222 and display unit cable 22F to display unit 225 which includes a LCD unit, a LED display unit, or a printer unit and have the message printed. In a better embodiment, the TIPS sends hearable output message to a microphone in local computer 222, or an external speaker, or start an alarm. The reader 221 includes a reader antenna 224. The reader 221 can be a reader for transmitting and receiving UHF RFID message, the reader 221 includes an interface and communication controlling circuit 2211 which converts interrogator commands from the reader 221 for transmitting and receiving UHF signals through antenna 224 according to frame format defined in the UHF RFID communication interface protocol. In a better embodiment, the reader 221 can be a reader for transmitting and receiving HF RFID or other frequency message, for example at 433 MHz, the reader 221 includes an interface and communication controlling circuit which converts interrogator commands from the reader 221 for transmitting and receiving HF or other frequency signals through antenna 224 according to frame format defined in the HF or other frequency RFID communication interface protocol. In a better embodiment, the reader 221 can have both readers described above, the reader 221 includes an interface and communication controlling circuit which selects to convert interrogator commands from the reader 221 for transmitting and receiving UHF or HF signals through antenna 224 according to frame format defined in the UHF or HF RFID communication interface protocol. Between the antenna 224 and antenna 3J, it forms a RFID message channel 226. In an embodiment, the antenna 224 and antenna 3J can be RFID UHF antenna, the message channel 226 can be a several meter long (5 to 10 meter is long read distance) driveway, or a few decade meter long (above 100 meter is far read distance) air channel. In a better embodiment, the antenna 224 and antenna 3J can be RFID HF inductive coils, the message channel 226 can be a below 1 to 2 or several centimeter (below 5 to 10 centimeter is short read distance) insulating media including air and plastic material. In another better embodiment, the antenna 224 and antenna 3J can form a RFID UHF antenna and RFID HF inductive coils for transmitting and receiving UHF or HF signals. The TIPS 22 and RFID tag 3 can proceed with sending information to each other and authentication procedure through local computer 222, reader connecting cable 22D, reader 221, and RFID message channel 226. In a better embodiment, the reader 221 and antenna 224 can be configured in the same device which has a plain surface platform formed by plastic case for holding the RFID tag 3. Still in a better embodiment, network connection 21 connects the local computer 222 of the TIPS 22 and network connecting device 5, the TIPS 22 connects with internet 6 and mobile device 7 through the network connection 21 and the network connecting device 5, and the local computer 222, the reader 221, antenna 224, display unit 225, and the keyboard 223 are configured in the same device, for example, the device is an authenticating automatic teller machine (aATM), the aATM can use a card slot for inserting RFID tag 3, the aATM can also use a closed platform for holding RFID tag 3. In another better embodiment, the TIPS reads the tag serial number of RFID tag 3 and sends it to a label printer visibly, and has it printed on an adhesive label, and then attached to a product, for example a costume, or a packaging box, a packaging bag, or a pallet, for shipping management and stock inventory of a RFID product manufacturing authentication system, or security check against burglar of a RFID surveillance authentication system. In another better embodiment, the network connection 21 can be a radio network channel, the TIPS 22 connects internet 6 and mobile device 7 through the network connection 21 and the network connecting device 5 wirelessly, a wireless device is formed by configuring the local computer 222, the reader 221, antenna 224, display unit 225, and the keyboard 223 in the same device, the wireless device is a RFID authentication reader used by a guard on patrolling duty for reading RFID tag 3 fixed at the station, route mark, or patrolling point along a patrolling route, and composing a brief message by combining information related to the station, route mark, or patrolling point, patrolling route and time, and sending it to a RFID patrolling authentication system, for building a RFID real time locating authentication system (RTLAS) in a RFID patrolling information system. In another better embodiment, the wireless device includes a handle or stand formed by a plastic case, the wireless device is a handheld RFID authentication reader for store clerk reading RFID tag 3 attached to a merchant adhesively, and inquiring the merchant information. In another better embodiment, the TIPS 22 further connects with other device with USB port and connecting cable with USB head to receive purchasing information, the other device includes electronic scale, barcode scanner, network scanner, network camera, fluid meter, water flow meter, or GPS coordinate locating device, the purchasing information includes time, distance, weight, liquid flow volume, barcode, or GPS coordinates, and then converting the purchasing information to expense amount, then using finance cash authentication card of the present invention for paying the expense amount.

In an embodiment, the RFID AS 2 further includes 1 or multiple other processing system 24, network connection 23 connects the other processing system 24 and network connecting device 5, the other processing system 24 connects with internet 6 and mobile device 7 through the network connection 23 and the network connecting device 5. In a better embodiment, the network connection 23 can also be a wirelessly radio network channel, the other processing system 24 connects internet 6 and mobile device 7 through the network connection 23 and the network connecting device 5 wirelessly. The other processing system 24 can be the same processing system as the TIPS 22, which includes local computer 222, reader 221, antenna 224, display unit 225, and keyboard 223, can be used as a network used financial authenticating device (nuFAD), the reader 221 has a platform for holding RFID tag 3. In a better embodiment, the other processing system 24 can be a processing system including other device, the other device includes reader, electronic scale, barcode scanner, fluid meter, water flow meter, or GPS coordinate locating device. In another better embodiment, the other processing system 24 can only include local computer 222, display unit 225, and keyboard 223, used as the RFID authenticating system manager (ASM), or as the authenticating system kiosk ASK), or local database LDB), also used as an authenticating server, for example, printer server, mail server. The TIPS, LDB, and ASM in RFID AS 2 are differentiated by their names, code numbers, serial numbers, or IP addresses. After the operating system of local computer 222 is started, TIPS 22 will access the network resources, it can use user login and enter user password interface to manage user's access network for system safety consideration. The RFID IS 1 further includes a database device 4. Network connecting device 5 and network connection 21 connect a TIPS 22 and the database device 4, the network connecting device 5 and network connection 23 connect other processing system 24 and the database device 4. In an embodiment, the network connecting device 5 includes hub, repeater to connect 1 or multiple TIPS 22 or other processing system 24 by cable wire, thus the network connecting device 5, and 1 or multiple TIPS 22 or other processing system 24 form a local area network (LAN), the LAN connects a common database device 4 through internet 6, then the TIPS 22 can connect to the database device 4, make connection, and access information of the database device 4, the database device 4 includes multiple functions based on RFID business fields and applications which includes inquiring name or code number of RFID TIPS, name or code number of item code in RFID tag, name or code number of store and merchant, name or code number of travel route and station, name or code number of company or organization based on business unified serial number, name or code number and area, location, building and building floors and building rooms of community, account balance and account information based on savings account number. In another embodiment, the network connecting device 5 further includes a WiFi wireless access point (AP), connects 1 or multiple TIPS 22 or other processing system 24 wirelessly, thus the network connecting device 5, and 1 or multiple TIPS 22 or other processing system 24 form a wireless local area network (WLAN), the wireless WLAN further connects internet 6, mobile device 7, and common database device 4, then the TIPS 22 can connect to the database device 4 and the mobile device 7, make connection and access information of the database device 4, and send brief message, image, or both brief message and image via internet 6 to a display unit with IP address or a mobile device with a receiving brief message phone number. Still in another embodiment, the network connecting device 5 can connect 1 or multiple TIPS 22 or other processing system 24 both by cable wire and radio wirelessly, thus the network connecting device 5, and 1 or multiple TIPS 22 or other processing system 24 form a combined local area network (CLAN), the CLAN further connects to mobile device 7 and common database device 4 through internet 6, and then the TIPS 22 can connect with the internet 6, the database device 4 and the mobile device 7, make connection and access information of the database device 4, and/or send brief message, image, or both brief message and image to a display unit with IP address or a mobile device with a receiving brief message phone number. In a better embodiment, when user uses financial cash authentication card on aATM or nuFAD, the TIPS 22 will ask user to enter an authenticating password through the numerical key pad 2231, the first step authentication procedure of the present invention will authenticate the financial cash authentication card for anti-counterfeiting, after passing then read information of RFID tag 3 stored in the authentication card, which includes an authentication information, a savings account number, the second step authentication procedure will ensure the RFID tag 3 belonging to the same system (or the RFID tag 3 is compatible with the RFID TIPS 22), compare the authenticating password entered to the authentication information for authenticating the user's credentials, after passing then make connection to database device 4, use the savings account number to obtain account balance, follow a withdraw procedure and select the enabled monetary exchange function in the financial cash authentication card, then store the withdraw amount into the financial cash authentication card, and send the transaction summary to a mobile device with a receiving brief message phone number.

Figure 2:
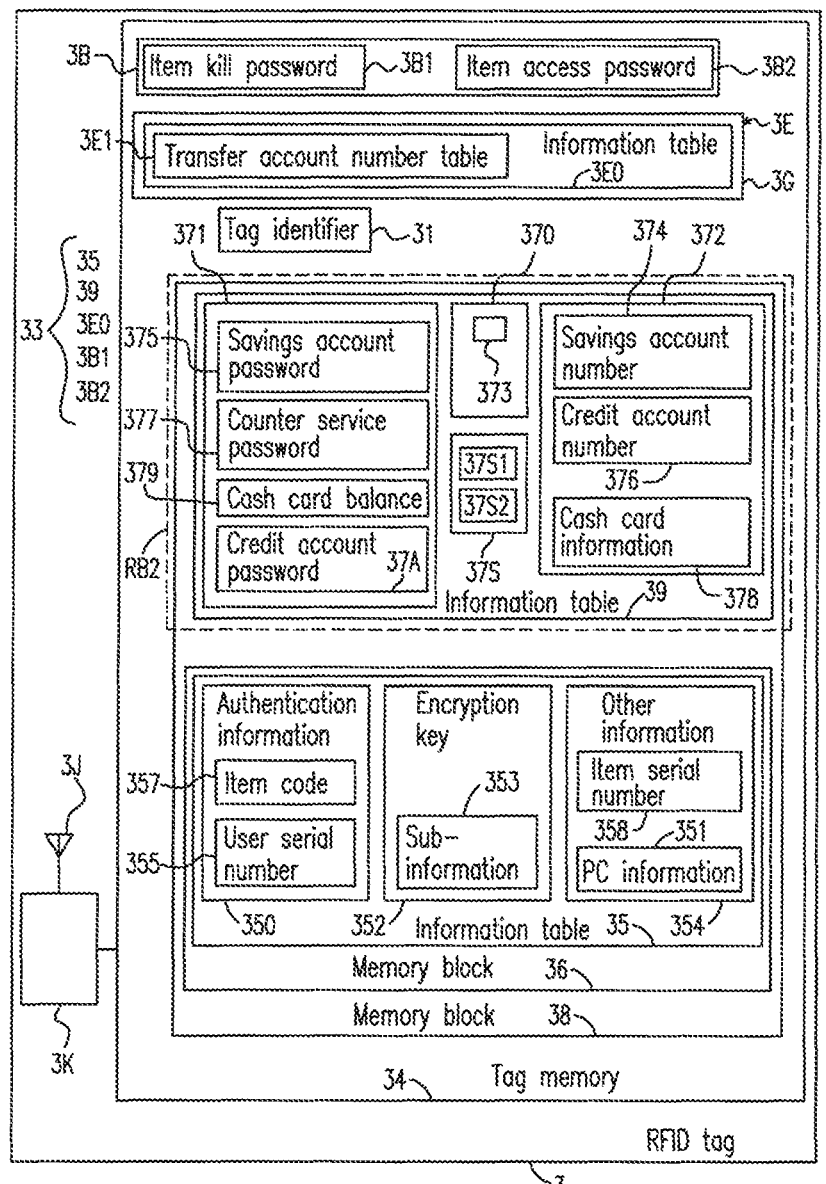
FIG. 2 is a functional diagram showing an RFID tag of the RFID information system in FIG. 1.

Please refer to FIG. 2, which is a functional diagram showing the RFID tag 3 of the RFID information system 1 in FIG. 1. As shown, the RFID tag 3 further shows the item information table 33 which includes first authentication information 350, first encrypted key 352, first other information 354, second authenticating information 371, second encrypted key 370, second other information 372, third information table 3E0, and information stored in RM block 3B. First authentication information 350 includes item code 357 and user serial number 355. In an embodiment, the user serial number 355 is a system constant value, in a better embodiment, the user serial number 355 is a system code number. The first other information 354 includes item serial number 358 and first PC information 351, wherein the first PC information 351 indicating the first information table 35 which is the read memory block RB1 as shown in FIG. 1, in an embodiment, the first PC information 351 is the protocol control (PC) word as in ISO 18000-6C or function equivalent communication interface protocol, the PC word is used to include word length of the first information table 35, the first encrypted key 352 includes an encrypted sub-information which indicates word length of the second information table 37. TIPS 22 obtains the second sub-information by decrypting the first encrypted key 352 for reading the second information table 39 which is the read memory block RB2 as shown in FIG. 2. The second authenticating information 371 includes savings account password 375, counter service password 377, credit account password 37A and cash card balance 379. The second other information 372 includes savings account number 374, credit account number 376 and cash card information 378. In an embodiment, the third information table 3E0 includes a transfer account number table 3E1, in a better embodiment, the third information table 3E0 includes a RFID access control table 3E2, a receiving brief message phone number table 3E3, or a combination of the above. The RM block 3B stores item kill password 3B1 and item access password 3B2. The item information table 33 further includes item kill password 3B1 and item access password 3B2. The second encrypted key 370 is a connecting key which includes a third sub-information 373 for indicating word length of the third information table, in an embodiment, the TIPS 22 reads the third information table 3E0 in the UM block 3E and uses the transfer account number table 3E1 according to the third sub-information 373, in a better embodiment, the TIPS 22 uses the RFID access control table 3E2 or the receiving brief message phone number table 3E3 instead.

In an embodiment, as shown in FIG. 2, the second memory block 38 includes the first memory block 36, while first information table 35 and second information table 39 are stored in the second memory block 38. In a better embodiment, the second memory block 38 does not include the first memory block 36.

Figure 3:
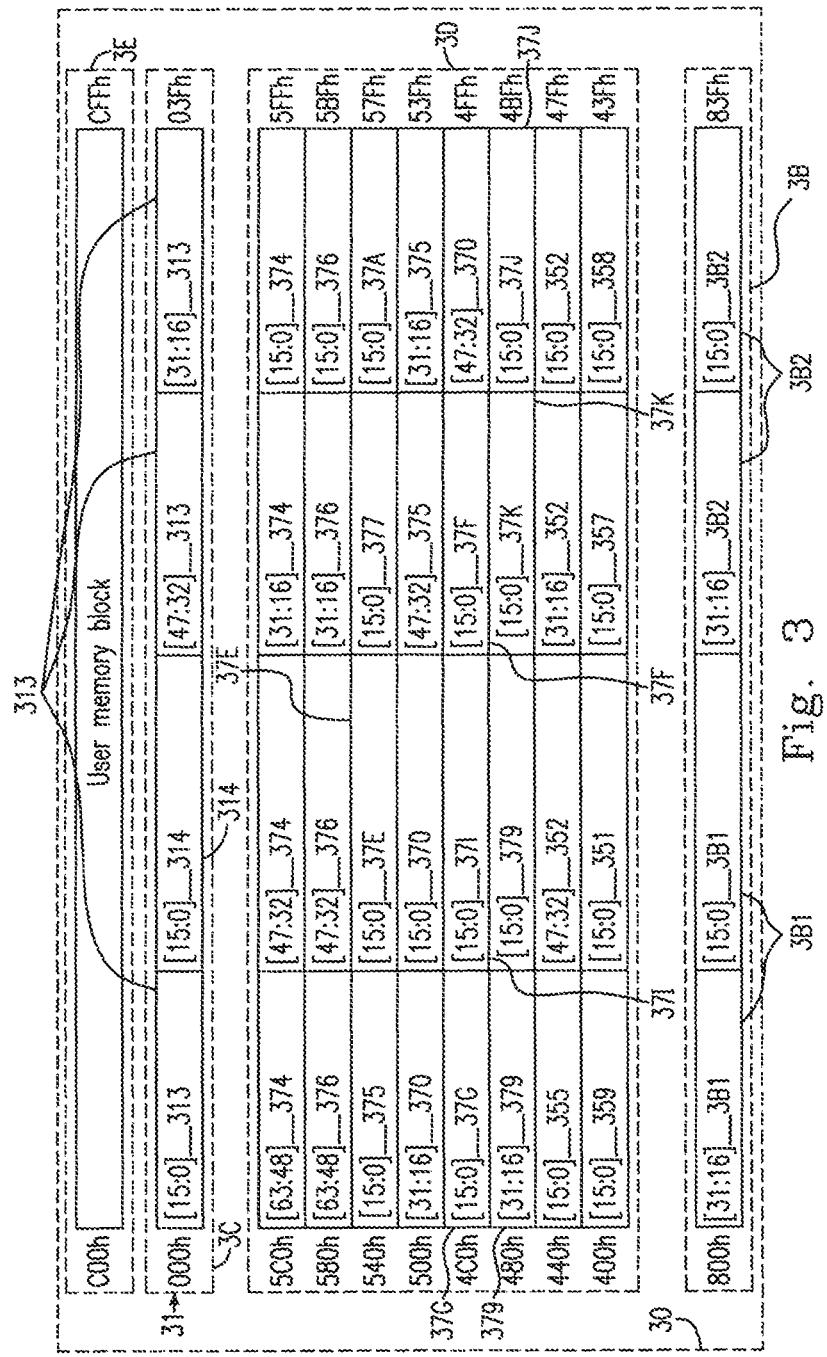
FIG. 3 is a layout diagram showing parameters of an item information table built in a tag memory of an RFID tag of a finance credit cash authentication card according to various embodiments of the present disclosure.

Please refer to FIG. 3, which is a layout diagram showing parameters of an item information table 33 built in a tag memory 34 of an RFID tag 30 of a finance credit cash authentication card (not shown) according to various embodiments of the present disclosure. The RFID tag 30 is an implementation tag of the RFID tag 3 in FIG. 2. As shown, the item information table 33 in FIG. 3 uses 16 bit word as its unit, shows encrypted key for authenticating an RFID tag, passwords of multiple use, and an item information table 33 with encoded parameters, the parameters in the item information table 33 has 1 or multiple words, for example, item code 357, credit account password 37A, counter service password 377, cash card store category 37G, and cash card merchant serial number 371 are 1 word parameters, cash card balance 379 is 2 word parameter, first encrypted key 352, second encrypted key 370, savings account password 375 are 3 word parameters, savings account number 374, credit account number 376 are 4 word parameters. The 0th to 15th bit in total 16 bits of a 1 word parameter can be expressed as parameter name[15:0], such as item code[15:0], credit account password[15:0], counter service password[15:0], cash card store category[15:0], and cash card merchant serial number[15:0], the 0th to 31th bit in total 32 bits of a 2 word parameter can be expressed as parameter name[31:0], such as cash card balance[31:0], the 0th to 15th bit in total 16 bits is the first word of a 2 word parameter can be expressed as parameter name[15:0], such as cash card balance[15:0], the 16th to 31th bit in total 16 bits is the second word of a 2 word parameter can be expressed as parameter name[31:16], such as cash card balance[31:16], the 0th to 47th bit in total 48 bits of a 3 word parameter can be expressed as parameter name[47:0], such as first encrypted key[47:0], second encrypted key[47:0], savings account password[47:0], the 0th to 15th bit in total 16 bits is the first word of a 3 word parameter can be expressed as parameter name[15:0], such as first encrypted key[15:0], second encrypted key[15:0], savings account password[15:0], the 16th to 31th bit in total 16 bits is the second word of a 3 word parameter can be expressed as parameter name[31:16], such as first encrypted key[31:16], second encrypted key[31:16], savings account password[31:16], the 32th to 47th bit in total 16 bits is the third word of a 3 word parameter can be expressed as parameter name[47:32], such as first encrypted key[47:32], second encrypted key[47:32], savings account password[47:32], the 0th to 63th bit in total 64 bits of a 4 word parameter can be expressed as parameter name[63:0], such as savings account number[63:0], credit account number[63:0], the 0th to 15th bit in total 16 bits is the first word of a 4 word parameter can be expressed as parameter name[15:0], such as savings account number[15:0], credit account number[15:0], the 16th to 31th bit in total 16 bits is the second word of a 4 word parameter can be expressed as parameter name[31:16], such as savings account number[31:16], credit account number[31:16], the 32th to 47th bit in total 16 bits is the third word of a 4 word parameter can be expressed as parameter name[47:32], such as savings account number[47:32], credit account number[47:32], the 48th to 63th bit in total 16 bits is the fourth word of a 4 word parameter can be expressed as parameter name[63:48], such as savings account number[63:48], credit account number[63:48]. In a better embodiment, word number of parameter in the item information table 33 can be adjusted according to the business and application requirement, or some parameters may be replaced, deleted, or added, for example, when second encrypted key 370 is not used, which may be replaced by receiving brief message phone number 370 as a 3 word or 4 word parameter. Using tag memory 34 of RFID tag 30 complies with the use of tag memory in 18000-6C or functional equivalent communication interface protocol. The tag memory 34 includes reserved memory (RM) block 3B, tag identifier (TID) memory block 3C, unique item identifier (UII) memory block 3D, and user memory (UM) block 3E. The RFID tag 30 is divided into 4 memory banks according to the most left 2 bits of its tag memory address, when the most left 2 bits being 00 indicates TID block 3C, 01 indicates UII block 3D, 10 indicates RM block 3B, 11 indicates UM block 3E, wherein the TID block 3C stores tag serial number (TagSN) 313 and manufacturing identifier 314, the UII block 3D stores first information table and second information table, the RM 3B block stores item kill password 3B1 and item access password 3B2, the UM block stores third information table, the tag serial number 313 is a 3 word parameter which can be expressed as TagSN[47:0] or TagSN[15:0], TagSN[31:16] and TagSN[47:32], the manufacturing identifier 314 is a 1 word parameter which can be expressed as manufacturing identifier[15:0], the item kill password 3B1 and item access password 3B2 are 2 word parameter which can be expressed as item kill password[31:0] and item access password[31:0] or item kill password [15:0], item kill password[31:16] and item access password [15:0], item access password[31:16] respectively. The RFID tag 30 is made to have item information table 33 built in its tag memory 34 for a finance credit cash authentication card in financial business according to the third embodiment of the present invention, the technical features of the finance credit cash authentication card includes selecting counter service in a financial bank, selecting UHF long read distance service for cash authentication card, finance cash authentication card or credit cash authentication card, selecting HF short read distance service for cash authentication card, finance cash authentication card or credit cash authentication card, selecting UHF long read distance service joined by corporate or organization for cash authentication card, finance cash authentication card or credit cash authentication card, selecting HF short read distance service joined by corporate or organization for cash authentication card, finance cash authentication card or credit cash authentication card, and in addition, selecting a cash card balance monetary base 37F for cash card balance 379 and using the cash card balance 379 in the cash authentication card to store cash, and then using the same card to pay purchase amount or adding an amount of cash.

Please refer to FIG. 3, the memory address from $400_H$ to $47F_H$ including 8 words is the first memory block 36 in FIG. 2 which stores the first information table 35, and the memory address from $480_H$ to $5FF_H$ including 24 words which stores the second information table 37. In an embodiment, when the TIPS 22 selects and inventories RFID tag 3 through reader 221 in the first authentication step, the first information table 35 is the information sent back to the reader 221 by the RFID tag 3, verifies word length of the first information table 35 received to ensure the selected RFID tag 3 belonging to the same system (or the RFID tag 3 is compatible with the RFID TIPS 22), the first information table 35 includes first PC information 351, item code 357, item serial number 358, user serial number 355, first encrypted key 352, and a CRC-16 code 359. In an embodiment, the user serial number 355 is a serial number starting from 1, in a better embodiment, the user serial number 355 is an item expiration date. In another better embodiment, the user serial number 355 is a system code number, indicating the item information table built in an RFID tag, the system code number includes but not limit to using 1 for finance authentication system, 2 for finance cash authentication system, 3 for credit authentication system, 4 for finance credit authentication system. The TIPS 22 in the second authentication step, reads information from the second information table 37 in RFID tag 3 through reader 221, the information includes savings account number 374, credit account number 376, savings account password 375, credit account password 37A, counter service password 377, compare failed count 37E, second encrypted key 370, and cash card information 378, the cash card information 378 includes cash card balance 379, cash card balance monetary base 37F, cash card store category 37G, cash card merchant serial number 371, cash card getting on station number 37J, and cash card use status 37K. In a better embodiment, word length of the first information table 35 in UII block can be adjusted based on different business and application requirement, which is not limited to 8 words. After the first authentication step is passed successively, the TIPS 22 reads tag serial number 313 and manufacturing identifier 314. In a better embodiment, the compare failed count 37E is compared to a maximum compare failed count, and when it exceeds the maximum value, the TIPS 22 can generate an item kill password according to the tag serial number 313 for starting a kill RFID tag procedure, and then the RFID tag 3 can no longer be used to have dialogue with the TIPS 22.

As shown in FIG. 3, RFID tag 30 includes first PC information 351 which is a 16 bit word parameter, and its 0th to 15th bit can be expressed as PC[15:0], its 0th to 4th bit in total 5 bits can be expressed as PC[4:0] indicating first sub-information, which is for controlling the number of words backscattered from the UII block, the 5th to 15th bit in total 11 bits can be expressed as PC[15:5], although PC[15:5] is not related for controlling the number of words backscattered from the UII block, but it still needs to be set according to ISO 18000-6C communication interface protocol. In a better embodiment, some of the 11 bits in PC[15:5] can be used to increase the number of bits in first sub-information in other communication interface protocol for controlling more words backscattered from the UII block. In order for the TIPS 22 to receive only the first information table 35 in the first authentication step, when building the RFID tag 3, the PC[4:0] is set to include word length of the first information table 35, for example, a 7, which indicates word length of the first information table 35 is 8, and when the TIPS 22 decrypting first encrypted key 352 to obtain the second sub-information 353, for example, a 23, which indicates word length of the second information table 37 is 24, verifying the second sub-information 353 can just authenticate the RFID tag for anti-counterfeiting and belonging to the same system (or the RFID tag 3 is compatible with the RFID TIPS 22). In an embodiment, method of reading the memory block RB2 is to set a starting address and a word count for reading. In a better embodiment, method of reading the memory block RB2 is to set a starting address and an ending address for reading, for example in case of 5 bits, the starting address is set to $11111_B$ and the ending address is set to 01000B, then reading RB2 starts from the starting address to the ending address in decrement of 1 will read 24 words. Reading the memory block RB3 can be done by the same methods according to third sub-information.

As shown in FIG. 3, building an encoded parameter item code 357 makes the RFID tag 30 an encoded item information table according to the third embodiment of the present invention. The item code 357 is a 16 bit word, and its 0th to 15th bit can be expressed as item code[15:0], in an embodiment, method of building an item code 357 includes categorizing its 16 bits as: item code[15:13] indicating the 13th to 15th bit in total 3 bits as RFID business sub-code, item code[12:11] indicating the 11th to 12th bit in total 2 bits as RFID device sub-code, item code[10:9] indicating the 9th to 10th bit in total 2 bits as RFID selecting enable function sub-code, item code[8:6] indicating the 6th to 8th bit in total 3 bits as RFID function sub-code, item code[5:0] indicating the 0th to 5th bit in total 6 bits as RFID deployment country sub-code. In an embodiment, the coding of the RFID business sub-code can be further adjusted based on RFID business field and application, the 3 bits of item code[15:13] can define 8 RFID business fields as: $000_B$ indicating finance, $001_B$ indicating transportation, $010_B$ indicating logistics, $011_B$ indicating supply chain, $100_B$ indicating item level tracking, $101_B$ indicating access control and asset management, $110_B$ indicating scientific technology, and $111_B$ indicating system reserved field.

The RFID device sub-code uses 2 bits of item code[12:11] which can define 4 device categories made of an RFID tag, or assembled other device with an RFID tag as: $00_B$ indicating nonconductive adhesive label device, $01_B$ indicating nonconductive plastic packaged device having a thickness with its shape as card, box, round, polygon, or symbolizing an event, people, or region, $10_B$ indicating display unit or mobile device for receiving and display a brief message or image, $11_B$ indicating device assembled an RFID tag with other nonconductive material including wood, leather, nonfabric, or a nonconductive packaging material attaching to an metal layer.

The RFID selecting enable function sub-code uses the 2 bits of item code[10:9] which defines combination of user selected enablers for a RFID business sub-code, for example, in an embodiment, in case that RFID business sub-code is finance, the item code[10:9] defines 4 combinations as: $00_B$ indicating to enable finance, credit, counter service, access control, item level tracking, and pay cash, $01_B$ indicating to enable finance, credit, counter service, pay cash, sending brief message, access control, and item level tracking, $10_B$ indicating to enable finance, credit, counter service, pay cash, select monetary base for cash card balance, access control, and item level tracking, $11_B$ indicating to enable finance, credit, counter service, pay cash, and system reserved functions.

The RFID function sub-code uses the 3 bits of item code[8:6] which includes integrated RFID functions in applying an RFID tag to a RFID business sub-code, for example, in an embodiment, in case that RFID business sub-code is finance, the item code[8:6] includes 8 combinations of integrated RFID functions as: $000_B$ indicating finance, credit, counter service, pay cash, send brief message, and passive UHF long read distance, $001_B$ indicating finance, credit, counter service, pay cash, send brief message, select monetary base for cash card balance, and passive UHF long read distance, $010_B$ indicating finance, credit, counter service, pay cash, send brief message, and passive UHF short read distance, $011_B$ indicating finance, credit, counter service, pay cash, send brief message, and passive UHF short read distance with high memory capacity, $100_B$ indicating finance, credit, counter service, pay cash, send brief message, and HF short read distance, $101_B$ indicating finance, credit, counter service, pay cash, send brief message, select monetary base for cash card balance, and HF short read distance, $110_B$ indicating finance, credit, counter service, pay cash, send brief message, access control, item level tracking, and passive UHF long read distance, $111_B$ indicating finance, credit, counter service, pay cash, send brief message, access control, item level tracking, and passive HF short read distance. In a better embodiment, in case that RFID business sub-code is transportation, the item code[8:6] includes 8 combinations of integrated RFID functions as: $000_B$ indicating semi-passive UHF far read distance (50 to 100 meters) for locating while moving by high speed rail and buses, $001_B$ indicating semi-passive UHF far read distance with high memory capacity (above 8K words), $010_B$ indicating passive UHF long read distance (above 5 to 10 meters) for locating in patrol route and automatic smart parking lot, $011_B$ indicating passive UHF long read distance with high memory capacity (above 64K words), $100_B$ indicating passive UHF near read distance (below 50 to 100 millimeters) for automatic parking lot, $101_B$ indicating passive UHF near read distance with high memory capacity, $110_B$ indicating passive HF short read distance (below 5 to 10 millimeters) for access control and locating on the patrolling route, $111_B$ indicating passive HF short read distance with high memory capacity.

The RFID deployment country sub-code uses the 6 bits of item code[5:0] which defines 64 RFID deployment country and region according to the RFID deployment countries for a RFID business sub-code, for example, in an embodiment, the item code[5:0] defines RFID deployment country and region as: $00_H$ indicating Australia region, $20_H$ indicating Taiwan region, $60_H$ indicating USA region.

Based on the descriptions for item code 357 and its sub-codes as above, the TIPS 22 can proceed with the coding for item code[15:0], for example, in an embodiment, when item code[15:0] is $0981_H$, it indicates a plastic card RFID device for finance business deployed in Australia region, and the enabled RFID functions including finance, credit, counter service, pay cash, send brief message, access control, item level tracking, and passive UHF long read distance, and in another embodiment, when item code[15:0] is $0A68_H$, it indicates a plastic card RFID device for finance business deployed in Taiwan region, and the enabled RFID functions including finance, credit, counter service, pay cash, send brief message, select monetary base for cash card balance, and passive UHF long read distance. After an item code 357 is built in the RFID tag 30, the item code 357 can be used by the TIPS 22 for selecting RFID tag 3 through reader 221 according to the third embodiment of the present invention.

As shown in FIG. 3, an item serial number 358 is built having a 16 bit word according to the third embodiment of the present invention. The 0th to 15th bit in total 16 bits of item serial number 358 can be expressed as item serial number[15:0], in an embodiment, method of building the item serial number 358 includes generating code number according to sub-code including organization for a RFID business sub-code of the item code 357, when the RFID business sub-code of item code 357 is finance, the item serial number[15:0] is $0007_H$ to represent first Bank, $0013_H$ to represent Cathay United Bank, and in an embodiment, when the RFID business sub-code of item code 357 is logistics, the item serial number[15:0] is $1010_H$ to represent Yang Ming Marine Transport Corporation. In a better embodiment, building the item serial number 358 includes generating code number according to sub-codes including area, location, building, and floor for a RFID business sub-code of the item code 357.

As shown in FIG. 3, a user serial number 355 is built having a 16 bit word according to the third embodiment of the present invention. The 0th to 15th bit in total 16 bits of user serial number 355 can be expressed as user serial number[15:0], in an embodiment, method of building the user serial number 355 includes generating serial number for user according to the item code 357 and the item serial number 358, for example, students at school, members of a membership store, residents of a community, employees of a company, products or packages in an assembly line, all can start from 1. In a better embodiment, when not using the item code 357 and the item serial number 358, generating the user serial number 355 by the TIPS 22 of the present invention includes setting a serial number starting from 1, or a system code number to represent an item information table system in the RFID tag 3 which includes but not limited to using 1 for finance authenticating card system, 2 for finance cash authenticating card system, 3 for credit cash authenticating card system, 4 for finance credit cash authenticating card system, 5 for finance access control authenticating card system, 6 for finance cash access control authenticating card system, 7 for credit cash access control authenticating card system, 8 for finance credit cash access control authenticating card system. In another better embodiment, the item code 357 indicates a plastic card RFID device for item level tracking business deployed in Taiwan region, and the enabled RFID functions including pay cash, send brief message, and passive HF short read distance, and the item serial number 358 indicates a RFID card making company, the 16 bits in user serial number[15:0] can be categorized to have sub-codes such as user serial number[15:8] from 8th to 15th bit in total 8 bits representing user group sub-code, and user serial number[7:0] from 0th to 7th bit in total 8 bits representing user discount sub-code, for example, in a public transportation bus system, the user group sub-code and the user discount sub-code can be defined simultaneously which includes but not limited to using [01D, 100D] to represent regular group 1 with discount rate at 100%, [02D, 80D] to represent police or soldier group 2 with discount rate at 80%, [04D, 70D] to represent student group 4 with discount rate at 70%, [05D, 0D] to represent bus employee group 5 with discount rate at 0%, [06D, 50D] to represent bus employee's family group 6 with discount rate at 50%, [08D, 50D] to represent elderly group 8 with discount rate at 50%, [10D, 50D] to represent disability group 10 with discount rate at 50%.

In a better embodiment, when TIPS 22 does not use the methods described above to build item code[15:0], item serial number[15:0], and user serial number[15:0] in the RFID tag 30, for example, user does not need the coding of RFID business sub-code, RFID device sub-code, RFID selecting enable function sub-code, RFID function sub-code, and RFID deployment country sub-code, then a 32 bit word organization identifier[31:0] can be built by concatenating two 16 bit words, item code[15:0] and the item serial number[15:0], which includes the name, code number, or business unified serial number of company or organization according to business area and business item. In a better embodiment, the item code 357 and the item serial number 358 are concatenated to include mixed code for an organization, sub-organizations, and buildings.

As shown in FIG. 3, a plural authentication method is used to build the second authentication information 371 and second other information 372 in second information table 37 of an RFID tag 30 required for the second authentication step in a finance cash authentication card (not shown) according to the third embodiment of the present invention, the second authentication information 371 includes savings account password 375, counter service password 377, credit account password 37A and cash card balance 379, and the second other information 372 includes savings account number 374, credit account number 376, and cash card information 378. In an embodiment, method of authenticating the second authentication information 371 is prior to the using of second other information 372, TIPS 22 will first compare the authentication password entered by user to an authentication information selected from the second authentication information 371, and differentiate the two being the same? In a better embodiment, when user comes to a bank with a finance authentication card for making a financial transaction, TIPS 22 has been started earlier, bank teller only needs to ask user to place the authentication card on a platform at the top of bank teller's RFID reader, then ask user to enter an authentication password through the numerical key pad 2231, since the system constant CompType had been set earlier to "counter service" at the local computer 222, TIPS 22 will select the counter service password 377 from the second authentication information 371 of the authentication card to be the authentication information according to the setting of CompType, and compare it to the authentication password entered by user, after the comparing password is passed successfully, then proceed to a following financial business transaction by using the savings account number 374, such that bank not only provides user a thoughtful service without the need to fill out a transaction slip for making a deposit, withdraw or transfer, but also have increased the protection mechanism of user's banking account information. In a better embodiment, method of creating the counter service password can be at the time when user opens an account and apply for a finance authentication card, at the same time the service for sending brief message can also be provided, user may receive a savings account number 374, a finance authentication card and a counter service password 377 with a preset value, the finance authentication card number and corresponding savings account number 374 are imprinted on the finance authentication card, bank teller only needs to build the connection in bank's database device 4 between user's basic information and the finance authentication card number or savings account number 374, then user can use the finance authentication card. And when in making the finance authentication card, the receiving brief message 370 can be preset to a system default value, and the counter service password 377 preset to a value generated by a random number generator, both are then stored with the savings account number 374 into the finance authentication card, once user receives the finance authentication card, user can change the counter service password 377 according to the preset counter service password through TIPS 22, and store the desired receiving brief message phone number in the finance authentication card. In a better embodiment, when user uses a finance credit authentication card on an aATM, TIPS 22 will select an authentication information from the second authentication information 371 according to the setting of CompType at the local computer 222 and the user selected authentication type (AuthenticationType), the authentication information includes savings account password 375 and credit account password 37A. In a better embodiment, method of creating the savings account password 375 and credit account password 37A can be at the time when user opens an account and apply for a finance credit authentication card, at the same time the service for sending brief message can also be provided, user may receive a savings account number 374 or a credit account number 376, a savings account password 375 with a preset value or a credit account password 37A with a preset value, and a finance credit authentication card, bank teller only needs to build the connection in bank's database device 4 between user's basic information and the credit account number 376 or savings account number 374, then user can use the finance credit authentication card. And when in making the finance credit authentication card, the receiving brief message 370 can be preset to a system default value, and a savings account password 375, a credit account password 37A, or both preset to a value generated by a random number generator, both are then stored with the savings account number 374 or the credit account number 376 into the finance credit authentication card, once user receives the finance credit authentication card, user can change the savings account password 375 or the credit account password 37A according to the preset savings account password or the preset credit account password through TIPS 22, and store the desired receiving brief message phone number in the finance credit authentication card. In a better embodiment, when the finance authentication card includes cash card balance monetary base 37F in addition to cash card balance 379, bank teller can first ensure the use status of the cash card balance monetary base 37F including user has enabled the select monetary exchange function, and then make a withdraw from the savings account number 374 per user's request, perform monetary exchange function, and then store the withdraw amount in the cash card balance 379 of the finance authentication card, which is much easier for user to carry. In another better embodiment, when user uses a finance credit authentication card on nuFAD, TIPS will first authenticate the finance credit authentication card for anti-counterfeiting and belonging to the same system, and then select an authentication information from the second authentication information 371 according to the setting of CompType at the local computer 222 and the user selected AuthenticationType, the AuthenticationType includes savings account password 375, counter service password 377 and credit account password 37A, user can inquire savings account balance, credit account balance, also can make a withdraw from the savings account number 374, perform monetary exchange function, and then store the withdraw amount in the cash card balance 379 of the finance authentication card. In another better embodiment, TIPS 22 will send a transaction summary to the receiving brief message phone number 370 as a proof of using the card and another way of authentication method.

In another better embodiment, the plural authentication method builds second authentication information 371 in second information table 37 of an RFID tag 30 required for the second authentication step in a cash authentication card (not shown), the second authentication information 371 only includes cash card balance 379, method of authenticating the cash card balance 379 is prior to the pay cash, TIPS 22 will first verify the cash card balance 379 after the expense amount is paid, if it is ≥0 ? Please refer to FIG. 3, the plural authentication method is to build the information required to select RFID tag for the first authentication step in first information table 35 of the RFID tag 30, the first information table 35 includes item code 357, item serial number 358, first PC information 351, and first encrypted key 352, then the cash authentication card is provided with capability for anti-counterfeiting and belongs to a cash authentication card system, the item code 357 and the item serial number 358 indicating name or code number of a company or an organization, or indicating business unified serial number, are used by the TIPS 22 as the basis to select the RFID tag 30. The cash authentication card provided with capability for anti-counterfeiting can also be used in RFID item level tracking business which includes a shopping cash authentication card for replacing a shopping coupon or paying expense amount by cash, a travelling cash authentication card used to take a public transportation system for replacing the coins otherwise carried inconveniently, a library cash authentication card for passing the library gate access or paying fees in library or paying expense by cash, an entertaining cash authentication card for passing entertaining gate access or paying fees in entertaining area or paying expense amount by cash, a consumer cash authentication card for paying expense amount at stores by cash, a telephone cash authentication card for using a pay phone or paying expense amount by cash.

Please refer to both FIG. 2 and FIG. 3, in order for the cash authentication card to be used at stores in various business fields, an encoded cash card store category 37G having a 16 bit word in the cash card information 378 is built according to the third embodiment of the present invention. The 0th to 15th bit in total 16 bits of cash card store category 37G can be expressed as cash card store category[15:0], method of building the cash card store category 37G includes categorizing its 16 bits as: cash card store category [15:12] of 4 bits represents store business sub-code, cash card store category[11:6] of 6 bits represents store organization sub-code, cash card store category[5:0] of 6 bits represents store branch sub-code. In an embodiment, the 4 bits of store business sub-code is used to include store businesses as: $1_H$ indicating transportation service, $2_H$ indicating food and drink, $3_H$ indicating retails, $4_H$ indicating department stores, $5_H$ indicating household appliance, $6_H$ indicating entertainment, $7_H$ indicating distribution channel, and other value indicating reserved store category. In another embodiment, the 6 bits of store organization sub-code is used to include store organization for a store business sub-code, for example, for the store business sub-code being retails to include the store organization as: $01_H$ indicating 7-11 chain convenient stores, $02_H$ indicating all family chain stores, $03_H$ indicating Evergreen Fresh Produce company, $04_H$ indicating South North Multigrain company, $05_H$ indicating Prosper Drink company, $06_H$ indicating Everyday Automatic Vending company, and other value indicating reserved store organization, in a better embodiment, for the store business sub-code being transportation service to include the store organization as: $01_H$ indicating Taipei transportation company, $02_H$ indicating Capital transportation company, $03_H$ indicating Doo Doo Doo Parking Lot Company, $04_H$ indicating Keelung transportation company, and other value indicating reserved store organization. In another embodiment, the 6 bits of store branch sub-code is used to categorize store branches for a store organization sub-code in a store business sub-code, for example, for the Doo Doo Doo Parking Lot Company in transportation service to include the store branch as: $01_H$ indicating Taipei Shilin branch, $02_H$ indicating Taoyuan Chungli branch, $03_H$ indicating Taichung Qingshui branch, $04_H$ indicating Tainan Yungkang branch, $05_H$ indicating Taoyuan International Airport branch, and other value indicating reserved store branch. Based on the descriptions for cash card store category 37G and its sub-codes as above, the TIPS 22 can use cash card store category 37G and proceed with the coding for a cash card consuming stores, for example, when cash card store category[15:0] is $1005_H$, it indicates location of the consuming store where user uses a cash authentication card to pay cash is at the Taoyuan International Airport branch, Doo Doo Doo Parking Lot Company categorized in transportation service. In a better embodiment, the cash card store category 37G can be adjusted from 1 word to 2 words to allow more bits for its sub-codes and include more business organizations and their branches.

In FIG. 3, a cash card merchant serial number 371 is built having a 16 bit word in the cash card information 378 according to the third embodiment of the present invention. The 0th to 15th bit in total 16 bits of cash card merchant serial number 371 can be expressed as cash card merchant serial number[15:0], method of generating the cash card merchant serial number 371 for every merchant in a store categorized by cash card store category 37G, in a better embodiment, the cash card merchant serial number 371 includes generating merchant serial number from 1 to a maximum number 65,635 for 7-11 chain convenient stores in retails business, wherein 2,020 represents a pack of fresh papaya, in another better embodiment, generating public transport route number from 1 to 9999D for Kuo-Kuang Motor Transportation Company in transportation service business, wherein 1818D represents a long-distance bus route between Taipei and Chungli, in another better embodiment, generating on-line game number from 1 to 9999D for an On-line Game World Company in entertainment business, wherein 0100D represents an on-line competition game, Heroine Alliance, in another better embodiment, generating merchant serial number from 1 to 9999D for South North Multigrain Company in retails business, wherein 0054D represents yellow bean.

In FIG. 3, when using a cash authentication card to pay expense amount, TIPS 22 will proceed to a pay expense amount preprocessing based on cash card store category 37G and cash card merchant serial number 371 of the present invention, including to authenticate the cash authentication card for anti-counterfeiting and belonging to the same system in accordance with a plural authentication steps, and then write a measurable merchant information of a start measuring time, distance, weight, or flow amount into the authentication cash card, or in another embodiment, read a merchant information of a non-measurable merchant which includes barcode, or code number, or name of the merchant. When user presents the cash authentication card to pay the expense before a device which includes the TIPS 22, the TIPS 22 will again authenticate the cash authentication card for anti-counterfeiting and belonging to the same system, display the measured merchant information of time, distance, weight, or flow amount, obtain unit price of time, distance, weight, or flow amount for the measured merchant from the merchant unit price table, and convert the merchant consuming information of measured merchant into cash expense amount, or in another embodiment, display the unit price of non-measurable merchant information read from the merchant unit price table, obtain the quantity of non-measured merchant, also convert the merchant consuming information of non-measurable merchant into cash expense amount, and then subtract the cash expense amount from the cash card balance of the authentication cash card, display and recording the transaction, and send a summary to the receiving brief message phone number 370. In an embodiment, when user presents a cash authentication card to take a bus served by a long distance transportation company, the bus uses a radio bus fare collecting authentication system which includes a TIPS 22, the TIPS 22 will first authenticate the cash authentication card for anti-counterfeiting, belonging to the same system, and verify the cash card use status 37K, then write the getting on station number 37J into the cash authentication card, when user presents the same cash authentication card to get off the bus, the TIPS 22 will again authenticate the cash authentication card for anti-counterfeiting, belonging to the same system, and verify the cash card use status 37K, compute the travel distance according to both the getting on and the getting off station numbers, and convert it into cash expense amount, and then subtract the cash expense amount from the cash card balance of the authentication cash card. Please refer to FIG. 3, the cash card store category 37G and cash card merchant serial number 371 in the RFID tag 30 are used when proceeding to a pay expense amount preprocessing according to the present invention, in addition, TIPS 22 builds a user serial number 357 (abbr. Rate), a cash card balance 379 (abbr. Balance), a cash card use status 37K (abbr. Status), and a getting on station number 37J (abbr. Last Station ID or LastSID) for tracking the use status of a cash authentication card. In an embodiment, when user presents a finance credit cash authentication card to take a long-distance bus, the bus uses a radio bus fare collecting authentication system which includes a TIPS 22, the TIPS 22 includes a local computer 222, a reader 221, a key pad 223, a display unit 225, a radio network connecting device, and a set of system constants, the radio network connecting device provides a second radio channel, the set of system constants includes a travel route station number table, a travel route information table, and a ticket rate and fare table, the travel route information table includes station names and important route marks or their code numbers of the travel route, date, long-distance bus company code, bus travel route, and driver serial number can be entered through the key pad 223 and display unit 225, the TIPS 22 can communicate with the RFID tag 3 in the cash authentication card through reader 221, and RFID channel 226, and proceed to getting on procedure, getting off procedure, and system controlled procedure, in an embodiment, the TIPS 22 can obtain an en route station number, or its code number, or its GPS coordinates via second radio channel of a radio network connecting device which includes the radio channel connected to a mobile radio network through a Wi-Fi access point. In a better embodiment, the radio channel can be another RFID reader for reading an en route station number, or its code number included in a semi-passive long distance RFID tag. Both Status and LastSID in the finance credit cash authentication card have a default value 0 indicating waiting for use. When user presents the cash authentication card before a device including the TIPS, the TIPS has always obtained a current station ID (abbr. CurrentSID) through the radio channel, will first authenticate the RFID tag for anti-counterfeiting and belonging to the same system according to a plural authentication steps, and read the Status of the cash authentication card, and check the value of Status=? if Status=0, then proceed to getting on procedure, if Status=1, then proceed to getting off procedure, if (Status=other system preset values), then proceed to authentication cash card use exception procedure which includes displaying Status and insufficient Balance, incomplete getting off procedure, incomplete getting on procedure, or entering an authenticating user status mode, and authenticating user status by checking the entered user number and authentication password, after passing the authenticating user number and authentication password successfully, then selecting to execute a system function which includes entering date and driver serial number, setting travel route number, loading travel route information table, loading ticket rate and fare table, inquiring travel route and its ticket rate and fare, reading total collected amount, reading each collected amount, reading each cash advance record, resetting Status and LastSID of an authentication cash card to a constant including 0 to restore its use, canceling a collected amount, clearing a collected amount record, inquiring travel route timetable, inquiring travel route station number record, and self-test of RFID TIPS. Getting on procedure: the TIPS 22 will check CurrentSID=LastSID? if being true, then the TIPS 22 will display the fare has been paid, and then end the communication dialog, if being false, then the TIPS 22 will store the value of CurrentSID into LastSID, the long-distance bus company code into the cash card store category 37G, and the travel route code number into the cash card merchant serial number 371, the TIPS 22 will store a 1 into the Status indicating user has gotten on, and send a transaction message or an email to the receiving brief message phone number 370, and then end the communication dialog. Getting off procedure: the TIPS 22 will store a 2 into the Status indicating user preparing to get off and display the message on the display unit 225, the TIPS 22 will read the cash card store category 37G and cash card merchant serial number 371, and then inspect [the cash card store category 37G=the long-distance bus company code] AND [the cash card merchant serial number 371=the travel route code number]? if being false, indicating user failed to complete the getting off procedure last time when using the authentication card, and the TIPS 22 will display exception occurred message, the authentication card can't be used further, and then end the communication dialog, if being true, then the TIPS 22 will check CurrentSID=LastSID? if being true, then the TIPS 22 will display user has gotten on, and then end the communication dialog, if being false, indicating user is preparing to get off, and the TIPS 22 will read Rate, LastSID, and Balance from the authentication card, and use them to obtain the fare from the ticket rate and fare table, and then check Balance≥Fare? if being true, then the TIPS 22 will deduct Fare from the Balance and store the remaining amount into the Balance, the CurrentSID into the LastSID, and a 0 into Status indicating Fare has been deducted successfully, and display the message on the display unit 225, and send a transaction message or an email to the receiving brief message phone number 370, and record the collected amount, if being false, the TIPS 22 will store a 3 into Status, indicating insufficient Balance, display the message on the display unit 225, and record the insufficient Balance event, and then enter a credit card account for cash advance, display the message on the display unit 225, and then advance a fixed amount of cash from user's credit account number 376, store the fixed amount into the Balance, display the message on the display unit 225, and record the cash advance transaction as a proof of asking user for payment, which includes sending a transaction message or an email to the receiving brief message phone number 370, and then store a 2 into Status, again proceed to the getting off procedure, suppose the Balance is still insufficient, the TIPS 22 will store a 3 into Status, again repeat the insufficient Balance and cash advance procedures until Fare has been deducted successfully. In a better embodiment, when the Balance is insufficient, the TIPS 22 can as well enter a savings account for cash withdraw in advance, display the message on the display unit 225, and then withdraw a fixed amount of cash in advance from user's savings account number 374, store the fixed amount into the Balance, display the message on the display unit 225, and record the prepaid cash transaction as a proof of cash withdraw in advance, which includes sending a transaction message or an email to the receiving brief message phone number 370. In a better embodiment, upon detecting a station name or number ahead matching the next station name or its number, or route mark or its number in the travel route information table, the TIPS 22 can display or announce the approaching station name or route mark, and send a brief message or email to a RFID authentication system and RFID information system, upon detecting current station number or route mark dropping out, or no passenger getting off, the TIPS 22 can display or announce the expected next station name. In another better embodiment, the TIPS 22 can connect to a radio network via a radio network connecting device, send a geographic location information and an onsite working information to a RFID AS 2 and RFID IS 1 of the long-distance bus company for backend processing, the geographic location information includes time, travel route, vehicle serial number, driver serial number, authenticating exception state of a authentication cash card and its tag serial number, GPS coordinates, the onsite working information includes a brief message, a shot image, or both a brief message and a shot image.

Please refer to FIG. 3, a cash card merchant unit price and a cash card merchant purchasing amount can be added to the cash card information 378 by adjusting the word length of parameters, and using the getting on station number 37J as cash card merchant weight according to the third embodiment of the present invention. In a better embodiment, a RFID merchant vending authentication system converts weight of measurable merchant in a grocery store into purchasing amount, the RFID merchant vending authentication system of the grocery store uses a RFID TIPS 22 which includes local computer 222, reader 221, electronic scale, barcode scanner, and receipt printer, wherein the reader 221, the electronic scale, the barcode scanner, and the receipt printer all have USB head plugged in the USB port of the local computer 222 individually, the RFID TIPS 22 includes a merchant unit price table, when user uses a cash authentication card for making purchase at the grocery store, suppose the user decides to purchase 2 kg of soy beans, the store clerk will first use the barcode scanner, or touch screen, or numerical key pad to enter merchant name or code number, cause the pay expense amount preprocessing of the RFID TIPS 22 to obtain a merchant unit price from the merchant unit price table, and the clerk uses the electronic scale to measure the merchant weight, and then the TIPS 22 obtains a purchasing amount by converting the merchant weight based on the weight unit and multiplying the result by the merchant unit price, after user confirms the purchasing amount, and presents the cash authentication card before a device which includes the TIPS 22, the TIPS 22 will authenticate the cash authentication card for anti-counterfeiting and belonging to the same system in plural authentication steps, and then proceed to cash card fees collecting procedure, update and display the cash card balance 379 in the cash authentication card, record the merchant's name or code number, merchant weight, and merchant purchasing amount, and have them stored into the cash authentication card and have a receipt printed on the receipt printer for user as a proof of the transaction, and send a transaction message or an email to the receiving brief message phone number 370 as a proof of using the card and another way of authentication method.

As shown in FIG. 3, cash card information 378 is built in the RFID tag 30 according to the third embodiment of the present invention. The cash card information 378 further includes a 16 bit word built as cash card balance monetary base 37F, whose 0th to 15th bit in total 16 bits can be expressed as cash card balance monetary base[15:0], method of building the cash card balance monetary base 37F includes categorizing its 16 bits into 3 sub-codes as: cash card balance monetary base[15:12] of 4 bits represents select monetary exchange function inspection sub-code, cash card balance monetary base[11:8] of 4 bits represents assign cash card balance width and precision format sub-code, cash card balance monetary base[7:0] of 8 bits represents monetary base sub-code. In a better embodiment, the sub-codes of the cash card balance monetary base 37F can be further coded as: the 4 bits in the cash card balance monetary base[15:12] defines 16 use status of the select monetary exchange function inspection sub-code, for example, including $0000_B$ indicating the select monetary exchange function not enabled, $0001_B$ indicating the select monetary exchange function not selected, $0010_B$ indicating the select monetary exchange function selected, $0011_B$ indicating the assign cash card balance width and precision format selected, $0100_B$ indicating the select monetary exchange function enabled, and other value for system reserved use, the 4 bits in the cash card balance monetary base[11:8] defines 16 formats for storing and displaying the cash card balance 379 as a 32 bit floating variable, for example, including $0000_B$ is to assign width to 7 digits and decimal point to 0 digit, $0001_B$ is to assign width to 7 digits and decimal point to 1 digit, $0010_B$ is to assign width to 7 digits and decimal point to 2 digits, and other value for system reserved use, and the 8 bits in the cash card balance monetary base[7:0] defines 256 countries for the monetary base of the cash card balance 379, characters can also be used to represent national monetary bases in common use, for example, including A for US dollar, B for British pound, C for RMB, E for Euro dollar, H for Hong Kong dollar, J for Japanese yen, T for New Taiwan dollar, V for VND, and other characters for system reserved use. In a better embodiment, when user uses a finance credit cash authentication card for paying a consuming amount, before TIPS 22 collecting the fees, the TIPS 22 will first authenticate the RFID tag for anti-counterfeiting and belonging to the same system, and then check the select monetary exchange function inspection sub-code, to ensure the select monetary exchange function has been enabled, then check the monetary base of the consuming amount and the monetary base sub-code of the cash card balance monetary base 37F are the same? If the two monetary bases are the same, then authenticating cash card balance≥consuming amount? if being true, then subtract the consuming amount from the cash card balance 379, if being false, then enter the credit card account 376 to advance a fixed amount of cash to the cash card balance 379, and proceed to pay the consuming amount again. If the two monetary bases are not the same, then execute the monetary exchange function, converting the consuming amount to have the same monetary base as set in the cash card balance monetary base 37F, and paying the consuming amount again. Thus the different monetary base problem when paying the consuming amount is solved by using the exchange rate conversion. In an embodiment, when converting currency from new Taiwan dollar into US dollar, storing the converted US currency which may include dollar, quarter, dime and nickel is quite inconvenient, therefore, when using the cash authentication card globally according to the present invention, not only the anti-counterfeiting mechanism will help to protect the system, but also user will no longer be bothered with carrying the cumbersome changes for different countries.

Figure 4B:
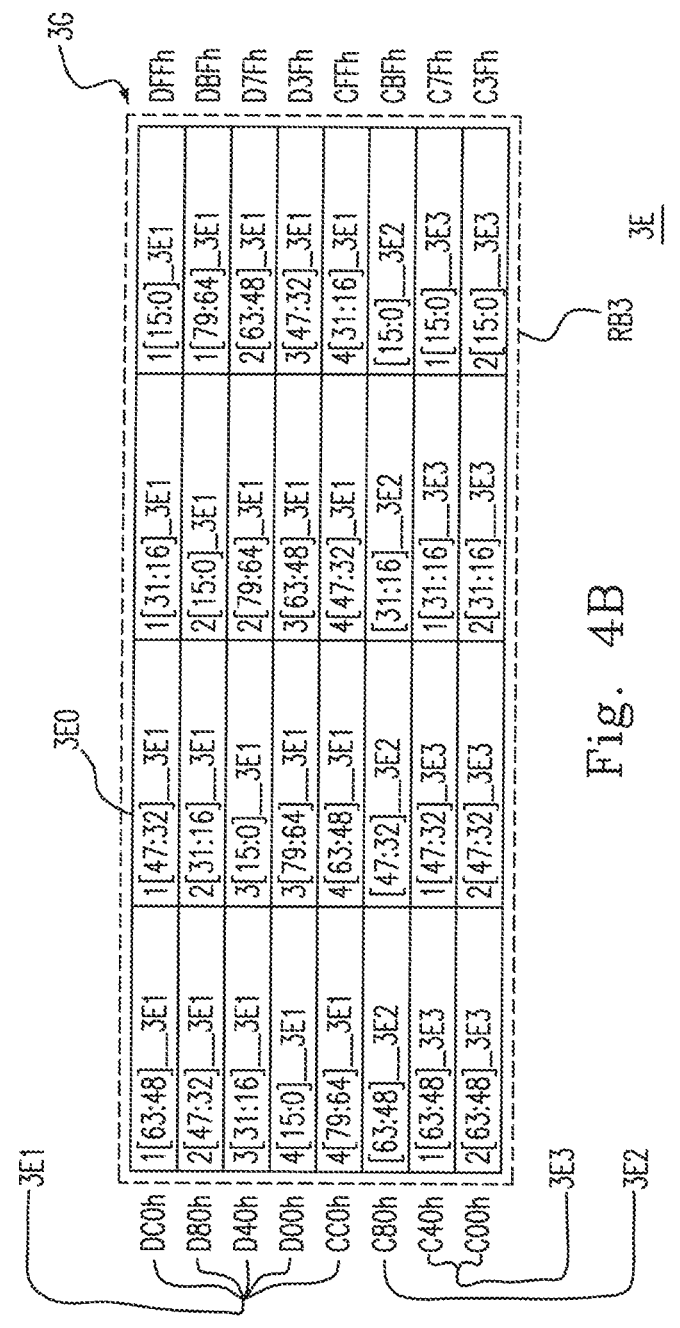

FIG. 4A is a layout diagram showing a first form of parameters of an information table 3E0 built in a UM block 3E of the tag memory 34 of the RFID tag 30 of the finance credit cash authentication card according to various embodiments of the present disclosure. FIG. 4B is a layout diagram showing a second form of parameters of the information table 3E0 built in the UM block 3E of the tag memory 34 of the RFID tag 30 of the finance credit cash authentication card according to various embodiments of the present disclosure. In a better embodiment, the TIPS 22 decrypts the second encrypted key 370 in the UII block 3D for obtaining a third sub-information, which indicates the word length of the third information table 3E0 stored in the UII block 3D. In an embodiment, please refer to FIG. 4(a), which shows the third information table 3E0 includes a transfer account number 3E1, which includes transfer account number 1[79:0], transfer account number 2[79:0], transfer account number 3[79:0], transfer account number 4[79:0], transfer account number 5[79:0], and transfer account number 6[79:0], all have 5 words from the 0th to 79th bit in total 80 bits. In a better embodiment, the third information table 3E0 can further include RFID access control table, or receiving brief message phone number table, or a combination of the above, please refer to FIG. 4(b), which shows the third information table 3E0 includes a transfer account number 3E1, a RFID access control table 3E2, and a receiving brief message phone number table 3E3. The access control area number [63:0] included in the transfer account number 3E1, and the receiving brief message phone number 1[63:0] and the receiving brief message phone number 2[63:0] included in the receiving brief message phone number table 3E3, all have 4 words from the 0th to 63rd bit in total 64 bits. In a better embodiment, the TIPS 22 selects receiving brief message phone number 1 for sending financial transaction summary, or receiving brief message phone number 2 for sending other business transaction summary. In an embodiment, as shown in FIG. 4, third memory block 3G corresponds to UM block 3E, however the third memory block 3G does not include first memory block 36, also third sub-information indicates the read memory block RB3 which does not include first memory block 36. In a better embodiment, when UII block 3D is large enough to include the third information table 3E0, which can then be stored in UII block 3D instead of UM block 3E.

Figure 5A:
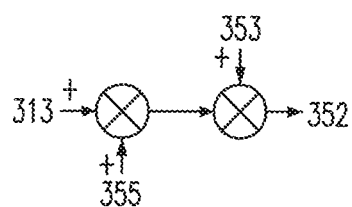
FIG. 5A is a logic diagram showing an encryption operation according to various embodiments of the present disclosure.
Figure 5B:
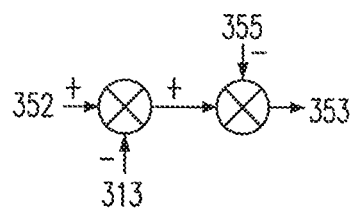
FIG. 5B is a logic diagram showing a decryption operation according to various embodiments of the present disclosure.

Please refer to FIG. 5A and FIG. 5B. FIG. 5A is a logic diagram showing an encryption operation according to various embodiments of the present disclosure. FIG. 5B is a logic diagram showing a decryption operation according to various embodiments of the present disclosure. In an embodiment, as shown in FIG. 5(a), the first encrypted key 352 is encrypted by tag serial number 313, user number 355, and second sub-information 353, the first encrypted key 352 can be expressed by 3 words as first encrypted key[47:32], first encrypted key[31:16] and first encrypted key[15:0], or a 48 bit word as first encrypted key[47:0]. Encryption operation of the first encrypted key 352 can be sum, subtract, multiply, logic, and/or a combination of the above, FIG. 5(a) is an embodiment for an add operation. FIG. 5(a) shows first result is obtained by adding tag serial number 313 to user number 355, and the first encrypted key 352 is obtained by adding the first result to second sub-information 353. In another better embodiment, the first encrypted key 352 can be obtained by encrypting tag serial number 313, and second sub-information 353 or its multiples. In another better embodiment, the final first encrypted key 352 can be obtained by extracting from the result of encrypted operations only its rightmost 1 word as first encrypted key[15:0], or 2 words as first encrypted key[31:16] and first encrypted key[15:0]. As shown in FIG. 5(b), second sub-information 353 is obtained by decrypting first encrypted key 352, tag serial number 313, and user number 355. FIG. 5(b) shows the decryption operation of second sub-information 353. In FIG. 5(b), second result is obtained by subtracting tag serial number 313 from first encrypted key 352, and second sub-information 353 is obtained by subtracting user number 355 from the second result.

Figure 6A:
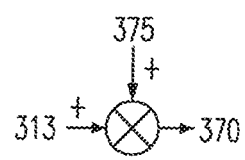
FIG. 6A is a logic diagram showing an encryption operation according to various embodiments of the present disclosure.
Figure 6B:
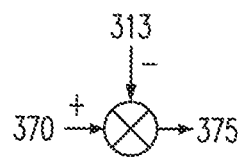
FIG. 6B is a logic diagram showing a decryption operation according to various embodiments of the present disclosure.

Please refer to FIGS. 6A and 6B. FIG. 6A is a logic diagram showing an encryption operation according to various embodiments of the present disclosure. FIG. 6B is a logic diagram showing a decryption operation according to various embodiments of the present disclosure. In an embodiment, as shown in FIG. 6(a), the second encrypted key 370 is encrypted by tag serial number 313, and third sub-information 373, wherein the third sub-information 373 can also be its multiples, the second encrypted key 370 can be expressed by 3 words as second encrypted key[47:32], second encrypted key[31:16] and second encrypted key[15:0], or a 48 bit word as second encrypted key[47:0]. Encryption operation of the second encrypted key 370 can be sum, subtract, multiply, logic, and/or a combination of the above, FIG. 6(a) is an embodiment for add operation. In FIG. 6(a), second encrypted key 370 is obtained by adding the tag serial number 313 and third sub-information 373. In a better embodiment, the second encrypted key 370 can be just third sub-information 373 or its multiples. In another better embodiment, the final second encrypted key 370 can be obtained by extracting from the result of encrypted operations only its rightmost 1 word as second encrypted key[15:0], or 2 words as second encrypted key[31:16] and second encrypted key[15:0]. As shown in FIG. 6(b), third sub-information 373 is obtained by subtracting tag serial number 313 from second encrypted key 370.

Figure 7:
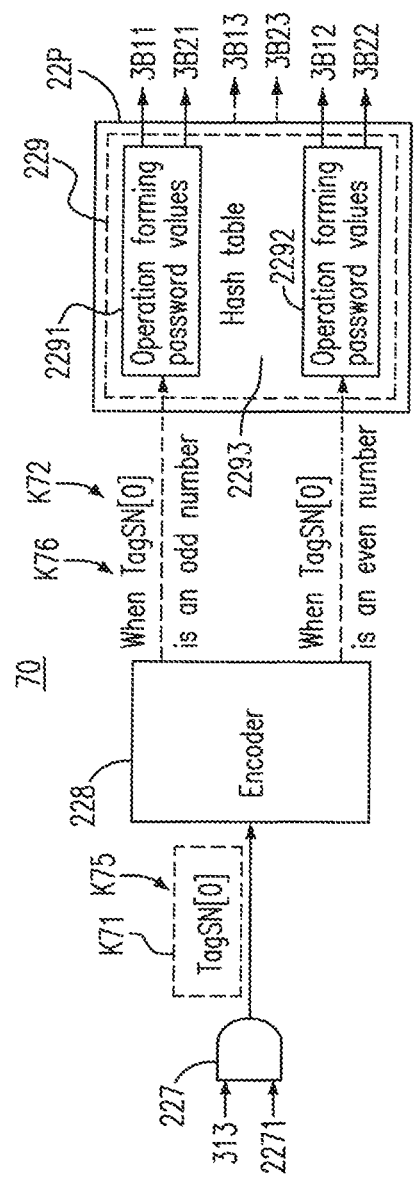
FIG. 7 is a functional diagram showing a parameter generating unit for generating an item kill password and an item access password in an RM block of the tag memory according to various embodiments of the present disclosure.

Please refer to FIG. 7, which is a functional diagram showing a parameter generating unit 70, which generates an item kill password 3B1 and an item access password 3B2 in an RM block 3B of the tag memory 34 according to various embodiments of the present disclosure. The parameter generating unit 70 includes an AND gate 227, an encoder 228, and a password generating component 22P. The RM block 3B is a memory space of 64 bits, which stores item kill password 3B1 and item access password 3B2, both these two passwords are 2 word parameters, need to be built prior to the using of RFID tag 3. In an embodiment, the item kill password 3B1 and the item access password 3B2 can be generated by extracting 2 words from the tag identifier 31 of tag memory 30. In a better embodiment, the item kill password 3B1 and the item access password 3B2 can be generated through a hash operation according to the tag serial number 313 of the tag identifier 31. As shown in FIG. 7, first password mask 2271 is a 3 word constant, and tag serial number 313 is a 3 word parameter whose 0th to 47th bit can be expressed as tag serial number[47:0], the operation of AND gate 227 is to generate its output signals by extracting all corresponding bits from the 48 bits of tag serial number[47:0] according to bits with value set to 1 in the 48 bits of first password mask 2271. In an embodiment, the TIPS 22 of the present invention sets the first password mask 2271 to a 48 bit first password mask value as $000000000001_H$, the tag serial number 313 and the first password mask 2271 passing through the operation of AND gate 227, generates an output control signal for the following 1 bit encoder 228 by extracting only the corresponding 0th bit from the tag serial number 313, TagSN[0], according to only the 0th bit being set to 1 in the first password mask 2271. In a better embodiment, value 1 set at 0th position of the first password mask 2271 can also be changed to set at other specific bit position of the first password mask 2271, the TIPS 22 can then extract other specific bit from the tag serial number 313 as a control signal to the 1 bit encoder 228. The encoder 228 has 2 output signals, both are connected to be the inputs of a hash table 229 which includes 2 sets of password values. In an embodiment, either first set password value 2291 or second set password value 2292 can be selected according to TagSN[0] as the output signals of the hash table 229, when TagSN[0] is 0, the hash table 229 outputs its first set password value 2291, which includes first item kill password 3B11 as $00010000_H$ and first item access password 3B21 as $00000001_H$, and when TagSN[0] is 1, the hash table 229 outputs its second set password value 2292, which includes second item kill password 3B12 as $00100000_H$ and second item access password 3B22 as $00000010_H$. In a better embodiment, the first password mask 2271 can have any P specific bits set to value 1, the operation of AND gate 227 can then generate P control signals for the following P bit encoder 228 by extracting any P specific bits from the 48 bits of tag serial number[47:0], which can output 2P sets of password values for generating corresponding 2P sets of first item kill password 3B1 and first item access password 3B2.

Figure 8:
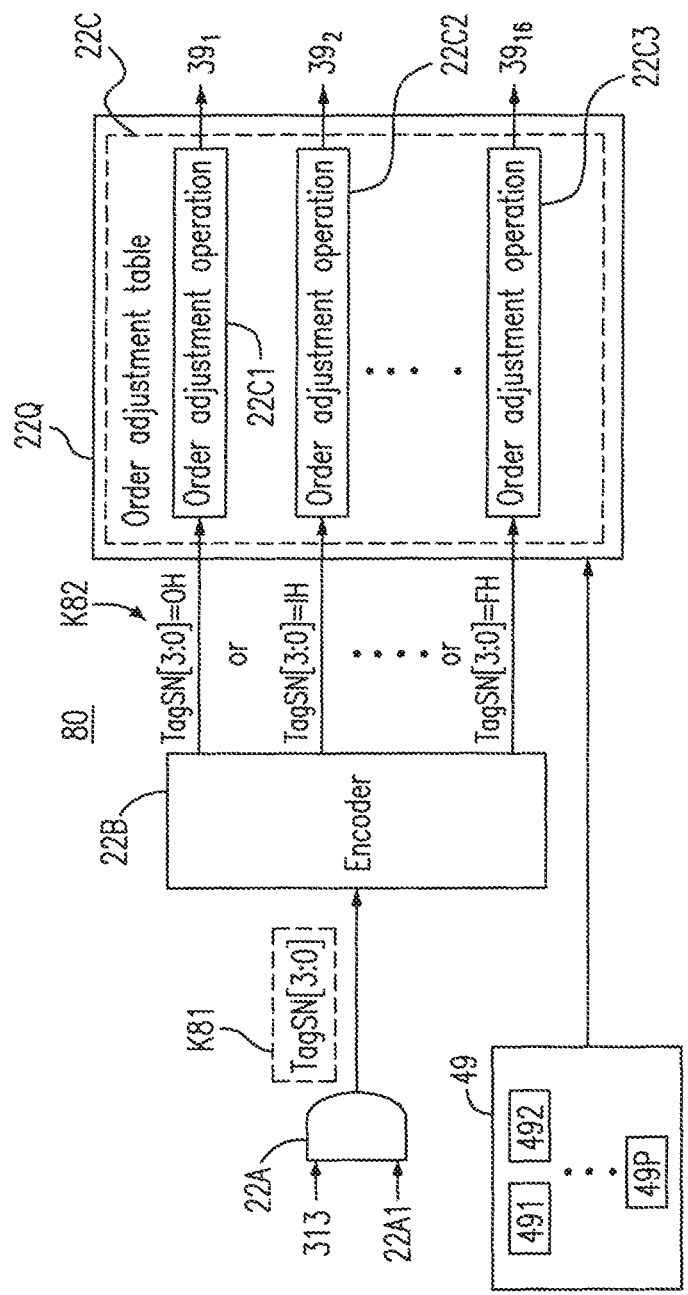
FIG. 8 is a functional diagram showing an order adjustment unit for generating an information table in a UII block of the tag memory according to various embodiments of the present disclosure.

Please refer to FIG. 8, which is a functional diagram showing an order adjustment unit 80 for generating an information table 39 in a UII block 3D of the tag memory 34 according to various embodiments of the present disclosure. The order adjustment unit 80 includes an AND gate 22A, an encoder 22B and an order adjustment component 22Q. Please at the same time also refer to FIG. 3, which shows building an item information table 33 in a finance credit cash authentication card (not shown), wherein second information table 39 is stored in memory address $480_H \sim 5FF_H$, the second information table 39 includes parameters as savings account number 374, credit account number 376, credit account password 37A, counter service password 377, savings account password 375, compare failed count 37E, second encrypted key 370, and cash card information 378, the address of each parameter stored in the second information table 39 is of the original ordering. In a better embodiment, the address of each parameter stored in the second information table 39 can have different ordering, and word length of the second information table 39 can be different for different authentication card system, such as finance credit cash authentication card system, credit cash authentication card system, and cash authentication card system, lest the cash card balance 379 should be eavesdropped and falsified. In FIG. 8, second password mask 22A1 is a 3 word constant of 48 bits set by system, tag serial number 313 is a 3 word parameter whose 0th to 47th bit can be expressed as tag serial number[47:0], the operation of AND gate 22A is to generate its output signals by extracting the corresponding bits from the 48 bits of tag serial number[47:0] according to bits with value set to 1 in the 48 bits of second password mask 22A1, after having the item information table 33 built, the TIPS 22 can generate k different second information table having different orderings, $39_1, 39_2, 39_3, \ldots 39_k$, where k is a number between 1 and 16, according to the tag serial number 313, the second information table 39, and second password mask 22A1. In an embodiment, memory address of each parameter in the second information table 39 is of the original ordering, and the memory address pointer of the original ordering is shown as [n, n+1, ..., n+m], where n is an address pointer indicating the address of the first parameter stored in the second information table 39, and m+1 is the ordering adjust range indicating the total word length of parameters in the second information table 39, unit word length of parameter can be a 16 bit word, thus when the address pointer of second information table $39_1$ is [n+1, n+2, ..., n+m, n], it indicates the address of each parameter stored in the second information table 39 is right rotated by a unit word length of parameter.

As shown in FIG. 8, the TIPS 22 of the present invention has the second password mask 22A1 set to a 48 bit second password mask value as $00000000000F_H$, the tag serial number 313 and the second password mask 22A1 passing through the operation of AND gate 22A, generates an output control signal for the following 4 bit encoder 22B by extracting only the corresponding 0th bit to 3rd bit from the tag serial number 313, TagSN[3:0], according from 0th bit to 3rd bit with value set to 1 in the second password mask 22A1. In a better embodiment, value 1 set from 0th to 3rd bit position of the second password mask 22A1 can also be changed to set at other 4 specific bit positions of the second password mask 22A1, the TIPS 22 can then extract other specific bits from the tag serial number 313 as control signals to the following 4 bit encoder 22B. The encoder 22B has 16 output signals, all are connected to an adjust table 22C as its inputs, every input of the adjust table 22C has a corresponding set of adjust ordering operation, the adjust table 22C has at most 16 sets of adjust ordering operation, the adjust ordering operation includes arithmetic, logic, and/or displacement operation for adjusting the address pointer, or move the data set in the second information table 39 to different memory sector or block such that the TIPS 22 can adjust the ordering of parameters in the second information table 39, and every tag serial number 313 can obtain a set of adjust ordering operation from the adjust table 22C. In another better embodiment, the TIPS 22 can merge the encoder 22B into the adjust table 22C, obtain N adjust control signals for the following adjust table 22C by extracting any N bits from the tag serial number 313 according to the second password mask 22A1, the adjust table 22C includes at most 2N sets of adjust ordering operation.

Please refer to FIG. 3 and FIG. 8 together for describing a specific carrying out of the present invention. In an embodiment, when building an item information table 33, the TIPS 22 sets the second password mask 22A1 to be a hex number of $00000000000F_H$, the tag serial number 313 and the second password mask 22A1 passing through the operation of AND gate 22A, extracting only the corresponding TagSN[3:0] according to bits with value set to 1 in the second password mask 22A1 as control signal for the following 4 bit encoder 22B. In an embodiment, when TagSN[3:0] is $0_H$, the TIPS 22 will select first set adjust ordering operation 22C1 to generate a second information table 391 with first set adjusted ordering. In a better embodiment, the first set adjust ordering operation 22C1 is to make the storing address of every parameter in the second information table 39 rotate right by 2 words or 2 unit word length of parameter, the original ordering of parameters in the second information table 39 is shown in FIG. 3 as: cash card balance[31:16], cash card balance[15:0], . . . , savings account number[31:16], and savings account number[15:0], and addresses of parameters stored are: $480_H$, $490_H$, . . . , $5E0_H$, and $5F0_H$, the address of parameter stored in the second information table 39 after made to rotate right by 2 words can be shown as: $4A0_H$, $4B0_H$, . . . , $480_H$, and $490_H$, then the savings account number[31:16] is stored at $480_H$, the savings account number[15:0] is stored at $490_H$, thus the second information table 391 with first set adjusted ordering is generated. In another better embodiment, the method of adjust ordering operation can be used in the adjust table 22C including rotate left, only rotate left or right by 1, or other number, or 0 character, also including other logic operations or no operation, even including adjust parameter ordering by number of characters or bits. In another better embodiment, when TagSN[3:0] is $1_H$, the TIPS 22 will select second set adjust ordering operation 22C2 to generate a second information table $39_2$ with second set adjusted ordering, the second set adjust ordering operation 22C2 is to make the storing address of every parameter in the second information table 39 rotate left by 2 words or 2 unit word length of parameter, the original addresses of parameters stored in the second information table 39 is shown in FIG. 3, and after made to rotate left by 2 words can be shown as: $5E0_H$, $5F0_H$, . . . , $5C0_H$, and $5D0_H$, then the cash card use state[15:0] is stored at $480_H$, the cash card getting on station[15:0] is stored at $490_H$, thus the second information table $39_2$ with second set adjusted ordering is generated. In another better embodiment, the method of adjust ordering operation can be used in the adjust table 22C including rotate left or right by 1, or other number, or 0 blocks, also including other logic operations, for example, perform swap or bit reversal operation on a few number of parameters. Still in another better embodiment, the second password mask 22A1 can be other specific values, the TIPS 22 can extract 1~N specific bits from the tag serial number 313 as adjust control signals, then the adjust table 22C may include 21-2N sets of adjust ordering operation. Still in another better embodiment, the tag memory is divided into memory sectors and blocks, the adjust table 22C includes at most 2N sets of arithmetic, logic, and/or displacement operation for adjusting the address pointer, including making the data set in the information table rotate left, rotate right, swap, or move to different memory sector or block.

In FIG. 8, the first adjust ordering operation 22C1, second adjust ordering operation 22C2, . . . and 16th adjust ordering operation 22C1 further include different data set storing rule, for example, when storing the cash card balance, cash card use state, cash card getting on station, cash card store category, cash card merchant serial number, . . . , savings account number, stores the data set with odd memory address first ($480_H$~$48F_H$, $4A0_H$~$4AF_H$, $4C0_H$~$4CF_H$, . . . , $5E0_H$~$5EF_H$), and then stores the data set with even memory address ($490_H$~$49F_H$, $4B0_H$~$4BF_H$, $4D0_H$~$4DF_H$, . . . , $5F0_H$~$5FF_H$).

Figure 9:
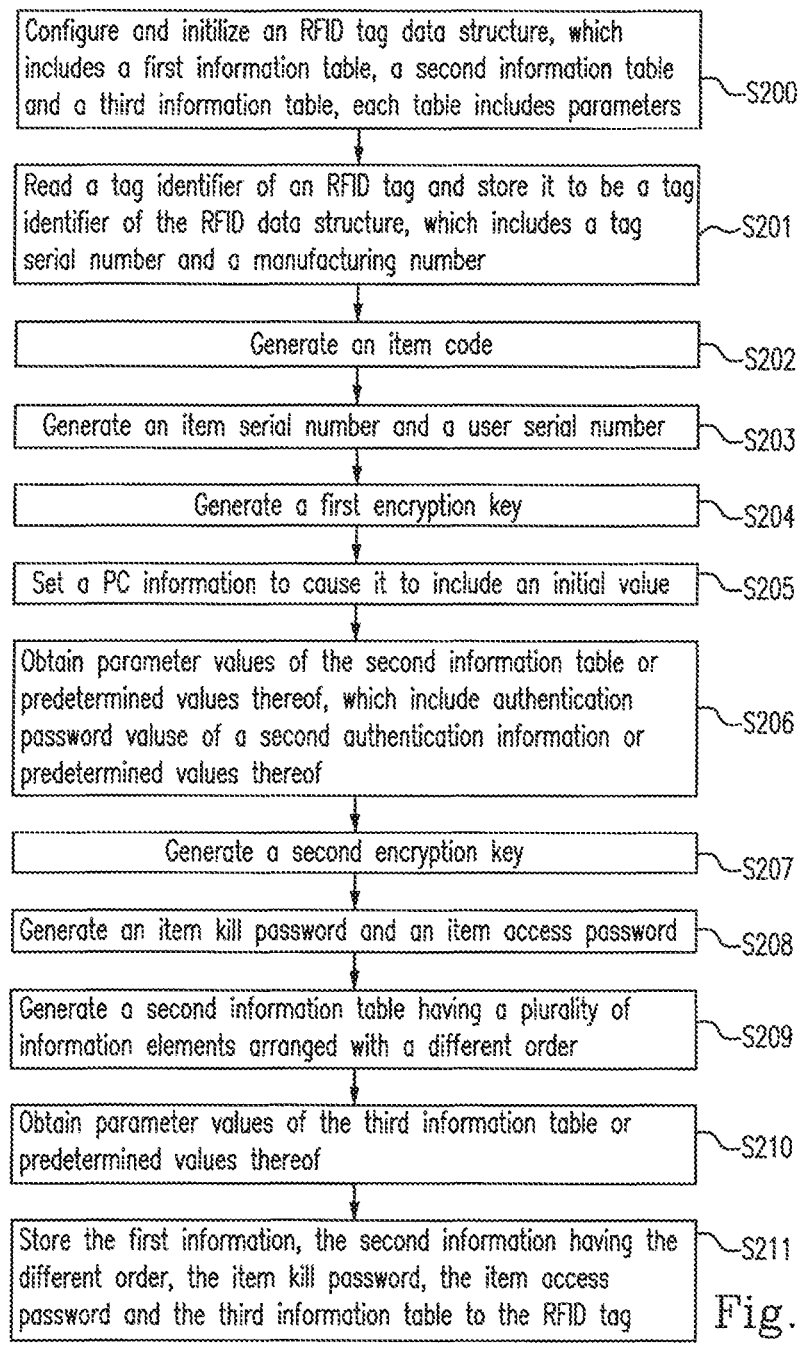
FIG. 9 is a functional diagram showing a method of the RFID TIPS used in the RFID information system to determine an item information table in an RFID tag for a user according to various embodiments of the present disclosure.

Please refer to FIG. 9, which is a functional diagram showing a method of the RFID TIPS 22 used in the RFID information system 1 to determine an item information table 33 in an RFID tag 3 for a user according to various embodiments of the present disclosure. Please refer to FIG. 3, and FIG. 5 to FIG. 9 at the same time, the RFID IS 1 includes a RFID AS 2 and an RFID tag 3, the RFID tag 3 includes a tag identifier 31 and a tag memory 34, the tag memory 34 is divided into memory sectors and blocks, the RFID AS 2 includes a RFID TIPS 22, the TIPS 22 allocates an RFID tag data structure T30 and a set of system constants in its working memory, the set of system constants includes first password mask 2271, second password mask 22A1, word length of the first information table, word length of the second information table, word length of the third information table, hash table 229, and adjust table 22C, the RFID tag data structure T30 includes RM block 3B, TID block 3C, UII block 3D, and UM block 3E, the UII block 3D includes a first memory block 36 and a second memory block 38, the UM block 3E can be a third memory block 3G, the TID block 3C includes a tag identifier 31, the tag identifier 31 includes a tag serial number 313 and a manufacturing identifier 314, the RFID tag data structure T30 stores an item information table 33 which includes first information table 35, second information table 37, third information table 3E0, item kill password 3B1, and item access password 3B2, the first memory block 36 stores the first information table 35, the second memory block 38 stores the second information table 37, the UM block 3E stores the third information table 3E0, the first information table 35 includes first authentication information 350, first encrypted key 352, first other information 354, the first authentication information 350 includes item code 357, user serial number 355, the first encrypted key 352 includes an encrypted second sub-information 353, the first other information 354 includes item serial number 358 and first PC information 351, the second information table 37 includes second authentication information 371, second encrypted key 370, second other information 372, the second authentication information 371 includes savings account password 375, counter service password 377, cash card balance 379, and credit account password 37A, the second encrypted key 370 includes an encrypted third sub-information 373, the second other information 372 includes savings account number 374, credit account number 376, and cash card information 378, wherein the item code 357 includes RFID business sub-code, RFID device sub-code, RFID selecting enable function sub-code, RFID function sub-code, and RFID deployment country sub-code, the item serial number 358 includes code number generated according to sub-code including organization, in an embodiment, the third information table 3E0 includes a transfer account table 3E1, in a better embodiment, the third information table 3E0 includes a RFID access control table 3E2, a receiving brief message phone number table 3E3, or a combination of the above, the method of building the item information table 33 by RFID TIPS 22 includes the following steps. RFID TIPS 22 allocates an RFID tag data structure and a set of system constants in its working memory, which includes an item information table 33 and the parameters used in the item information table 33, the item kill password 3B1, and the item access password 3B2, the item information table 33 includes the first information table 35, the second information table 37, and the third information table 3E0 (S200).

RFID TIPS 22 reads the tag identifier 31 of the RFID tag 30 and storing it in the tag identifier 31 of the RFID tag data structure T30, which includes a tag serial number 313 and a manufacturer identifier 314 (S201). RFID TIPS 22 creates the item code 357 according to its sub-codes including RFID business sub-code, RFID device sub-code, RFID selecting enable function sub-code, RFID function sub-code, and RFID deployment country sub-code for user (S202). RFID TIPS 22 creates the item serial number 358 and the user serial number 355 according to sub-code including organization for a RFID business sub-code for user (S203). RFID TIPS 22 creates the first encrypted key 352 by encrypting the user serial number 355, the tag serial number 313 and the second sub-information 353, which includes setting the second sub-information 353, in a better embodiment, the second sub-information 353 is 24 (S204). RFID TIPS 22 sets the first PC information 351 to include a system initial value, which indicates the length of the first information table, in a better embodiment, the word length of the first information table is 7 (S205). RFID TIPS 22 obtains parameter values or their default values in the second information table 37 which includes savings account number 374 and credit account number 376, also obtains authentication password values or their default values in the second authentication information 371 which includes savings account password 375 used at an aATM, credit account password 37A used at an aATM, and counter service password 377 used at the bank counter, the parameter values including signal values of the start control table (S206). RFID TIPS 22 creates the second encrypted key 370 by encrypting the tag serial number 313 and the third sub-information 373, the third sub-information 373 is word length of the third information table 3E0, in a better embodiment, the second encrypted key 370 can be replaced by a receiving brief message phone number 370 (S207). RFID TIPS 22 creates the item kill password 3B1 and the item access password 3B2 according to the tag serial number 313, the first password mask 2271, and the hash table 229 (S208). RFID TIPS 22 creates a second information table 39N with parameter values stored in different ordering by obtaining a set of adjust ordering operation to adjust the parameter ordering in the second information table 39 according to the tag serial number 313, the second password mask 22A1, and the adjust table 22C (S209). RFID TIPS 22 obtains parameter values or their default values in the third information table 3E0, which includes obtaining a transfer account table 3E1 or its default value, in a better embodiment, which includes obtaining a RFID access control table 3E2, or a receiving brief message phone number table with 00000000$_H$ as default values, or a combination of the above (S210). RFID TIPS 22 stores the first information table 35, the second information table 37, the third information table 3E0, the item kill password 3B1, and the item access password 3B2 from the RFID tag data structure T30 into the RFID tag 3 (S211).

Figure 10:
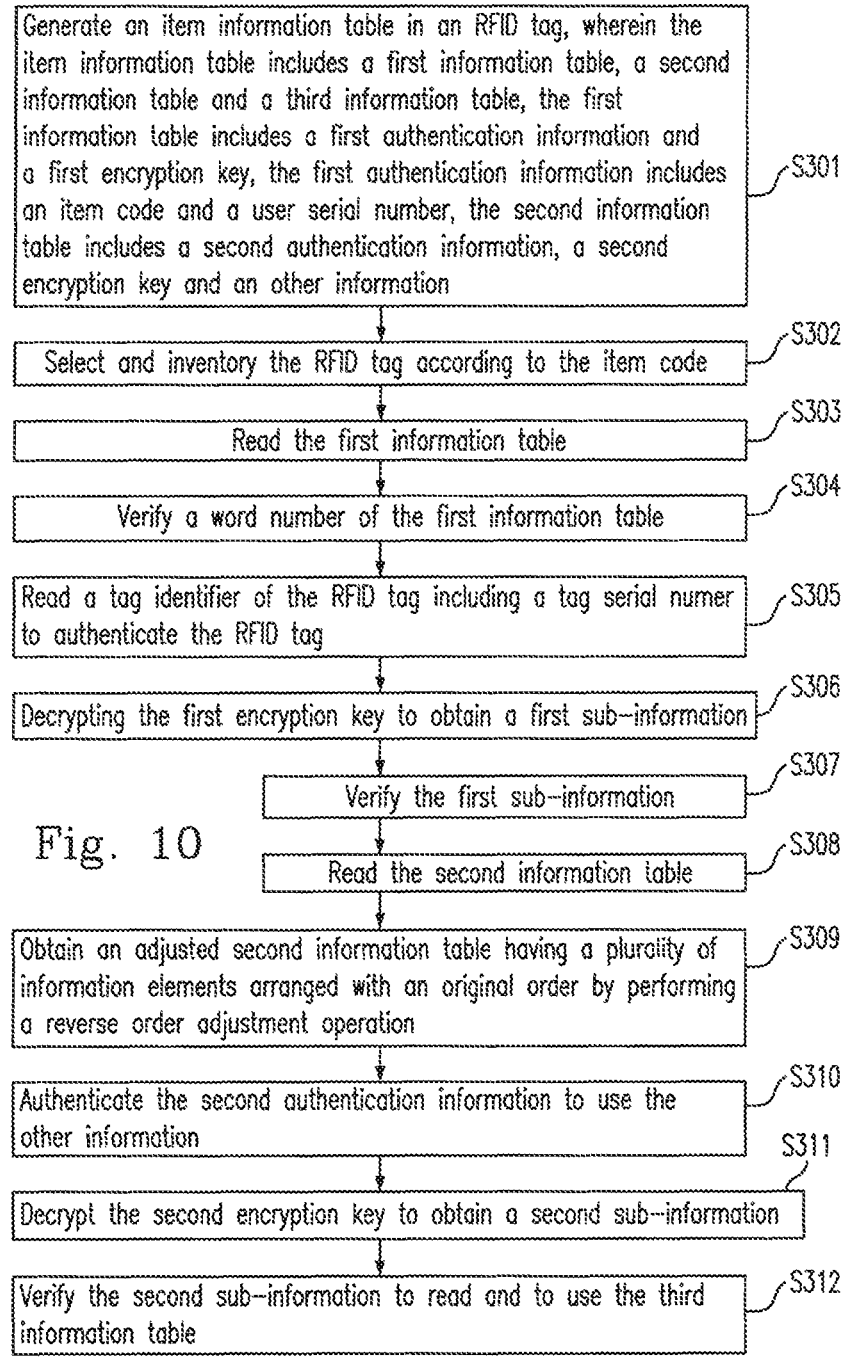
FIG. 10 is a functional diagram showing a method of the RFID TIPS used in the RFID information system to authenticate an RFID tag by using encryption keys according to various embodiments of the present disclosure.

Please refer to FIG. 10, which is a functional diagram showing a method of the RFID TIPS 22 used in the RFID information system 1 to authenticate an RFID tag 3 by using encryption keys 352 and 370 according to various embodiments of the present disclosure. Please refer to FIG. 3, FIG. 5~FIG. 8, and FIG. 10 at the same time, the RFID IS 1 includes a RFID AS 2 and an RFID tag 3, the RFID tag 3 includes a tag identifier 31 and a tag memory 34, the tag memory 34 is divided into memory sectors and blocks, the RFID AS 2 includes a RFID TIPS 22, which includes a set of system constants, the set of system constants includes first password mask 2271, second password mask 22A1, word length of the first information table, word length of the second information table, word length of the third information table, and adjust table 22C, the method shown in FIG. 10 includes the following steps. RFID TIPS 22 has an item information table 33 built in the RFID tag 3, the item information table 33 includes first information table 35, second information table 39N, and third information table 3E0, wherein the first information table 35 includes first authentication information 350, first encrypted key 352, and first other information 354, the first authentication information 350 includes item code 357, and user serial number 355, the first other information 354 includes item serial number 358 and first PC information 351, wherein the item code 357 includes sub-codes including RFID business sub-code, RFID device sub-code, RFID selecting enable function sub-code, RFID function sub-code, and RFID deployment country sub-code, the second information table 39N includes second authentication information 371, second encrypted key 370, second other information 372, the second authentication information 371 includes savings account password 375, counter service password 377, cash card balance 379, and credit account password 37A (S301). RFID TIPS 22 selects and inventories the RFID tag 3 based on the item code 357 which includes sub-codes including RFID business sub-code, RFID device sub-code, RFID selecting enable function sub-code, RFID function sub-code, and RFID deployment country sub-code (S302). RFID TIPS 22 reads the first information table 35 (S303). RFID TIPS 22 verifies word number of the first information table 35 being equal to the word length of the first information table (S304). RFID TIPS 22 reads the tag identifier 31 which includes a tag serial number 313 and a manufacturer identifier 314 (S305). RFID TIPS 22 decrypts the first encrypted key 352 by using the tag serial number 313 and the user serial number 355 to obtain a second sub-information 353 (S306). RFID TIPS 22 verifies the second sub-information 353 being equal to the word length of the first information table to authenticate the RFID tag 3 for anti-counterfeiting and belonging to the same system as the RFID tag 3 (S307). RFID TIPS 22 reads the second information table 39N based on the second sub-information 353 (S308). RFID TIPS 22 gets a set of unadjust ordering operation by using the tag serial number 313, the second password mask 22A1 and the adjust table 22C and obtains the original second information table 37 by performing the set of unadjust ordering operation (S309). RFID TIPS 22 authenticates the second authentication information 371 for using the second other information 372 (S310). RFID TIPS 22 decrypts the second encrypted key 370 by using the tag serial number 313 to obtain a third sub-information 373 which indicates the word length of the third information table 3E0, in a better embodiment, the second encrypted key 370 is replaced by a receiving brief message phone number 370, then the third sub-information 373 indicates a system default value (S311). In an embodiment, RFID TIPS 22 verifies the third sub-information 373 before reading and using the third information table 3E0, in a better embodiment, RFID TIPS 22 then just reading and using the third information table 3E0 (S312).

Figure 11:
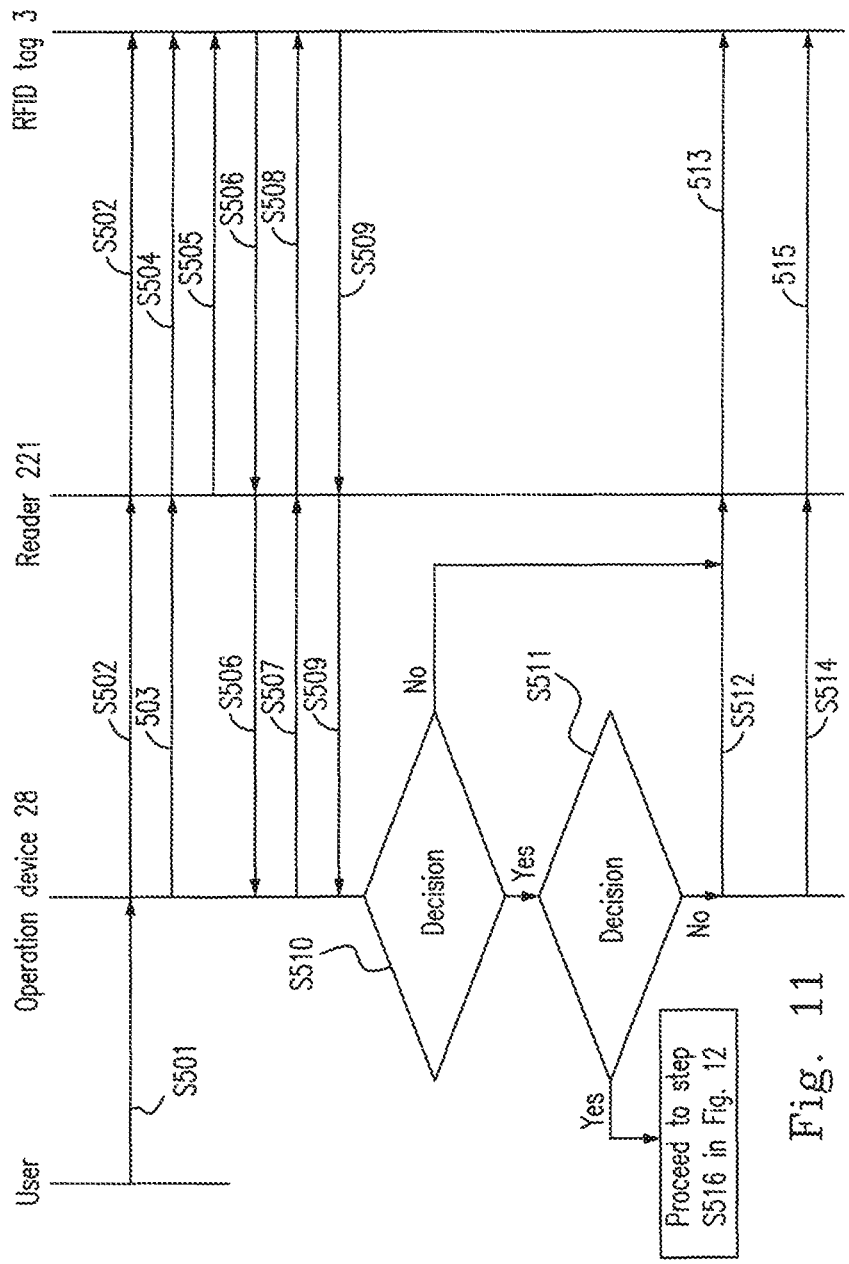
FIG. 11 and FIG. 12 are message flow diagrams showing an authenticating method of the RFID TIPS to authenticate the RFID tag according to various embodiments of the present disclosure.
Figure 12:
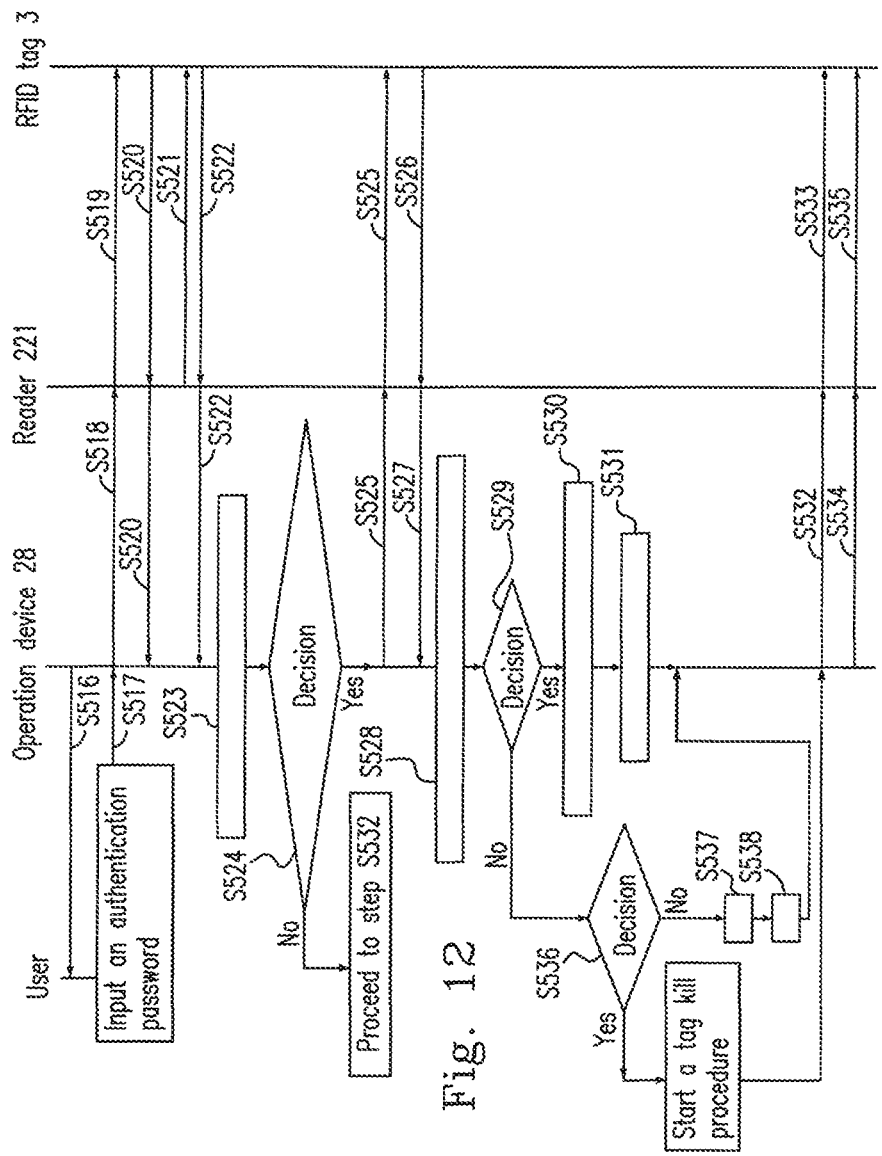

Please refer to FIG. 11 and FIG. 12, which are message flow diagrams showing an authenticating method of the RFID TIPS 22 to authenticate the RFID tag 3 according to various embodiments of the present disclosure. FIG. 11 shows a portion of the authenticating method, and FIG. 11 shows the other portion of the authenticating method. As shown in FIG. 11, at a specific time, a user uses a finance credit cash authentication card at bank for a savings account transaction. A bank teller has already started a local computer 222 which includes accessing a network environment, setting a RFID environment, and setting a set of system constant values, the set of system constant values includes local computer type (CompType), length of first information table, length of second information table, maximum compare failed count, hash table 229, and adjust ordering table 22C, in an embodiment, the CompType is set to "counter service computer", the bank teller has also started the RFID TIPS 22. Please refer to FIG. 1, FIG. 3 and FIG. 11 at the same time, the method includes the following steps. User presents an authentication card which includes an RFID tag 3 (S501). The RFID TIPS 22 starts the reader 221, and using an instruction Select to select an RFID tag through the reader 221 based on the item code 357 which includes sub-codes including RFID business sub-code, RFID device sub-code, RFID selecting enable function sub-code, RFID function sub-code, and RFID deployment country sub-code, in an embodiment, the set Select criteria is a finance credit cash authentication card for finance business with RFID function enabled including passive UHF long read distance, in a better embodiment, using an instruction Select to select an RFID tag in other RFID business field, the set Select criteria is a finance credit cash authentication card for access control business with RFID function enabled including passive HF short read distance (S502). The RFID TIPS 22 uses an instruction Inventory to initiate a new round for searching RFID tag (S503). In an embodiment, the reader 221 uses Query command to look for authentication card device which includes a UHF RFID tag, in a better embodiment, the reader 221 uses BeginRound command to look for authentication card device which includes a HF RFID tag (S504). In an embodiment, the reader 221 uses QueryRep command to request a query report if the authentication card device includes a UHF passive long read range RFID tag, in a better embodiment, the reader 221 uses NewSlot command to request a query report if the authentication card device includes a HF passive short read range RFID tag (S505). The selected RFID tag 3 met the Select criteria sends back an inspection code RN1 which is received by the RFID TIPS 22 through the reader 221, in an embodiment, the inspection code RN1 is a 16 bit random or pseudo-random number RN161, in a better embodiment, the inspection code RN1 is a 16 bit checksum StoredCRC which is stored in the RFID tag 3 (S506). The RFID TIPS 22 reads information in the RFID tag 3 by appending the inspection code RN1 (S507). The reader 221 uses the same inspection code RN1 to acknowledge the RFID tag 3 (S508).

After ensuring the received inspection code RN1 is the same as first sent, the RFID tag 3 sends back the first information table 35 according to first PC information 351 which indicates a memory block RB1, and is received by the RFID TIPS 22 through the reader 221, the first information table 35 includes item code 357, item serial number 358, user serial number 355, first encrypted key 352, first PC information 351, and checksum code CRC (S509). The RFID TIPS 22 verifies "word number of the first information table 35"="the length of first information table"? in a better embodiment, the length of first information table is 7, if it is false, indicating an exception occurred, then proceeds with step S512, if it is true, indicating the verification passed, then proceeds with step S511 (S510). The RFID TIPS 22 ensures both the RFID tag 3 and the RFID TIPS 22 belong to the same system by verifying item code 357, item serial number 358, and user serial number 355 in the first information table 35? If the verification is failed, then proceeds with step S512 to end the communication dialog, if the verification is passed, then continues with the authentication method shown in FIG. 12 (S511). The RFID TIPS 22 ends the communication dialog with the RFID tag 3 (S512). The reader 221 continues to select next RFID tag (S513). RFID TIPS 22 disconnects the communication link to the reader 221 (S514). The reader 221 disconnects the RF power (S515).

Please refer to FIG. 12, which is a continuation of FIG. 11. Please refer to FIG. 1~FIG. 3, and FIG. 12 at the same time, the method includes the following steps. The RFID TIPS 22 asks user to enter an authentication password through a numeric key pad 223, this is to authenticate second authentication information 371 (S516). In the meantime, bank teller asks user to present a credentials with user's personal identifier on it for a following comparison (S517). The RFID TIPS 22 issues instruction to read the tag identifier 31 (S518). The reader 221 sends a request to the RFID tag 3 for a new random or pseudo-random number by appending the inspection code RN1 to a Req_RN command (S519). After ensuring the received handle RN1 being the same as first sent, the RFID tag 3 sends back a random code RN2 to the reader 221, and is received by the RFID TIPS 22, as a handle for the following communication dialog, the random code RN2 is a 16-bit random or pseudo-random number RN162 (S520). The reader 221 reads the tag identifier 31 of the RFID tag 3 by appending the handle to the Read command (S521). After ensuring the received handle RN2 being the same as first sent, the RFID tag 3 sends back the tag identifier 31 by appending the handle RN2, and is received by the RFID TIPS 22, the tag identifier 31 includes a tag serial number 313 and a manufacturing identifier 314 (S522). The RFID TIPS 22 decrypts the first encrypted key 352 by using the tag serial number 313 and the user serial number 355 to obtain the second sub-information 353, which is the word length of the second information table 37 (S523). The RFID TIPS 22 verifies "the second sub-information 353"="the length of the second information table"? If it is false, then proceeds with step S532 to end the communication dialog, if it is true, then continues with step S525 (S524). The RFID TIPS 22 reads the second information table 39N in the RFID tag 3 through the reader 221 by appending the handle RN2 (S525). After ensuring the received handle RN2, the RFID tag 3 sends back the second information table 39N in the second memory block 38 to the reader 221 by appending the handle RN2 (S526). The RFID TIPS 22 receives the second information table 39N which was generated by a set of adjust ordering operation in FIG. 8 (S527). The RFID TIPS 22 gets a set of unadjust ordering operation by using the tag serial number 313, the second password mask 22A1 and the adjust table 22C, and obtains the original second information table 39 by performing the set of unadjust ordering operation, the second information table 39 includes second encrypted key 370 and second authentication information 371, the second authentication information 371 includes savings account password 375, counter service password 377, cash card balance 379, and credit account password 37A (S528). The RFID TIPS 22 Selects an authentication information from the second authentication information 371 according to the setting of CompType, the CompType includes aATM, counter service computer, workstation, or smart cashier, in a better embodiment, the CompType is set to "counter service computer", the local computer 222 will select the counter service password 377 from the second authentication information 371 as the authentication information according to the CompType, and then compares "the authentication information"="user entered authentication password" ? If it is false, then proceeds with step S536, if it is true, then proceeds with step S530 (S529). The RFID TIPS 22 uses the received second information table 39, which corresponds to the information stored at the tag memory address $480_H$~$5FF_H$ in FIG. 3, in a better embodiment, for example, the RFID TIPS 22 makes connection with a common database device 4 through network connecting device 5 and internet 6 by using the savings account number 374, and after the verification as being a database user is passed, then reads the account information of the savings account number 374, which includes information such as user's personal identifier, account name, birthday, address, contact person for emergency, telephone number, and email address, in order for bank teller to verify the status of user who presented the RFID tag 3 (S530). After passing verifying the status of user successfully, the RFID TIPS 22 then proceeds with a following deposit, withdraw, or transfer transaction, and records the transaction in the database device 4 after the transaction is completed, then proceed with step S532 (S531). The RFID TIPS 22 ends the communication dialog with the RFID tag 3 (S532). The reader 221 continues to select next RFID tag (S533). The RFID TIPS 22 disconnects the communication link to the reader 221 (S534). The reader 221 disconnects the RF power (S535). The RFID TIPS 22 checks "compare failed count 37E"≥"maximum compare failed count" ? If it is true, then proceeds with step S539, if it is false, then proceeds with step S537 (S536). The RFID TIPS 22 increments the compare failed count 37E by 1, and stores the result in a temporary register Areg (S537). The RFID TIPS 22 gets memory address after the adjust ordering operation of the compare failed count 37E, and uses that memory address in the RFID tag 3 to store the value in the temporary register Areg, then proceeds with step S532 to end the communication dialog with the RFID tag 3 (S538). RFID TIPS 22 Starts a tag kill procedure, lest the system should be intruded by an external smart attack, and then proceeding with step S532 (S539).

Figure 13:
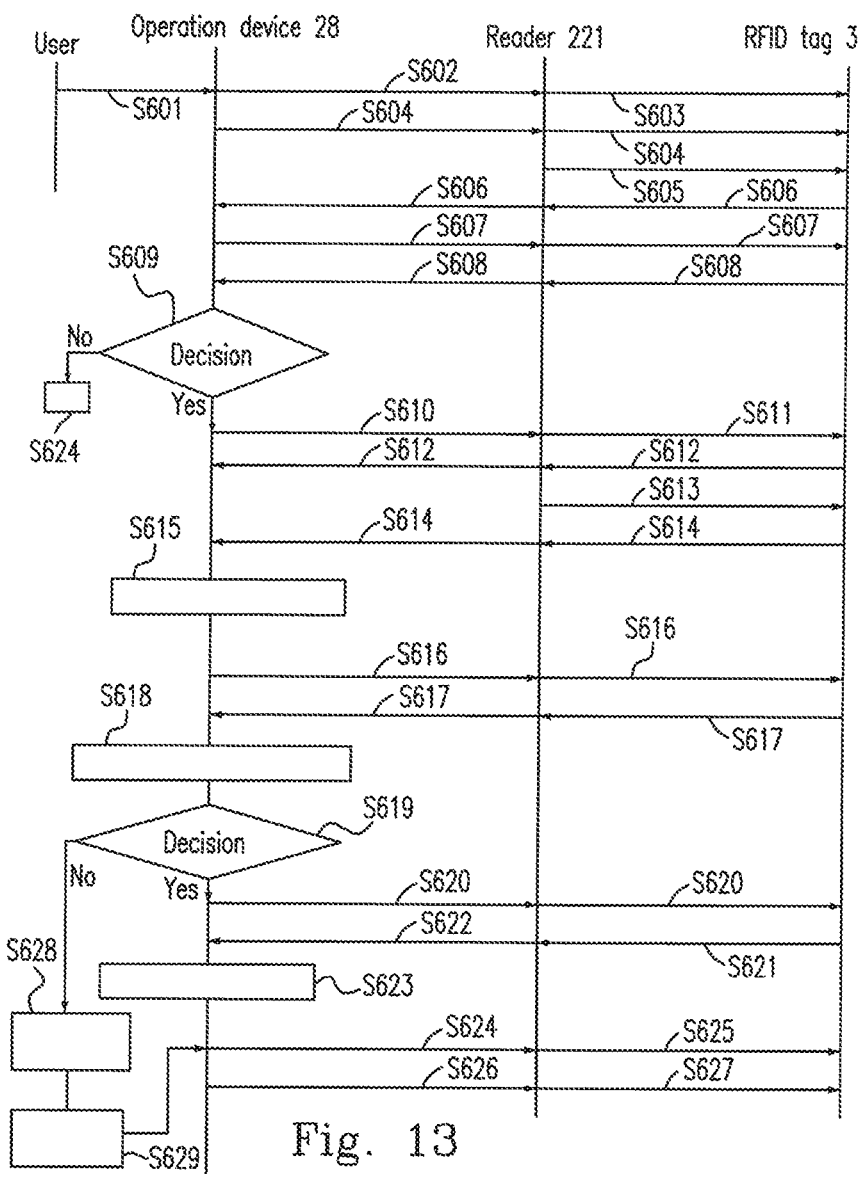
FIG. 13 is a message flow diagram showing an authenticating method of the RFID TIPS used in toll collecting according to various embodiments of the present disclosure.

Please refer to FIG. 13, which is a message flow diagram showing an authenticating method of the RFID TIPS 22 used in toll collecting according to various embodiments of the present disclosure. In an embodiment provided, user uses a finance credit cash authentication card hung in a vehicle or placed in a slot which is attached to the vehicle for paying a toll, while the vehicle is passing through a toll collecting driveway (not shown), a driveway warden has started a local computer 222 which includes accessing a local computer network environment, accessing a RFID environment, and setting a set of system constant values, the set of system constant values includes CompType which is set to "smart cashier", length of first information table, length of second information table, maximum compare failed count, hash table 229, and adjust ordering table 22C, the driveway warden has also executed the RFID TIPS 22. As shown in FIG. 13, the method includes the following steps. User presents a finance credit cash authentication card to RFID TIPS 22 by having the card hung in a vehicle or placed in a slot which is attached to the vehicle, made the card facing the moving direction of the vehicle and fixed in the slot with ability of being adjusted minutely to turn right and left by an angle such as 45°, or tilt up by such as 45°, in order for RFID TIPS 22 to communicate with the card (S601). RFID TIPS 22 starts the reader 221, and sets a criteria to select an RFID tag according to the sub-codes of item code 357 which includes RFID business sub-code, RFID device sub-code, RFID selecting enable function sub-code, RFID function sub-code, and RFID deployment country sub-code, in an embodiment, the criteria set is a finance credit cash authentication card for finance business with RFID function enabled including passive UHF long read distance, in a better embodiment, the criteria set is a finance credit cash authentication card for access control business with RFID function enabled including passive HF short read distance (S602). The reader 221 sends out the criteria to select RFID tag 3 (S603). RFID TIPS 22 initiates a new round for searching RFID tag through reader 221 (S604). The reader 221 sends out command to request a query report (S605). The selected RFID tag 3 met the Select criteria sends back an inspection code RN3 which is received by the RFID TIPS 22 through the reader 221, in an embodiment, the inspection code RN3 is a 16 bit random or pseudo-random number RN163 (S606). RFID TIPS 22 reads information in the RFID tag 3 through the reader 221 by appending the same inspection code RN3 to acknowledge the RFID tag 3 (S607).

After ensuring the received inspection code RN3 is the same as first sent, the RFID tag 3 sends back the first information table 35 in first memory block 36 according to first PC information 351 which indicates a memory block RB1, which is received by the RFID TIPS 22 through the reader 221, the first information table 35 includes item code 357, item serial number 358, user serial number 355, first PC information 351, first encrypted key 352, and checksum code CRC (S608). The RFID TIPS 22 verifies "word number of the first information table 35"="the length of first information table"? if it is false, indicating an exception occurred, then proceeds with step S624, if it is true, indicating passed the verification, then proceeds with step S610, in a better embodiment, the length of first information table is 7 (S609). The RFID TIPS 22 issues instruction to read the tag identifier 31 (S610). The reader 221 sends a request to the RFID tag 3 for a new random or pseudo-random number by appending the inspection code RN3 to a Req_RN command (S611). After ensuring the received handle RN3 is the same as first sent, the RFID tag 3 sends back a random code RN4 to the reader 221, which is received by the RFID TIPS 22 as a handle of the following communication dialog, the random code RN4 is a 16-bit random or pseudo-random number RN164 (S612). The reader 221 reads the tag identifier 31 of the RFID tag 3 by appending the handle RN4 to the Read command (S613). After ensuring the received handle is the same as first sent, the RFID tag 3 sends back the tag identifier 31 by appending the handle RN4, which is received by the RFID TIPS 22, the tag identifier 31 includes a tag serial number 313 and a manufacturing identifier 314 (S614).

The RFID TIPS 22 decrypts the first encrypted key 352 by using the tag serial number 313 and the user serial number 355 to obtain the second sub-information 353, if "the second sub-information 353"="the length of the second information table", then the selected RFID tag 3 is ensured not a counterfeit tag, and belongs to the same system as the RFID TIPS 22 (S615).

The RFID TIPS 22 reads the second information table 39N in the RFID tag 3 through the reader 221 by appending the handle RN4 (S616). After ensuring the received handle RN4, the RFID tag 3 sends back the second information table 39N to the reader 221 by appending the handle RN4, which is received by the RFID TIPS 22, the second information table 39N was generated by a set of adjust ordering operation in FIG. 8 (S617).

The RFID TIPS 22 gets a set of unadjust ordering operation by using the tag serial number 313, the second password mask 22A1 and the adjust table 22C, and obtains the original second information table 39 by performing the set of unadjust ordering operation, the second information table 39 includes second encrypted key 370 and second authentication information 371, the second authentication information 371 includes a cash card balance 379 (S618). The RFID TIPS 22 derives an after fees paid cash card balance by subtracting the expense amount from the cash card balance 379, and then verifies the fees paid cash card balance≥0? If it is false, then proceeds with step S628, if it is true, then treating it as passing the comparing password successfully, and proceeds with step S620 (S619). The RFID TIPS 22 gets adjusted memory address of the cash card balance 379 after the adjust ordering operation, and stores the fees paid cash card balance at the adjusted memory address in the RFID tag 3 through the reader 221 by appending the handle RN4 (S620). After ensuring the received handle RN4, the RFID tag 3 uses the fees paid cash card balance to update the cash card balance 379, after the update is done successfully, then sends the handle RN4 to the reader 221 (S621). The reader 221 indicates the cash card balance 379 has been updated successfully (S622). The RFID TIPS 22 records the successful toll collecting event into database device 4 which includes the credit account number, date time, cash card balance, and toll amount, and executes an after the expense amount successfully deducted procedure, which includes sending a brief message or email to the receiving brief message phone number 370 as a proof of the transaction, in an embodiment, a RFID automated driveway management system can be used to open a gate at a long distance, and display or broadcast a passing through message in real time, in a better embodiment, a RFID automated power management system can be used to start a game machine (S623). The RFID TIPS 22 ends the communication dialog with the RFID tag 3 (S624). The reader 221 continues to select next RFID tag (S625). The RFID TIPS 22 disconnects the communication link to the reader 221 (S626). The reader 221 disconnects the RF power (S627). The RFID TIPS 22 displays insufficient cash card balance 379 on the display unit 225 (S628). The RFID TIPS 22 records the transaction in database device 4, and executes an after the expense amount unsuccessfully deducted procedure, in an embodiment, a RFID automated driveway management system can be used to display or broadcast a not passing through message in real time, in a better embodiment, an automated optical character recognition (OCR) system can be used for obtaining a license plate number of the vehicle, and record unsuccessful toll collecting event into database device 4, which includes the license plate number, the credit account number, date time, cash card balance, and insufficient toll amount, for sending next period account statement to the user, and proceeds with step S624, in a better embodiment, the RFID automated driveway management system can advance a fixed amount of cash from user's credit account number 376 through a cash advance procedure, and add the fixed amount into the cash card balance 379, also send a brief message or email to the receiving brief message phone number 370 as a proof, and proceeds with step S619 for toll collecting process again (S629).

Figure 14:
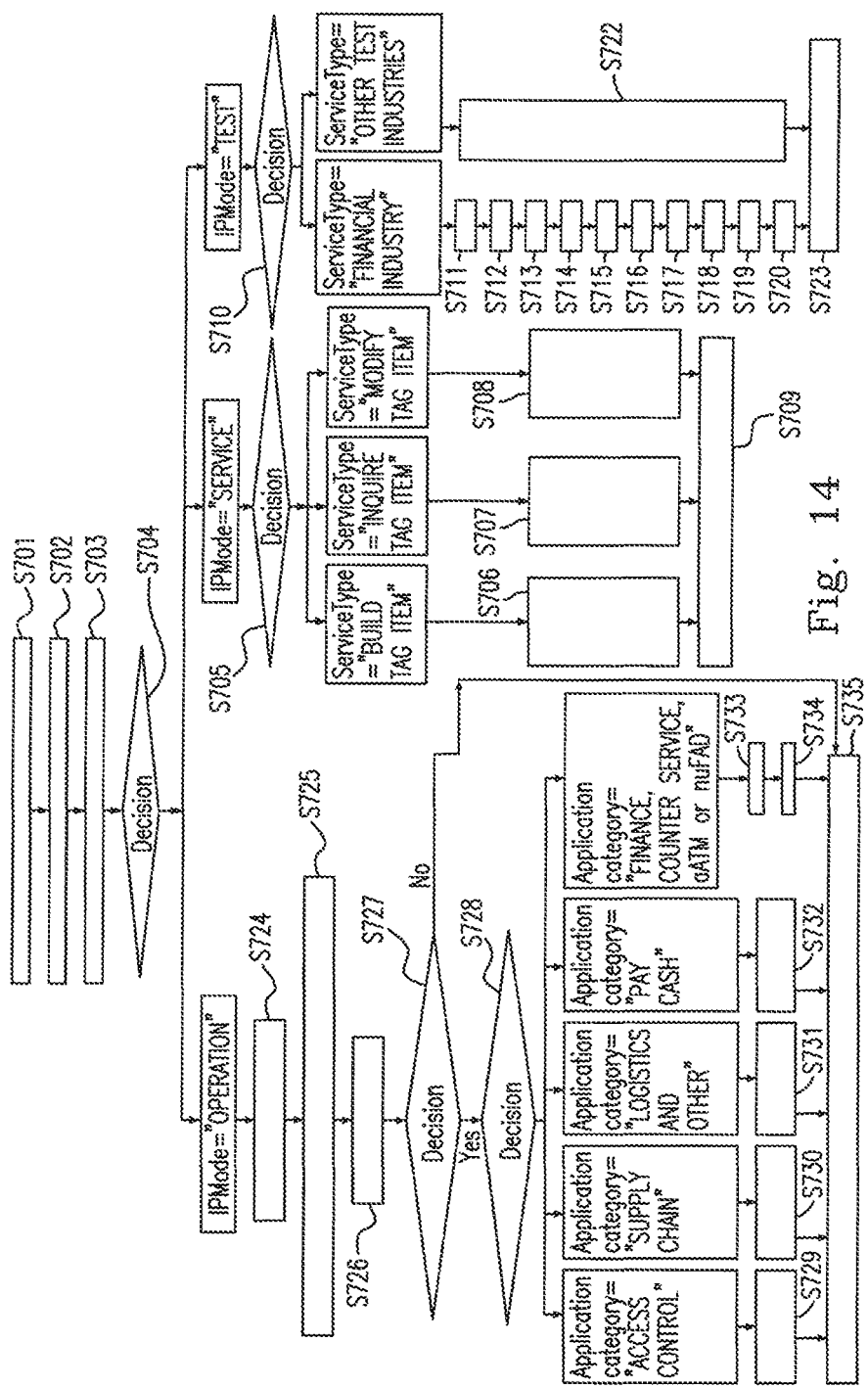
FIG. 14 is a functional diagram showing a method of RFID TIPS used in the RFID information system according various embodiments of the present disclosure.

FIG. 14 is a functional diagram showing a method of RFID TIPS 22 used in the RFID information system 1 according various embodiments of the present disclosure. The RFID IS 1 includes a RFID AS 2 and an RFID tag 3, the RFID tag 3 includes a tag identifier 31, the RFID AS 2 includes a RFID TIPS 22 which includes a reader 221, a local computer 222, a numerical key pad 223, and a display unit 225. As shown in FIG. 14, the method of using RFID TIPS 22 includes the following steps. The tag item operating system of local computer 222 is started (S701). Then establishing the connection of local computer 222, accessing a local computer network environment, accessing a RFID environment, and setting a set of system constant values are executed, wherein establishing the connection of local computer 222 includes connecting the local computer by way of cabling, radio link, or both cabling and radio link to internet and mobile radio network through an internet service provider for accessing a common database device 4, and sending a brief message or email, the local computer network environment includes name of the local computer 222, or its code number, and its internet address, name of the other computer, or its code number, and its internet address, name of the database device 4, or its code number, and its internet address, the RFID environment includes location serial number of the reader 221 and its session number, channel band, connecting frequency, pulse width, modulation mode, bit transmitting speed, and antenna port number, each port location serial number and each port transmit power level, the setting a set of system constant values includes setting a set of internal parameter values and a set of exterior parameter values, the set of internal parameter values includes a local computer type (CompType), which includes pay cash, smart cashier, counter service computer, workstation, aATM, nuFAD, logistics, supply chain, access control, item level tracking, transportation, technology, and system reserved uses, the set of exterior parameter values includes item processing mode (abbr. IPMode), item service type (abbr. ServiceType), item test type (abbr. TestType), first password mask, second password mask, length of first information table, length of second information table, length of third information table, maximum compare failed count, AuthenticationType, hash table 229, and adjust ordering table 22C, wherein the IPMode includes item operation (abbr. OPERATION), item service (abbr. SERVICE), and item test (abbr. TEST), the ServiceType includes build tag item, inquire tag item, and modify tag item (S702). RFID TIPS 22 is started to verify the local computer network environment including a database device 4 (S703). The RFID TIPS 22 selects item processing mode according to the setting of IPMode=? When IPMode="OPERATION", then proceeds with step S724, when IPMode="TEST", then proceeds with step S710, when IPMode="SERVICE", then proceeds with step S705 (S704). The RFID TIPS 22 selects service type according to the setting of ServiceType=? When ServiceType="modify tag item", then proceeds with step S708, when ServiceType="inquire tag item", then proceeds with step S707, when ServiceType="build tag item", then proceeds with step S706 (S705). The RFID TIPS 22 performs a build tag item processing procedure which includes building an item information table in a new RFID tag memory based on the RFID business sub-code of item code 357 and item serial number 358, recording the event, and then proceeding with step S709 to end the communication dialog (S706). The RFID TIPS 22 performs a inquire tag item processing procedure which includes inquiring an item information table in an RFID tag based on item code 357 and item serial number 358, recording the event which includes sending a brief message or email to a receiving brief message phone number 370, and then proceeding with step S709 to end the communication dialog (S707). The RFID TIPS 22 performs a modify tag item processing procedure which includes modifying an item information table in an RFID tag based on item code 357 and item serial number 358, recording the event which includes sending a brief message or email to a receiving brief message phone number 370 (S708). The RFID TIPS 22 ends the communication dialog with the RFID tag 3 (S709).

As shown in FIG. 14, the method of using RFID TIPS 22 further includes the following steps. The RFID TIPS 22 selects a TestType according to the RFID business sub-code of item code 357, the TestType includes financial industry and other test industries, the other test industries include access control, supply chain, logistics, item level tracking, transportation, technology, and system reserved uses, when TestType="financial industry", then proceeds with step S711 to perform financial industry item processing procedure, when TestType="other test industries", then proceeds with step S722 to perform other test industry item processing procedure (S710). The RFID TIPS 22 starts the reader (S711). The RFID TIPS 22 executes testing of building an item information table in an RFID tag (S712). The RFID TIPS 22 executes testing of reading the item information table (S713). The RFID TIPS 22 executes testing of modifying the item information table (S714). The RFID TIPS 22 executes testing of authenticating the RFID tag for anti-counterfeiting (S715). The RFID TIPS 22 executes testing of comparing the authentication password (S716). The RFID TIPS 22 executes testing of adjust ordering of an information table (S717). The RFID TIPS 22 executes testing of unadjust ordering of an information table (S718). The RFID TIPS 22 executes testing to pay cash by the cash card balance and select its monetary base (S719). The RFID TIPS 22 executes testing of generating a test report (S720). The RFID TIPS 22 builds and tests an item information table in an RFID tag according to the RFID business sub-code of item code 357 and item serial number 358, and records the event, and then proceeds with step S723 (S722). The RFID TIPS 22 ends the communication dialog with the RFID tag (S723).

As shown in FIG. 14, the method of using RFID TIPS 22 further includes the following steps. The RFID TIPS 22 starts the reader 221 including setting the RFID environment (S724). The RFID TIPS 22 reads an RFID tag 3 by sending select, inventory and query report instructions according to item code 357, in an embodiment, the RFID tag 3 is a finance credit cash authentication card for finance business with RFID function enabled including passive UHF long read distance, in a better embodiment, the RFID tag 3 is a finance credit cash authentication card for access control business with RFID function enabled including passive HF short read distance (S725). The RFID TIPS 22 obtains first information table 35 which met the Select criteria, the first information table 35 includes item code 357, item serial number 358, user serial number 355, first PC information 351, first encrypted key 352, and 16 bit checksum code CRC (S726). RFID TIPS 22 verifies word number of the first information table 35="length of first information table"? If it is false, then proceeds with step S735 to end the communication dialog, if it is true, then reads the tag identifier 31, and proceeds with step S728 (S727). The RFID TIPS 22 selects an item application category according to RFID business sub-code of the item code 357 and CompType, the item application category includes access control, supply chain, (logistics and other business applications), pay cash, and (Finance, counter service, aATM or nuFAD), if the item application category="access control", then proceeds with step S729 to perform an access control item processing procedure, if the item application category="supply chain", then proceeds with step S730 to perform a supply chain item processing procedure, if the item application category="logistics and other business applications", then proceeds with step S731 to perform an item processing procedure for logistics and other business applications, if the item application category="pay cash", then proceeds with step S732 to perform a pay cash item processing procedure, if the item application category="Finance, counter service, aATM or nuFAD", then proceeds with step S733 to perform an item processing procedure for Finance, counter service, aATM or nuFAD application (S728). The RFID TIPS 22 performs a procedure including decrypting the encrypted key to authenticate the RFID tag for anti-counterfeiting and belonging to the same system which is used in access control, and recording the event which includes sending a brief message or email to a receiving brief message phone number, and then proceeds with step S735 to end the communication dialog with the RFID tag (S729). The RFID TIPS 22 performs a procedure including decrypting the encrypted key to authenticate the RFID tag for anti-counterfeiting and belonging to the same system which is used in supply chain, and recording the event which includes sending a brief message or email to a receiving brief message phone number, and then proceeds with step S735 to end the communication dialog with the RFID tag (S730). The RFID TIPS 22 performs a procedure including decrypting the encrypted key to authenticate the RFID tag for anti-counterfeiting and belonging to the same system which is used in logistics and other business applications, and recording the event which includes sending a brief message or email to a receiving brief message phone number, and then proceeds with step S735 to end the communication dialog with the RFID tag (S731). The RFID TIPS 22 performs a procedure including decrypting the encrypted key to authenticate the RFID tag for anti-counterfeiting and belonging to the same system which is used in pay cash, and recording the event which includes sending a brief message or email to a receiving brief message phone number, and then proceeds with step S735 to end the communication dialog with the RFID tag (S732). The RFID TIPS 22 performs a procedure including decrypting the encrypted key to authenticate the RFID tag for anti-counterfeiting and belonging to the same system which is used in Finance, counter service, aATM or nuFAD application, and entering an authentication password (S733). After passing a plural authentication method, the RFID TIPS 22 then performs a procedure including reading a second information table 37, obtaining the original second information table 37 which includes a savings account number 374, and an authentication information by performing a set of unadjust ordering operation, comparing the authentication information to the entered authentication password, after passing the comparing successfully, then using the savings account number 374 to access database device 4 for completing a deposit, withdraw, or transfer transaction, and recording the event which includes sending a brief message or email to a receiving brief message phone number (S734). The RFID TIPS 22 ends the communication dialog with the RFID tag (S735).

According to the eighth embodiment of the present invention, RFID TIPS 22 builds item code[15:0], item serial number[15:0], and user serial number[15:0] in an RFID tag 30 can deviate from the method described for FIG. 3. In an embodiment, user does not need RFID deployment country sub-code in the item code 357, but still needs RFID business sub-code, RFID device sub-code, RFID selecting enable function sub-code, and RFID function sub-code, then in a better embodiment, chooses to build a 32 bit organization identifier[31:0] by concatenating the item code 357 and the item serial number 358, which includes the name, code number, or business unified serial number of company or organization, in the meanwhile, using another word or the 6th to 15th in total 10 bits of user serial number 355 instead of using the item code[15:6] to define the original RFID business sub-code, RFID device sub-code, RFID selecting enable function sub-code, and RFID function sub-code. The RFID tag 3 includes a tag identifier 31 and a tag memory 34, the tag memory 34 is divided into memory sectors and blocks, the RFID TIPS 22 allocates an RFID tag data structure T30 and a set of system constants in its working memory, the set of system constants includes first password mask 2271, second password mask 22A1, word length of the first information table, word length of the second information table, CompType, AuthenticationType, hash table 229, and adjust table 22C, the RFID tag data structure T30 includes RM block 3B, TID block 3C, UII block 3D, and UM block 3E, the UII block 3D includes a first memory block 36 and a second memory block 38, the UM block 3E includes a third memory block 3G, the TID block 3C includes a tag identifier 31, the tag identifier 31 includes a tag serial number 313 and a manufacturing identifier 314, the RFID tag data structure T30 stores an item information table 33 which includes first information table 35, second information table 37, third information table 3E0, item kill password 3B1, and item access password 3B2 according to a plural authentication steps, the first memory block 36 stores the first information table 35, the second memory block 38 stores the second information table 37, the UM block 3E stores the third information table 3E0, the first information table 35 includes organization identifier, first encrypted key 352, first PC information 351, and user serial number 355, the first PC information 351 includes a word length of the first information table 35, the first encrypted key 352 includes an encrypted second sub-information 353, the second sub-information 353 indicates the word length of the second information table 37, in a better embodiment, the first information table 35 further includes an item expiration date for the RFID TIPS 22 to verify, the second information table 37 includes second authentication information 371, receiving brief message phone number 370, and second other information 372, obtaining the second authentication information 371 includes a user password, obtaining the receiving brief message phone number 370 includes a mobile phone number of user or another person, obtaining the second other information 372 includes a RFID access control table, the RFID access control table in the second memory block 38 is used in centralized managing the passing through and start of electric devices of plural access control areas. In an embodiment, a RFID authentication system is used in centralized managing the access control and assets for corporate of cross countries, regions, and cities, or in a better embodiment, is used in centralized managing the passing through and start of electric devices of plural access control areas for tourist hotel of several hundred rooms, including the use of SPA center, VIP room, archive room, and parking lot, or in a better embodiment, can be used in centralized managing the passing through and start of electric devices of plural access control areas for administration, education, and research organizations having a large number of rooms, including the use of offices, laboratories, research rooms, meeting rooms, and training rooms. In the centralized access control management system, each and every bit of the RFID access control table corresponds to a start signal to an access control area, when the corresponding bit value is a 1, indicates passing through the access control area is allowed, and proceeds to start, display, and record the electric devices for passing through the access control area which includes sending a brief message to the receiving brief message phone number 370, the electric devices includes driveway gates, rolling doors, warning lights, alarms, electronic locks, lighting fixtures, access control message display units, and other electronic devices, when the corresponding bit value is a 0, indicates passing through the access control area is not allowed, and proceeds to start, display, and record the electric devices for not passing through the access control area which includes sending a brief message to the receiving brief message phone number 370. In a better embodiment, the RFID access control table uses other memory sectors or blocks of the RFID tag 3 including, for example, the UM block in centralized managing the passing through and start of electric devices of plural access control areas. Method of RFID TIPS 22 building an item information table 33 according to a plural authentication steps includes the following steps. RFID TIPS 22 allocates an RFID tag data structure T30 and a set of system constants in its working memory, initializes the RFID tag data structure T30 which stores including an item information table 33, parameters in the item information table 33, the item kill password 3B1, and the item access password 3B2, the item information table 33 includes first information table 35 and second information table 37. RFID TIPS 22 reads the tag identifier 31 of the RFID tag 30 and gets it stored in the tag identifier 31 of the RFID tag data structure T30, which includes a tag serial number 313 and a manufacturing identifier 314. RFID TIPS 22 creates an organization identifier according to the name, code number, or business unified serial number of user's company or organization. RFID TIPS 22 creates the user serial number 355 according to the RFID business sub-code, RFID device sub-code, RFID selecting enable function sub-code, and RFID function sub-code. RFID TIPS 22 sets the item expiration date to have a valid period. RFID TIPS 22 creates the first encrypted key 352 according to the user serial number 355, the tag serial number 313, and the second sub-information 353, the second sub-information 353 indicates the length of first information table. RFID TIPS 22 sets the first PC information 351 to include a system initial value, which indicates the length of first information table. In a better embodiment, the length can be a value 7. RFID TIPS 22 obtains the values for parameters in the second information table 37, including the user password and the bit values in the RFID access control table for the user. RFID TIPS 22 creates the item kill password 3B1 and the item access password 3B2 according to the tag serial number 313, the first password mask 2271, and the hash table 229. RFID TIPS 22 obtains a set of adjust ordering operation according to the tag serial number 313, the second password mask 22A1, and the adjust table 22A, and obtains a second information table 39N of different ordering by performing the set of adjust ordering operation on each parameter address of the second information table 39. RFID TIPS 22 stores the RFID tag data structure T30 in the RFID tag 30 which includes the first information table 35, the second information table 37, the third information table 3E0, the item kill password 3B1, and the item access password 3B2. Method of RFID TIPS 22 authenticating the RFID tag 30 includes the following steps. The tag item operating system of local computer 222 is started. Then establishing the connection of local computer, accessing a local computer network environment, accessing a RFID environment, and setting a set of system constant values are executed, the set of system constant values includes location serial number of the reader 221, CompType, and AuthenticationType, wherein the CompType is access control, and the AuthenticationType is access control authentication, in a better embodiment, the AuthenticationType is logistics authentication, or supply chain authentication. RFID TIPS 22 is started to verify the local computer network environment. RFID TIPS 22 starts the reader 221 including setting the RFID environment. RFID TIPS 22 selects an RFID tag 30 according to the organization identifier. RFID TIPS 22 reads first information table 35 of the RFID tag 30, including the user serial number 355 and the item expiration date. RFID TIPS 22 reads the tag identifier 31 which includes a tag serial number 313. RFID TIPS 22 verifies word length of the first information table 35 and the item expiration date. RFID TIPS 22 decrypts the first encrypted key 352 to obtain the second sub-information 353 by using the tag serial number 313 and the user serial number 355. RFID TIPS 22 verifies the second sub-information 353 to authenticate the RFID tag 3 for anti-counterfeiting and belonging to the same system. RFID TIPS 22 reads the second information table 39. RFID TIPS 22 obtains the original second information table 37 by performing a set of unadjust ordering operation. RFID TIPS 22 authenticates the second authentication information 371 which includes selecting an authenticating information, comparing the authentication password to the user entered authentication password, after passing the comparing successfully then proceeding to use the second other information 372, which includes comparing "bit value corresponding to the location serial number of the reader in the RFID access control table"="1"? if the corresponding bit value is a 1, indicating "passing through the access control area is allowed", and proceeding to start, display, and record the electric devices for passing through the access control area which includes sending a brief message to the receiving brief message phone number 370, if the corresponding bit value is a 0, indicating "passing through the access control area is not allowed", and proceeding to start, display, and record the electric devices for not passing through the access control area which includes sending a brief message to the receiving brief message phone number 370.

According to the ninth embodiment of the present invention, RFID TIPS 22 builds item code[15:0], item serial number[15:0], and user serial number[15:0] in an RFID tag 30 further deviates from the method described for FIG. 3. In an embodiment, user does not need both RFID business sub-code and RFID deployment country sub-code in the item code 357, but still needs RFID device sub-code, RFID selecting enable function sub-code, and RFID function sub-code, then in a better embodiment, chooses to build a 32 bit community identifier[31:0] by concatenating the item code 357 and the item serial number 358, which includes the name, code number, or business unified serial number of community or association, in the meanwhile, using another word or the 9th to 15th in total 7 bits of user serial number 355 instead of using the item code[12:6] to define the original RFID device sub-code, RFID selecting enable function sub-code, and RFID function sub-code. The RFID tag 3 includes a tag identifier 31 and a tag memory 34, the tag memory 34 is divided into memory sectors and blocks, the RFID TIPS 22 allocates an RFID tag data structure T30 and a set of system constants in its working memory, the set of system constants includes first password mask 2271, second password mask 22A1, word length of the first information table, word length of the second information table, and hash table 229, the RFID tag data structure T30 includes RM block 3B, TID block 3C, UII block 3D, and UM block 3E, the UII block 3D includes a first memory block 36 and a second memory block 38, the UM block 3E is a third memory block 3G, the TID block 3C includes a tag identifier 31, the tag identifier 31 includes a tag serial number 313 and a manufacturing identifier 314, the RFID tag data structure T30 stores an item information table 33 which includes first information table 35, second information table 37, third information table 3E0, item kill password 3B1, and item access password 3B2 according to a plural authentication steps, the first memory block 36 stores the first information table 35, the second memory block 38 stores the second information table 37, the UM block 3E stores the third information table 3E0, the first information table 35 includes community identifier, first encrypted key 352, first PC information 351, and user serial number 355, the first PC information 351 includes a word length of the first information table 35, the first encrypted key 352 includes an encrypted second sub-information 353, the second sub-information 353 indicates the word length of the second information table 37, in a better embodiment, the first information table 35 further includes an item expiration date for the RFID TIPS 22 to verify, the second information table 37 includes receiving brief message phone number 370, and second other information 372, the receiving brief message phone number 370 is a mobile phone number of user or another person, the second other information 372 includes a start control table. In an embodiment, the start control table in the second memory block 38 has only 1 16 bit word, each and every bit of the word corresponds to the passing through and start signal of electric devices for an access control area, when the corresponding bit value is a 1, indicates passing through the access control area is authorized, and proceeds to start, display, and record the electric devices for passing through the access control area which includes sending a brief message to the receiving brief message phone number 370, the electric devices includes driveway gates, rolling doors, warning lights, alarms, electronic locks, lighting fixtures, access control message display units, and other electronic devices, when the corresponding bit value is a 0, indicates passing through the access control area is not authorized, and proceeds to start, display, and record the electric devices for not passing through the access control area which includes sending a brief message to the receiving brief message phone number 370. In a better embodiment, the start control table is used in a RFID access control management system for a community or SME (small and medium enterprise), the access control area includes community front gate access control, building door access control, building meeting room access control, building office access control, building library access control, building gym access control, building multi-media recreation room access control, building elevator start control, and basement driveway gate start control. Method of RFID TIPS 22 building an item information table 33 according to a plural authentication steps includes the following steps. RFID TIPS 22 allocates an RFID tag data structure T30 and a set of system constants in its working memory, initializes the RFID tag data structure T30 which includes an item information table 33, parameters in the item information table 33, the item kill password 3B1, and the item access password 3B2, the item information table 33 includes first information table 35 and second information table 37. RFID TIPS 22 reads the tag identifier 31 of the RFID tag 30 and gets it stored in the tag identifier 31 of the RFID tag data structure T30, which includes a tag serial number 313 and a manufacturing identifier 314. RFID TIPS 22 creates a community identifier according to the name, code number, or business unified serial number of user's community or SME. RFID TIPS 22 creates the user serial number 355 according to the RFID device sub-code, RFID selecting enable function sub-code, and RFID function sub-code. RFID TIPS 22 sets the item expiration date to have a valid period. RFID TIPS 22 creates the first encrypted key 352 according to the user serial number 355, the tag serial number 313, and the second sub-information 353, wherein the second sub-information 353 indicates the length of first information table. RFID TIPS 22 sets the first PC information 351 to include a system initial value, which indicates the length of first information table. In a better embodiment, the length includes a value 7. RFID TIPS 22 obtains the values for parameters in the second information table 37, including the bit values in the start control table for the user. RFID TIPS 22 creates the item kill password 3B1 and the item access password 3B2 according to the tag serial number 313, the first password mask 2271, and the hash table 229. RFID TIPS 22 stores the RFID tag data structure T30 in the RFID tag 30 which includes the first information table 35, the second information table 37, the third information table 3E0, the item kill password 3B1, and the item access password 3B2. Method of RFID TIPS 22 authenticating the RFID tag 30 includes the following steps. The tag item operating system of local computer 222 is started. Then establishing the connection of local computer, accessing a local computer network environment, accessing a RFID environment, and setting a set of system constant values are executed, the set of system constant values includes location serial number of the reader 221. RFID TIPS 22 is started to verify the local computer network environment. RFID TIPS 22 starts the reader 221 including setting the RFID environment. RFID TIPS 22 selects an RFID tag 30 according to the community identifier. RFID TIPS 22 reads first information table 35 of the RFID tag 30, including the user serial number 355 and the item expiration date. RFID TIPS 22 reads the tag identifier 31 which includes a tag serial number 313. RFID TIPS 22 verifies word length of the first information table 35 and the item expiration date. RFID TIPS 22 decrypts the first encrypted key 352 to obtain the second sub-information 353 by using the tag serial number 313 and the user serial number 355. RFID TIPS 22 verifies the second sub-information 353 to authenticate the RFID tag 3 for anti-counterfeiting and belonging to the same system. RFID TIPS 22 reads the second information table 37. RFID TIPS 22 uses the second other information 372, which includes comparing "bit value corresponding to the location serial number of the reader in the start control table"="1"? if the corresponding bit value is a 1, indicating "passing through the access control area is allowed", and proceeding to start, display, and record the electric devices for passing through the access control area which includes sending a brief message to the receiving brief message phone number 370, if the corresponding bit value is a 0, indicating "passing through the access control area is not allowed", and proceeding to start, display, and record the electric devices for not passing through the access control area which includes sending a brief message to the receiving brief message phone number 370.

In some embodiments provided according to the illustrations in FIGS. 1-14, a radio frequency identification (RFID) tag 3 to be authenticated in an authentication phase includes a tag memory 34. The tag memory 34 stores an encryption key 352 and an information table 39. The information table 39 has a specific storing attribute quantified with a predetermined value, and is read after the authentication phase by using the predetermined value. The encryption key 352 is derived from the predetermined value, and is decrypted in the authentication phase to authenticate the RFID tag 3.

In some embodiments, The tag memory 34 stores a tag identifier 31 and an item information table 33. The tag identifier 31 includes a tag serial number 313 and a manufacturer identifier 314. The item information table 33 includes the information table 39, an information table 35, an item kill password 3B1, an item access password 3B2 and a specific portion 331.

In some embodiments, the information table 35 has a first storage capacity quantified with a first capacity value, and includes an authentication information 350, the encryption key 352 and an other information 354. The authentication information 350 includes an item code 357, a user serial number 355 and an item expiration date (not shown). The encryption key 352 includes a sub-information 353. The other information 354 includes an item serial number 358 and a protocol control (PC) information 351. For instance, the first capacity value is equal to a word length of the information table 35.

In some embodiments, the information table 39 has a second storage capacity quantified with a second capacity value, and includes a plurality of information elements [63:48]_374, [47:32]_374, . . . [15:0]_375, [15:0]_37E, . . . [15:0]_37K and [15:0]_37J with a first total information element number, wherein the predetermined value is equal to one of the second capacity value and the first total information element number. The plurality of information elements [63:48]_374, [47:32]_374, . . . [15:0]_375, [15:0]_37E, . . . [15:0]_37K and [15:0]_37J include an authentication information 371, a communication target indicator 37S and an other information 372, and are arranged according to a first order. The other information 372 includes a start control table 3721. For instance, the second capacity value is equal to a word length of the information table 39.

In some embodiments, the specific portion 331 of the item information table 33 records an application code information 332. The sub-information 353 represents the predetermined value. The communication target indicator 37S includes at least one of a phone number and an email address, and is used to link to a specific device 79 by an RFID tag item processing system 22. The RFID tag 3 is applied to a specific application function 41, wherein the specific application function 41 uses the application code information 332, and controls an actuating mechanism 42 near to an object 43 using the RFID tag. The item code 357 is associated with the specific application function 41.

In some embodiments, the RFID tag item processing system 22 generates a transaction message G1 for the specific application function 41 according to the application code information 332 after the authentication phase, and sends the transaction message G1 to the specific device 79 according to the communication target indicator 37S. For instance, the RFID tag item processing system 22 performs the specific application function 41 to generate the transaction message G1.

In some embodiments, the information table 39 is determined according to the tag serial number 313, a password mask 22A1 and an information table 49, wherein the information table 49 includes a plurality of information elements 491, 492, . . . 49P with a second total information element number equal to the first total information element number, the plurality of information elements [63:48]_374, [47:32]_374, . . . [15:0]_375, [15:0]_37E, . . . [15:0]_37K and [15:0]_37J have an information content the same as that of the plurality of information elements 491, 492, . . . 49P, and the plurality of information elements 491, 492, . . . 49P are arranged according to a second order different from the first order.

In some embodiments, the encryption key 352 is determined according to the sub-information 353 and at least one of the tag serial number 313 and the user serial number 355. The item kill password 3B1 and the item access password 3B2 are determined according to the tag serial number 313, a password mask 2271 and a hash table 229.

In some embodiments, the information table 39 is transformed into an information table 59 according to the tag serial number 313, the password mask 22A1 and the information table 39 after the authentication phase, wherein the information table 59 includes a plurality of information elements respectively the same as the plurality of information elements 491, 492, . . . 49P, and the plurality of information elements of the information table 59 are arranged according to a third order the same as the second order.

In some embodiments, the information table 39 starts to be stored in a memory block RB2 in the tag memory 34 at a first specific time. The memory block RB2 originally stores an information table 69 at a second specific time before the first specific time. The RFID tag item processing system 22 reads the information table 69 at a third specific time between the first and the second specific times, and configures the read information table of the information table 69 to form the information table 49.

In some embodiments, the start control table 3721 of the information table 39 includes a plurality of bits respectively used to control a plurality of start signals, and is included in the application code information 332. The specific application function 41 is an access control function and uses the start control table. The RFID tag item processing system 22 performs the specific application function 41 according to the item code 357 after the authentication phase. The plurality of bits include a specific bit used to control a specific one of the plurality of start signals, wherein the specific start signal controls the actuating mechanism 42 to determine whether the object 43 is allowed to pass through a specific access control area handled by the actuating mechanism 42. In some embodiments, the specific application function 41 generates the plurality of start signals respectively in response the plurality of bits.

In some embodiments, the specific bit represents one of an enabling state and a disabling state. When the specific bit represents the enabling state, the actuating mechanism 42 allows the object 43 to pass through the specific access control area. When the specific bit represents the disabling state, the actuating mechanism 42 disallows the object 43 to pass through the specific access control area.

In some embodiments, the specific bit is detected to generate a detected bit. The RFID tag item processing system 22 generates the transaction message G1 according to the detected bit so as to send the transaction message G1 to the specific device 79. The encryption key 352 is decrypted to determine whether the sub-information 353 represents the predetermined value in order that the RFID tag item processing system 22 authenticates the RFID tag 3 for a confirmation that the RFID tag 3 is compatible with the RFID tag item processing system 22 and is an anti-counterfeiting tag.

In some embodiments provided according to the illustrations in FIGS. 1-14, a system 20 for securing a radio frequency identification (RFID) tag 3 having a specific identifier 45 includes an operation device 28 and a reader 221 coupled to the operation device 28. The operation device 28 provides a password mask 22A1 and a information table 49, wherein the information table 49 includes a plurality of information elements 491, 492, . . . 49P arranged according to a first order. The operation device 28 adjusts the first order according to the specific identifier 45 and the password mask 22A1 to generate an information table 39.

In some embodiments, the system 20 is an RFID tag item processing system 22. The operation device 28 is an RFID tag item operation device, and includes a local computer 222, a keyboard 223 and a display unit 225. The local computer 222 obtains the specific identifier 45 from the RFID tag 3 through the reader 221, provides the password mask 22A1 and the information table 49, adjusts the first order according to the specific identifier 45 and the password mask 22A1 to generate the information table 39, and writes the information table 39 to the RFID tag 3 via the reader 221. The keyboard 223 is coupled to the local computer 222.

In some embodiments, the display unit 225 is coupled to the local computer 222, wherein the local computer 222 controls the reader 221, the keyboard 223 and the display unit 225, and controls the RFID tag 3 via the reader 221. For instance, the keyboard 223 includes a numerical key pad 2231 controlled by the local computer 222. The reader 221 includes a reader antenna 224 and an interface and communication controlling circuit 2211 coupled to the reader antenna 224 and the local computer 222, wherein the reader antenna 224 includes at least one of a UHF antenna and an HF inductive coil.

In some embodiments, the operation device 28 further includes an actuating mechanism 42 coupled to the local computer 222, wherein the local computer 222 controls the actuating mechanism 42. In some embodiments, the operation device 28 performs a specific application function 41 by reading the RFID tag 3 via the reader 221; and the local computer 222 controls the specific application function 41. In some embodiments, the actuating mechanism 42 is separate from the operation device 28, and is remotely controlled by the operation device 28.

In some embodiments, the operation device 28 writes the information table 39 to the RFID tag 3 via the reader 221. The RFID tag 3 includes a tag memory 34, a tag antenna 3J and an interface and communication controlling circuit 3K coupled to the tag antenna 3J and the tag memory 34, wherein the tag antenna 3J includes at least one of a UHF antenna and an HF inductive coil. The tag memory 34 stores a tag identifier 31 and an item information table 33. The tag identifier 31 includes a tag serial number 313 and a manufacturer identifier 314, wherein the specific identifier 45 is the tag serial number 313. The item information table 33 includes the information table 39, an information table 35, an item kill password 3B1, an item access password 3B2 and a specific portion 331.

In some embodiments, in a configuration phase, the operation device 28 determines the item information table 33, and causes the reader 221 to write the item information table 33 to the RFID tag 3.

In some embodiments, the information table 35 has a first storage capacity quantified with a first capacity value, and includes an authentication information 350, an encryption key 352 and an other information 354. The authentication information 350 includes an item code 357, a user serial number 355 and an item expiration date (not shown). The encryption key 352 includes a sub-information 353. The other information 354 includes an item serial number 358 and a PC information 351. The plurality of information elements 491, 492, . . . 49P have a first total information element number. For instance, the first capacity value is equal to a word length of the information table 35.

In some embodiments, the information table 39 has a second storage capacity quantified with a second capacity value, and includes a plurality of information elements [63:48]_374, [47:32]_374, . . . [15:0]_375, [15:0]_37E, . . . [15:0]_37K and [15:0]_37J with a second total information element number equal to the first total information element number, wherein the plurality of information elements 491, 492, . . . 49P have an information content the same as that of the plurality of information elements [63:48]_374, [47:32]_374, . . . [15:0]_375, [15:0]_37E, . . . [15:0]_37K and [15:0]_37J, and the plurality of information elements [63:48]_374, [47:32]_374, . . . [15:0]_375, [15:0]_37E, . . . [15:0]_37K and [15:0]_37J are arranged according to a second order different from the first order. For instance, the second capacity value is equal to a word length of the information table 39.

In some embodiments, the predetermined value is equal to one of the second capacity value and the second total information element number. The plurality of information elements [63:48]_374, [47:32]_374, . . . [15:0]_375, [15:0]_37E, . . . [15:0]_37K and [15:0]_37J include an authentication information 371, a communication target indicator 37S and an other information 372. The other information 372 includes a start control table 3721. The specific portion 331 of the item information table 33 records an application code information 332.

In some embodiments, the operation device 28 stores a system maintenance information G3, wherein the system maintenance information G3 includes a computer type, an authentication type, the information table 49, a specific system constant, the predetermined value, the first and the second capacity values, the password mask 22A1, a password mask 2271, a hash table 229 and an order adjustment table 22C.

In some embodiments, the sub-information 253 represents one of the predetermined value and the specific system constant. The communication target indicator 37S includes at least one of a phone number and an email address, and is used to link to a specific external device 79. The specific external device 79 is a mobile device. The RFID tag 3 is applied to a specific application function 41.

In some embodiments, the specific application function 41 uses the application code information 332, controls an actuating mechanism 42 near to an object 43 using the RFID tag 3, and includes at least one selected from a group consisting of a finance function, an access control function, a cash paying function, a credit function, a counter service function, a transport charge function, a communication function, a logistics function, a production management function, a work attendance management function, an authentication function, a goods sale management function, a parking charge function, a supply chain function, an item level tracking function, an assets management function and a combination thereof.

In some embodiments, the operation device 28 authenticates the RFID tag 3 in an authentication phase after the configuration phase, generates a transaction message G1 according to the application code information 332 by using the specific application function 41 after the authentication phase, and sends the transaction message G1 to the specific external device 79 according to the communication target indicator 37S.

In some embodiments, the information table 49 is an original information table. The operation device 28 generates the information table 39 according to the specific identifier 45, the password mask 22A1 and the information table 49. The specific identifier 45 has a binary value having M bits, wherein M>1. The operation device 28 selects N bits from the M bits according to the password mask 22A1 to generate a value K81, wherein N>1. The operation device 28 encodes the value K81 to generate a control signal K82. The operation device 28 performs an order adjustment operation (such as 22C2) according to the order adjustment table 22C, the information table 49 and the control signal K82 to generate the information table 39; for instance, the information table 39 is equal to the information table $39_2$.

In some embodiments, the operation device 28 performs an authentication operation to authenticate the RFID tag 3 in the authentication phase. The authentication operation reads the information table 35 of the RFID tag 3 via the reader 221. The authentication operation decrypts the encryption key 352 to determine whether the sub-information 353 represents one of the predetermined value and the specific system constant in order that the operation device 28 authenticates the RFID tag 3 for a confirmation that the RFID tag 3 is compatible with the system 20 and is an anti-counterfeiting tag. When the sub-information 353 represents one of the predetermined value and the specific system constant, the operation device 28 confirms that the authentication operation passes. The operation device 28 reads the information table 39 of the RFID tag 3 via the reader 221 after the RFID tag 3 passes the authentication operation.

In some embodiments, the operation device 28 transforms the information table 39 into an information table 59 according to the specific identifier 45, the password mask 22A1 and the information table 39 by performing a reverse order adjustment operation, wherein the information table 59 includes a plurality of information elements having an information content the same as that of the plurality of information elements 491, 492, . . . 49P, and the plurality of information elements of the information table 59 are arranged according to a third order the same as the first order. The operation device 28 performs the reverse order adjustment operation according to the order adjustment table 22C, the information table 39 and the control signal K82 to generate the information table 59.

In some embodiments, the information table 39 starts to be stored in a memory block RB2 in the tag memory 34 at a first specific time. The memory block RB2 originally stores an information table 69 at a second specific time before the first specific time. The operation device 28 reads the information table 69 via the reader 221 at a third specific time between the first and the second specific times, and configures the read information table of the information table 69 to form the information table 49.

In some embodiments, the item code 357 indicates the specific application function 41 for the RFID tag 3 to be applied to. The predetermined RFID function unit includes at least one selected from a group consisting of the finance function, the credit function, the counter service function, the cash paying function, a short-message sending function, an email sending function, a monetary base selecting function for a cash card balance, the access control function, the item level tracking function, a specific UHF access distance operation function, a specific HF access distance operation function and a combination thereof.

The specific UHF access distance operation function is one selected from a group consisting of a passive UHF long access distance operation function, a passive UHF short access distance operation function, a passive UHF short access distance operation function with a relatively high memory capacity, an HF short access distance operation function, a semi-passive UHF long access distance operation function, a semi-passive UHF far access distance operation function for positioning while the RFID tag 3 moves, a semi-passive UHF far access distance operation function with a relatively high memory capacity, a passive UHF long access distance operation function for positioning, a passive UHF long access distance operation function with a relatively high memory capacity, a passive UHF near access distance operation function, a passive UHF near access distance operation function with a relatively high memory capacity.

The specific HF access distance operation function is one selected from a group consisting of an HF short access distance operation function, an HF short access distance operation function with a relatively high memory capacity, a passive HF short access distance operation function for an access control and positioning, and a passive HF short access distance operation function with a relatively high memory capacity.

In some embodiments, the operation device 28 determines the encryption key 352 according to the sub-information 353 and at least one of the tag serial number 313 and the user serial number 355 by using a specific operation, wherein the specific operation is one selected from a group consisting of a first operation, a second operation, a third operation and a fourth operation. The first operation sets the encryption key 352 to be equal to a first sum of the tag serial number 313, the user serial number 355 and the sub-information 353. The second operation sets the encryption key 352 to be equal to a second sum of the tag serial number 313 and the sub-information 353. The third operation sets the encryption key 352 to be equal to a result obtained from an arithmetic operation applied to the sub-information 353 and at least one of the tag serial number 313 and the user serial number 355. The fourth operation extracts a specific number of bits from one selected from a group consisting of the first sum, the second sum and the result to generate a binary value and sets the encryption key 352 to be equal to the binary value.

In some embodiments, the operation device 28 determines the item kill password 3B1 and the item access password 3B2 according to the tag serial number 313, the password mask 2271 and the hash table 229. The tag serial number 313 has a binary value having M bits, wherein M>1. the item kill password 3B1 and the item access password 3B2 are determined in one of a first state and a second state.

When the item kill password 3B1 and the item access password 3B2 are determined in the first state, there are the following operations: the operation device 28 selects a specific bit from the binary value according to the password mask 2271 to generate a value K71; the operation device 28 encodes the value K71 to generate a control signal K72; when the control signal K72 carries an odd number, the operation device 28 performs an encryption operation 2291 according to the hash table 229 and the odd number to generate a kill password value 3B11 and a access password value 3B21, and sets the item kill password 3B1 and the item access password 3B2 to be respectively equal to the kill password value 3B11 and the access password value 3B21; when the control signal K72 carries an even number, the operation device 28 performs a encryption operation 2292 according to the hash table 229 and the even number to generate a kill password value 3B12 and a access password value 3B22, and sets the item kill password 3B1 and the item access password 3B2 to be respectively equal to the kill password value 3B12 and the access password value 3B22.

When the item kill password 3B 1 and the item access password 3B2 are determined in the second state, there are the following operations: the operation device 28 selects N bits from the M bits according to the password mask 2271 to generate a value K75, wherein N>1; the operation device 28 encodes the value K75 to generate a control signal K76; the operation device 28 performs an encryption operation 2293 according to the hash table 229 and the control signal K76 to generate a kill password value 3B13 and a access password value 3B23; and the operation device 28 sets the item kill password 3B1 and the item access password 3B2 to be respectively equal to the kill password value 3B13 and the access password value 3B23.

In some embodiments, the authentication information 371 includes a cash card balance 379 included in the application code information 332. The specific application function 41 is the cash paying function. The operation device 28 uses a default target indicator to preset the communication target indicator 37S before the configuration phase. The operation device 28 receives a first user input to determine the communication target indicator 37S in the configuration phase. The operation device 28 receives a second user input to change the communication target indicator 37S after the RFID tag 3 is authenticated to be genuine and compatible with the system 20. For instance, the operation device 28 receives the first and the second user input via the keyboard 223.

In some embodiments, the operation device 28 performs the specific application function 41 via the reader 221 according to the item code 357 after the authentication phase. The operation device 28 updates the cash card balance 379 of the RFID tag 3 via the reader 221 by performing the specific application function 41 to result in a cash card balance update, and generates the transaction message G1 according to the cash card balance update so as to send the transaction message G1 to the specific external device 57.

In some embodiments, the start control table 3721 of the information table 39 includes a plurality of bits respectively used to control a plurality of start signals, and is included in the application code information 332. The specific application function 41 is the access control operation, and uses the start control table 3721. The plurality of bits include a specific bit used to control a specific one of the plurality of start signals, wherein the specific start signal controls the actuating mechanism 42 to determine whether the object 43 is allowed to pass through a specific access control area handled by the actuating mechanism 42.

In some embodiments, the specific bit represents one of an enabling state and a disabling state. When the specific bit represents the enabling state, the actuating mechanism 42 allows the object 43 to pass through the specific access control area. When the specific bit represents the disabling state, the actuating mechanism 42 disallows the object 43 to pass through the specific access control area. The operation device 28 detects the specific bit via the reader 221 to generate a detected bit, and generates the transaction message G1 according to the detected bit so as to send the transaction message G1 to the specific external device.

In some embodiments, the tag memory 34 further stores a measurable parameter information 47, wherein the measurable parameter information 47 is included in the application code information 332, and includes at least one selected from a group consisting of a used time, a distance, a location, a weight, a traffic flow, a cash card balance, a public transport station number, and an airline landing location number. The specific application function 41 is the transport charge function, and uses the measurable parameter information 47.

In some embodiments, the operation device 28 converts the measurable parameter information 47 into a charge amount by performing the specific application function 41 to make a transaction, and generates the transaction message G1 according to the transaction so as to send the transaction message G1 to the specific external device 79, wherein the system 20 has a system information, and the transaction message G1 is generated further according to the system maintenance information G3 and the system information.

In some embodiments provided according to the illustrations in FIGS. 1-14, a method for securing a radio frequency identification (RFID) tag 3 storing an application code information 332 and a communication target indicator 37S to be used to link to a specific external device 79 includes the following steps. A specific application function 41 using the application code information 332 is provided. The RFID tag 3 is applied to the specific application function 41. A transaction message G1 for the specific application function 41 is generated according to the application code information 332. The transaction message G1 is sent to the specific external device 79 according to the communication target indicator 37S.

Figure 15:
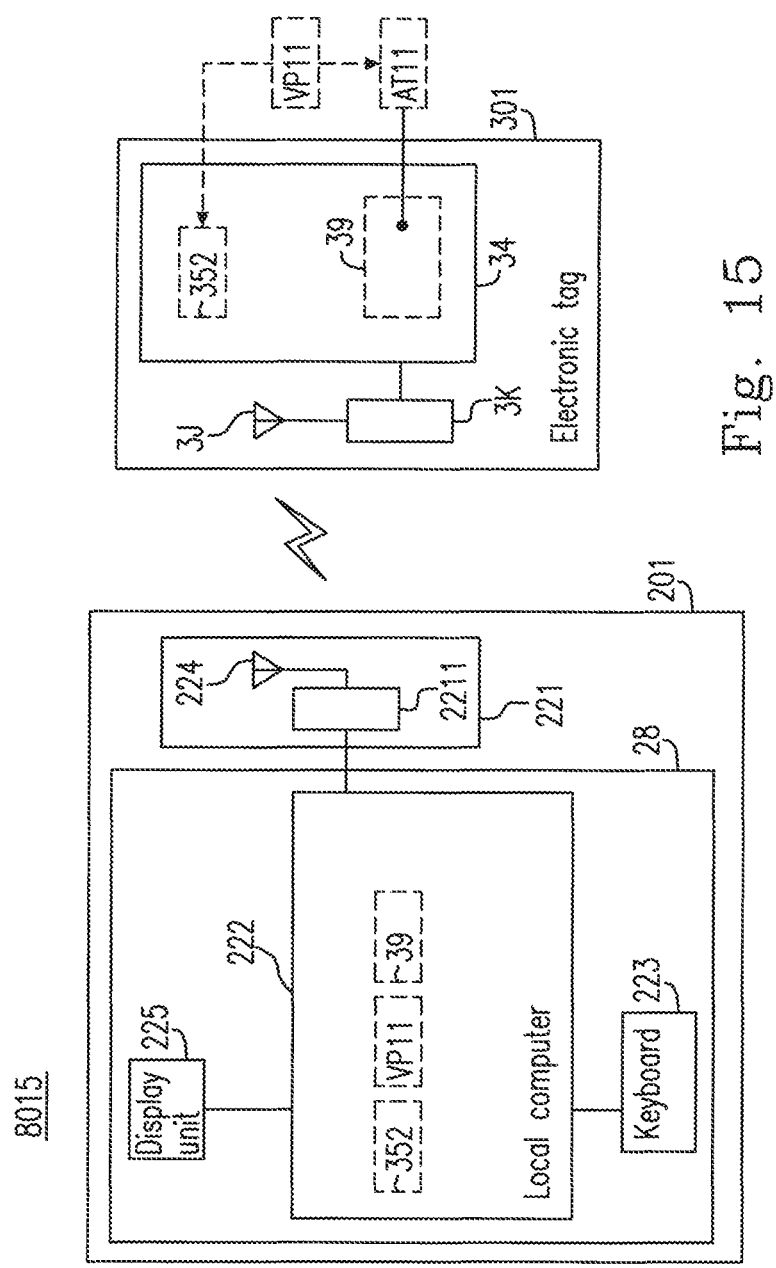
FIG. 15 is a functional diagram showing a communication system according to various embodiments of the present disclosure.

Please refer to FIG. 15, which is a functional diagram showing a communication system 8015 according to various embodiments of the present disclosure. The communication system 8015 includes a system 201 and an electronic tag 301 used to communicate with the system 201. The electronic tag 301 to be authenticated in an authentication phase stores an encryption key 352 and an information table 39. The information table 39 has a specific storing attribute AT11 quantified with a predetermined value VP11. The encryption key 352 is derived from the predetermined value VP11.

The system 201 for securing the electronic tag 301 includes a reader 221 and an operation device 28. The operation device 28 is coupled to the reader 221, and is configured via the reader 221 to authenticate the electronic tag 301 by decrypting the encryption key 352 in the authentication phase, and read the information table 39 according to the predetermined value VP11 after the authentication phase. For instance, the electronic tag 301 includes a tag memory 34, which stores the encryption key 352 and the information table 39.

Please additionally refer to FIGS. 1-14. In some embodiments, the electronic tag 301 is the radio frequency identification (RFID) tag 3. The system 201 is an electronic tag item processing system. For instance, the system 201 is one of the system 20 and the RFID tag item processing system 22. The operation device 28 is an electronic tag item operation device, and includes a local computer 222, a a keyboard 223 and a display unit 225. The electronic tag 301 includes a tag memory 334, a tag antenna 3J and an interface and communication controlling circuit 3K coupled to the tag memory 334 and the tag antenna 3J. The tag antenna 3J includes at least one of a UHF antenna and an HF inductive coil.

The local computer 222 is configured to obtain the encryption key 352 from the electronic tag 301 through the reader 221, authenticate the electronic tag 301 by decrypting the obtained encryption key 352 in the authentication phase, and read the information table 39 from the electronic tag 301 via the reader 221 after the authentication phase. The keyboard 223 is coupled to the local computer 222. The display unit 225 is coupled to the local computer 222. The local computer 222 controls the reader 221, the keyboard 223 and the display unit 225, and is used to communicate with the electronic tag 301 via the reader 221. The reader 221 includes a reader antenna 224 and an interface and communication controlling circuit 2211 coupled to the reader antenna 224 and the local computer 222. The reader antenna 224 includes at least one of a UHF antenna and an HF inductive coil.

In some embodiments provided according to the illustration in FIG. 15, an electronic tag 301 to be authenticated by a system 201 in an authentication phase includes a tag memory 34. The tag memory 34 stores an encryption key 352 and an information table 39. The information table 39 has a specific storing attribute AT11 quantified with a predetermined value VP11, and is read after the authentication phase by using the predetermined value VP11. The encryption key 352 is derived from the predetermined value VP11, and is decrypted by the system 201 in the authentication phase to authenticate the electronic tag 301.

In some embodiments proposed according to the illustration in FIG. 15, a method for securing an electronic tag 301 is provided. The electronic tag 301 to be authenticated in an authentication phase stores an encryption key 352 and an information table 39, the information table 39 has a specific storing attribute AT11 quantified with a predetermined value VP11, and the encryption key 352 is derived from the predetermined value VP11. The method includes the following steps. The electronic tag 301 is authenticated by decrypting the encryption key 352 in the authentication phase. The information table 39 is read according to the predetermined value VP11 after the authentication phase.

Figure 16:
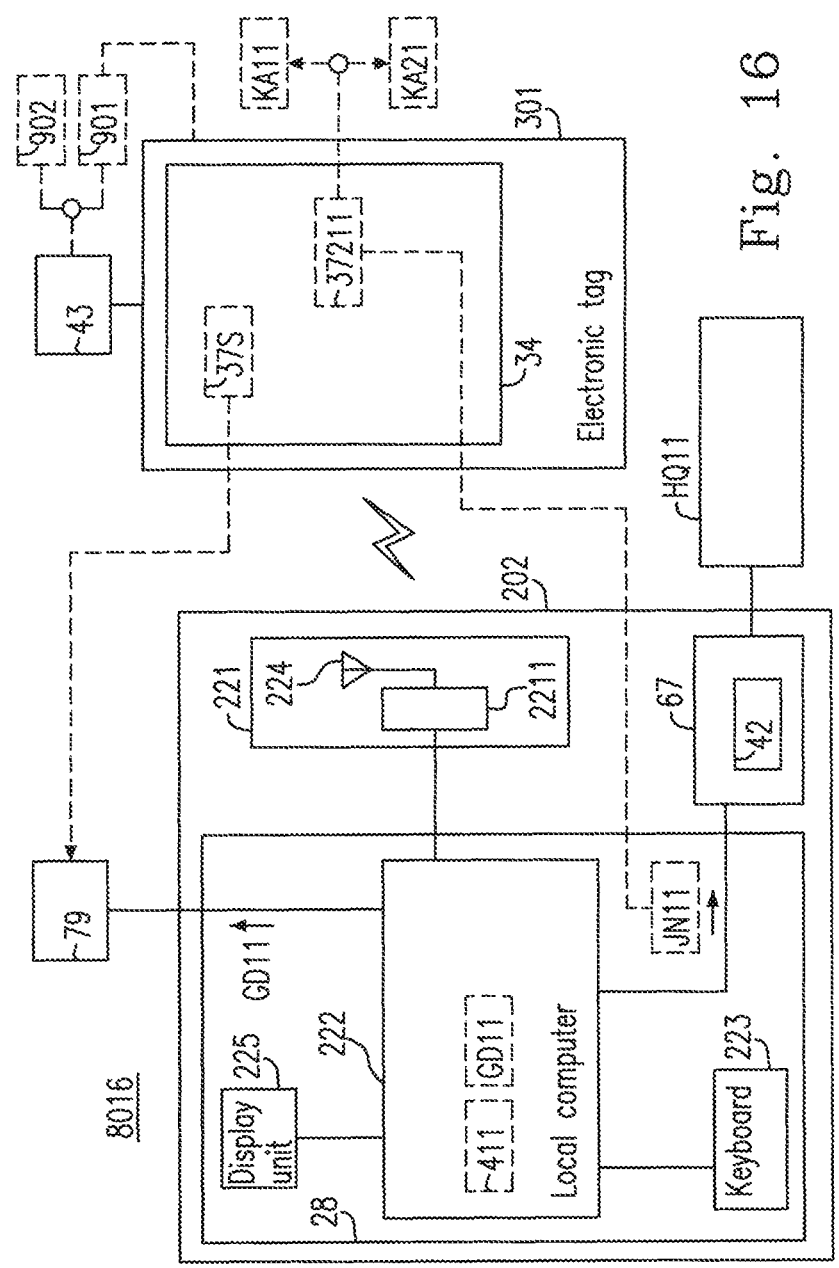
FIG. 16 is a functional diagram showing a communication system according to various embodiments of the present disclosure.
Figure 17:
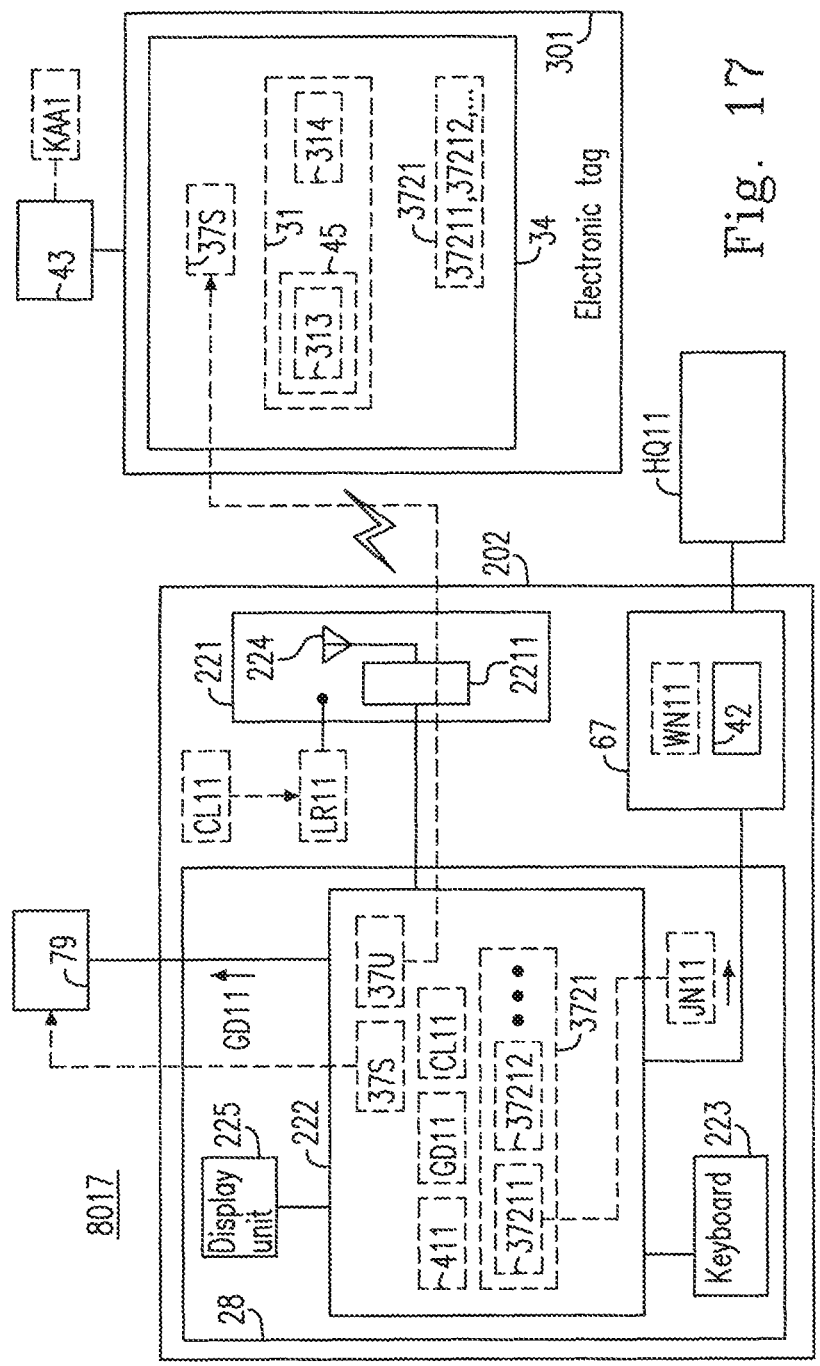
FIG. 17 is a functional diagram showing an implementation structure associated with the communication system 8016 shown in FIG. 16.

Please refer to FIG. 16 and FIG. 17. FIG. 16 is a functional diagram showing a communication system 8016 according to various embodiments of the present disclosure. FIG. 17 is a functional diagram showing an implementation structure 8017 associated with the communication system 8016 shown in FIG. 16. As shown in FIGS. 16 and 17, the communication system 8016 includes a system 202 and an electronic tag 301 used to communicate with the system 202.

The electronic tag 301 is coupled to an object 43 and stores a first communication target indicator 37S and a specific control bit 37211. The first communication target indicator 37S is configured to indicate a specific external device 79. The specific control bit 37211 represents one of a first state KA11 and a second state KA21. The first state KA11 is that the object 43 has been authorized to enter a specific access control area HQ11 coupled to an electric device 67. The second state KA21 is that the object 43 has been prohibited to enter the specific access control area HQ11.

The system 202 for securing the electronic tag 301 includes a reader 221 and an operation device 28. The operation device 28 is coupled to the reader 221, and performs an access control function 411 of the specific access control area HQ11 by using the reader 221 and the electric device 67. The electronic tag 301 is applied to the access control function 411. Under a condition that the specific control bit 37211 satisfies a specific condition, the operation device 28, via the reader 221, generates an access message GD11 for the access control function 411 according to the specific control bit 37211, and sends the access message GD11 to the specific external device 79 according to the first communication target indicator 37S. For instance, the electronic tag 301 includes a tag memory 34, which stores the first communication target indicator 37S and the specific control bit 37211.

Please additionally refer to FIGS. 1-14. In some embodiments, the electronic tag 301 is a radio frequency identification (RFID) tag. The system 202 is an electronic tag item processing system. The electronic tag item processing system is an RFID tag item processing system 22. For instance, the system 202 is one of the system 20 and the RFID tag item processing system 22. The operation device 28 is an electronic tag item operation device, and includes the local computer 222, the keyboard 223 and the display unit 225. For instance, the electronic tag 301 has a specific identifier 45. The tag memory 34 further stores a tag identifier 31. The tag identifier 31 includes a tag serial number 313 and a manufacturer identifier 314, wherein the specific identifier 45 is one of the tag serial number 313 and the tag identifier 31. For instance, the electronic tag 301 is identified by one of the tag identifier 31 and the specific identifier 45, or is identified based on the specific identifier 45.

The local computer 222 is coupled to the electric device 67, performs the access control function 411 of the specific access control area HQ11 by using the reader 221 and the electric device 67, generates the access message GD11 for the access control function 411 according to the specific control bit 37211 under a condition that the specific control bit 37211 satisfies the specific condition, and sends the access message GD11 to the specific external device 79 according to the first communication target indicator 37S. The system 202 further includes the electric device 67. For instance, the electric device 67 is coupled to the operation device 28. For instance, the electric device 67 is coupled to the local computer 222, and includes an actuating mechanism 42 used to control the specific access control area HQ11.

In some embodiments, the electronic tag 301 has a user 901, or is used by the user 901. The object 43 is one of the user 901 and an application device 902. The specific condition is one selected from a plurality of conditions including a first condition, a second condition and a third condition. The first condition is that the specific control bit 37211 represents the first state KA11. The second condition is that the specific control bit 37211 represents the second state KA21. The third condition is that the specific control bit 37211 represents one of the first and the second states KA11 and KA21. For instance, the electronic tag 301 is one selected from a group consisting of a passive tag, a semi-passive tag and an active tag.

Under a condition that the specific control bit 37211 satisfies the third condition, a content of the access message GD11 is dependent on a bit value of the specific control bit 37211. Via the reader 221, the local computer 222 controls the electric device 67 according to the specific control bit 37211 to cause the object 43 to be in a specific state KAA1 represented by the specific control bit 37211. The specific control bit 37211 corresponds to a specific start signal JN11, and is one selected from a plurality of control bits 37211, 37212, . . . stored in the electronic tag 301, wherein the plurality of control bits 37211, 37212, . . . is included in a start control table 3721. For instance, the specific control bit 37211 is arranged in the start control table 3721 according to a specific bit serial number. For instance, the local computer 222 provides the specific start signal JN11.

Under a condition that the specific control bit 37211 represents the first state KA11, the specific state KAA1 is the first state KA11, and the local computer 222, via the reader 221, controls the specific start signal JN11 to start the electric device 67 according to the selected specific control bit 37211, wherein the electric device 67 is started to authorize the object 43 to enter the specific access control area HQ11. Under a condition that the specific control bit 37211 represents the second state KA21, the specific state KAA1 is the second state KA21, and the local computer 222, via the reader 221, controls the electric device 67 to generate a warning signal WN11 used to indicate that the object 43 is prohibited to enter the specific access control area HQ11.

In some embodiments, the reader 221 is located at a reader location LR11. The reader location LR11 is coupled to the specific access control area HQ11, and is represented by a location code CL11 corresponding to the specific control bit 37211. The local computer 222 obtains the location code CL11 and the start control table 3721 coining from the electronic tag 301 when the electronic tag 301 is applied to the access control function 411 via the reader 221. For instance, the location code CL11 is a location serial number. The location code CL11 and the specific bit serial number have a specific mathematical relationship therebetween. For instance, the location code CL11 can be configured to be the same as or different from the specific bit serial number.

The local computer 222 selects the specific control bit 37211 from the plurality of control bits 37211, 37212, . . . of the obtained start control table 3721 according to the obtained location code CL11. For instance, the local computer stores the location code CL11, and obtains the stored location code CL11 when the electronic tag 301 is applied to the access control function 411. At a time desired by the user 901, the local computer 222 replaces the stored first communication target indicator 37S with a second communication target indicator 37U desired by the user 901 via the reader 221, wherein the first and the second communication target indicators 37S and 37U are different. For instance, the local computer 222 obtains the specific bit serial number according to the obtained location code CL11 and the specific mathematical relationship, and selects the specific control bit 37211 from the plurality of control bits 37211, 37212, . . . of the obtained start control table 3721 according to the obtained specific bit serial number.

In some embodiments provided according to the illustrations in FIGS. 16 and 17, an electronic tag 301 to be secured by a system 202 is coupled to an object 43, and includes a tag memory 34. The tag memory 34 stores a first communication target indicator 37S and a specific control bit 37211. The first communication target indicator 37S is configured to indicate a specific external device 79. The specific control bit 37211 represents one of a first state KA11 and a second state KA21. The first state KA11 is that the object 43 has been authorized to enter a specific access control area HQ11 coupled to an electric device 67. The second state KA21 is that the object 43 has been prohibited to enter the specific access control area HQ11.

The electronic tag 301 is applied to an access control function 411 of the specific access control area HQ11 performed by the system 202 using the electric device 67. Under a condition that the specific control bit 37211 satisfies a specific condition, the specific control bit 37211 is used by the system 202 to generate an access message GD11 for the access control function 411, and the first communication target indicator 37S is used by the system 202 to send the access message GD11 to the specific external device 79.

In some embodiments proposed according to the illustrations in FIGS. 16 and 17, a method for securing an electronic tag 301 is provided. The electronic tag 301 is coupled to an object 43 and stores a first communication target indicator 37S and a specific control bit 37211. The first communication target indicator 37S is configured to indicate a specific external device 79. The specific control bit 37211 represents one of a first state KA11 and a second state KA21. The first state KA11 is that the object 43 has been authorized to enter a specific access control area HQ11 coupled to an electric device 67. The second state KA21 is that the object 43 has been prohibited to enter the specific access control area HQ11.

The method includes the following steps. An access control function 411 of the specific access control area HQ11 is performed by using the electric device 67. The electronic tag 301 is applied to the access control function 411. Under a condition that the specific control bit 37211 satisfies a specific condition, an access message GD11 is generated for the access control function 411 according to the specific control bit 37211. The access message GD11 is sent to the specific external device 79 according to the first communication target indicator 37S.

In some embodiments, the electronic tag 301 has a user 901, and the object 43 is one of the user 901 and an application device 902. The specific condition is one selected from a plurality of conditions including a first condition, a second condition and a third condition. The first condition is that the specific control bit 37211 represents the first state KA11. The second condition is that the specific control bit 37211 represents the second state KA21. The third condition is that the specific control bit 37211 represents one of the first and the second states KA11 and KA21.

Under a condition that the specific control bit 37211 satisfies the third condition, a content of the access message GD11 is dependent on a bit value of the specific control bit 37211. The specific control bit 37211 corresponds to a specific start signal JN11, and is one selected from a plurality of control bits 37211, 37212, ... stored in the electronic tag 301, wherein the plurality of control bits 37211, 37212, ... is included in a start control table 3721. The method further includes a step: the electric device 67 is controlled according to the selected specific control bit 37211 to cause the object 43 to be in a specific state KAA1 represented by the specific control bit 37211.

In some embodiments, the step of controlling the electric device 67 includes the following sub-steps. Under a condition that the specific control bit 37211 represents the first state KA11, the specific start signal JN11 is controlled to start the electric device 67 according to the specific control bit 37211, wherein the electric device 67 is started to authorize the object 43 to enter the specific access control area HQ11. Under a condition that the specific control bit 37211 represents the second state KA21, the electric device 67 is controlled to generate a warning signal WN11 used to indicate that the object 43 is prohibited to enter the specific access control area HQ11.

The method further includes the following steps. A reader 221 is provided for reading the first communication target indicator 37S and the specific control bit 37211, wherein the reader 221 is located at a reader location LR11, and the reader location LR11 is represented by a location code CL11 corresponding to the specific control bit 37211. The location code CL11 and the start control table 3721 coining from the electronic tag 301 is obtained when the electronic tag 301 is applied to the access control function 411 by using the reader 221.

The method further includes the following steps. The specific control bit 37211 is selected from the plurality of control bits 37211, 37212, ... of the obtained start control table 3721 according to the obtained location code CL11. At a time desired by the user 901, the stored first communication target indicator 37S is replaced with a second communication target indicator 37U desired by the user 901 via the reader 221, wherein the first and the second communication target indicators 37S and 37U are different.

Figure 18:
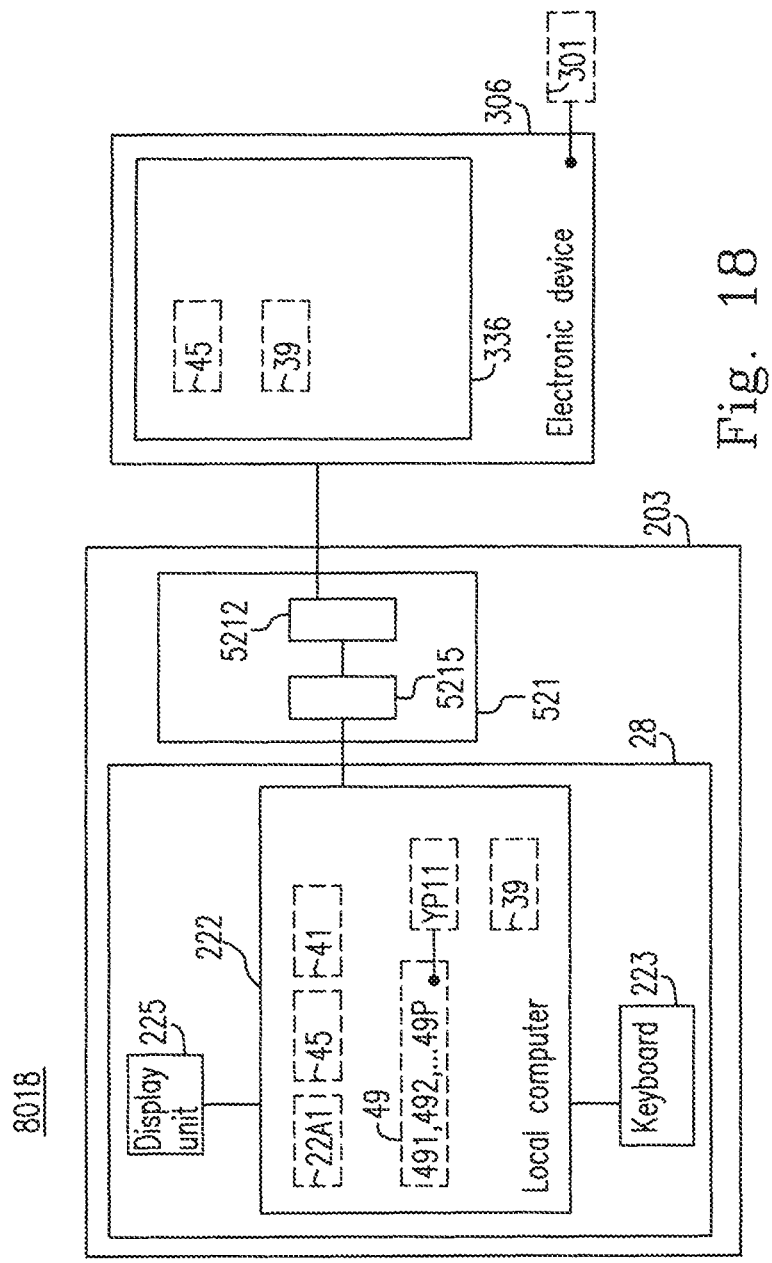
FIG. 18 is a functional diagram showing a communication system according to various embodiments of the present disclosure.
Figure 19:
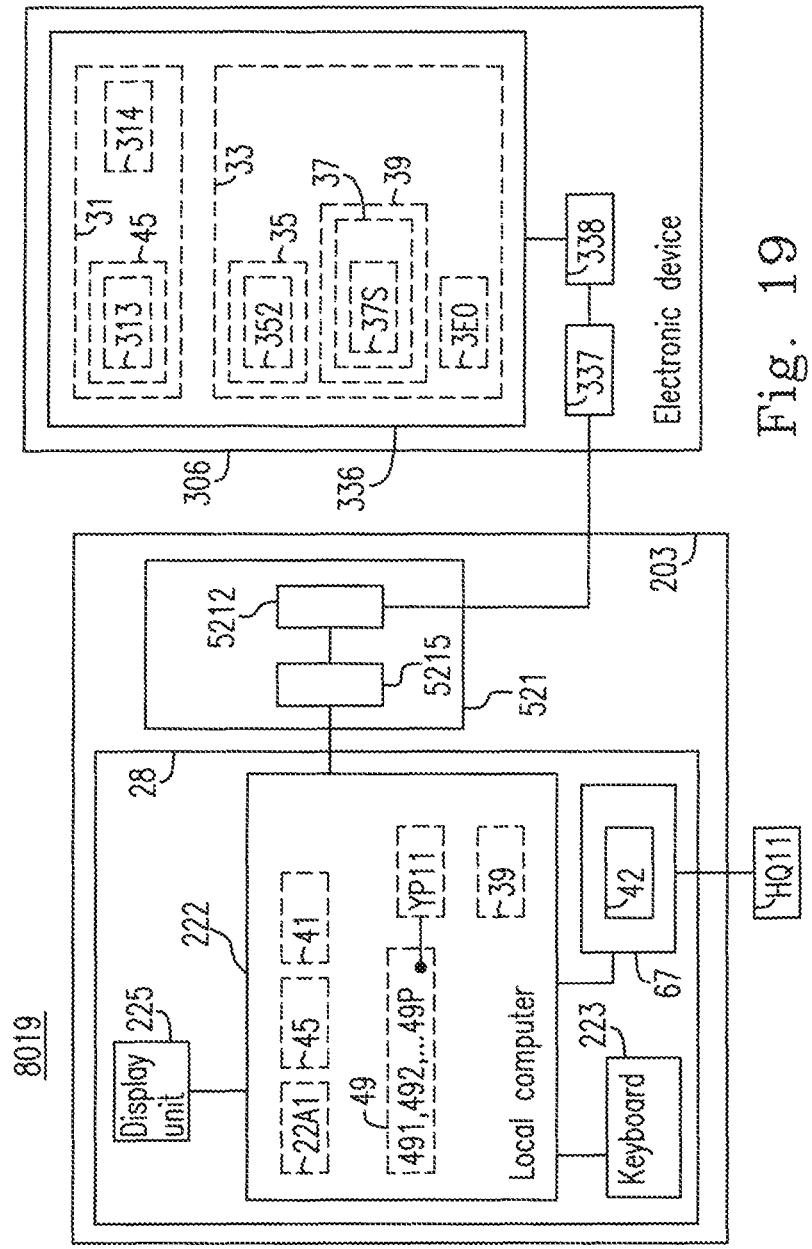
FIG. 19 is a functional diagram showing an implementation structure associated with the communication system 8018 shown in FIG. 18.

Please refer to FIG. 18 and FIG. 19. FIG. 18 is a functional diagram showing a communication system 8018 according to various embodiments of the present disclosure. FIG. 19 is a functional diagram showing an implementation structure 8019 associated with the communication system 8018 shown in FIG. 18. As shown in FIGS. 18 and 19, the communication system 8018 includes a system 203 and an electronic device 306 used to communicate with the system 203.

The system 203 for securing the electronic device 306 having a specific identifier 45 includes an operation device 28 and a reader 521 coupled to the operation device 28. The operation device 28 provides a password mask 22A1 and a information table 49, wherein the information table 49 includes a plurality of information elements 491, 492, ... 49P arranged according to a first order YP11. The operation device 28 adjusts the first order YP11 according to the specific identifier 45 and the password mask 22A1 to generate an information table 39.

Please additionally refer to FIGS. 1-15. In some embodiments, the electronic device 306 is an electronic tag 301. The electronic tag 301 is a radio frequency identification (RFID) tag 3. The system 203 is an electronic device item processing system, which can be an electronic tag item processing system. The system 203 is one of the system 20 and an RFID tag item processing system 22. The operation device 28 is an RFID tag item operation device, and includes a local computer 222, a keyboard 223 and a display unit 225. The local computer 222 obtains the specific identifier 45 from the electronic device 306 through the reader 521, provides the password mask 22A1 and the information table 49, adjusts the first order YP11 according to the specific identifier 45 and the password mask 22A1 to generate the information table 39, and writes the information table 39 to the electronic device 306 via the reader 521. The keyboard 223 is coupled to the local computer 222.

The display unit 225 is coupled to the local computer 222. The local computer 222 controls the reader 521, the keyboard 223 and the display unit 225, and is used to communicate with the electronic device 306 via the reader 521. For instance, the keyboard 223 includes a numerical key pad 2231 controlled by the local computer 222. The reader 521 includes a communication interface circuit 5212 and a control circuit 5215 coupled to the communication interface circuit 5212 and the local computer 222, and can be the same as the reader 221. The control circuit 5215 controls the communication interface circuit 5212. The communication interface circuit 5212 is used to communicate with the electronic device 306.

In some embodiments, the operation device 28 further includes an electric device 67 coupled to the local computer 222, wherein the local computer 222 controls the electric device 67. In some embodiments, the operation device 28 performs a specific application function 41 to obtain an application code information 332 by reading the electronic device 306 via the reader 521. The local computer 222 performs the specific application function 41 by using the obtained application code information 332. In some embodiments, the electric device 67 is separate from the operation device 28, and is remotely controlled by the operation device 28. For instance, the electric device 67 is coupled to the operation device 28, and includes an actuating mechanism 42.

The electronic device 306 includes a device memory 336, a communication interface circuit 337 and a control circuit 338 coupled to the communication interface circuit 337 and the device memory 336. The control circuit 338 controls the communication interface circuit 337 and the device memory 336. The communication interface circuit 337 is used to communicate with the communication interface circuit 5212. The local computer 222 writes the information table 39 to the device memory 336 through the reader 521, the communication interface circuit 337 and the control circuit 338. For instance, the electronic device 306 is one selected from a group consisting of a passive device, a semi-passive device and an active device. For instance, the reader 521 is used to communicate with the electronic device 306 under a wire or wireless link between the communication interface circuit 5212 and the communication interface circuit 337.

The device memory 336 stores a device identifier 31 and an item information table 33. The device identifier 31 includes a device serial number 313 and a manufacturer identifier 314, wherein the specific identifier 45 is one of the device serial number 313 and the device identifier 31. The item information table 33 includes the information table 39, an information table 35, an item kill password 3B1, an item access password 3B2 and a specific portion 331. For instance, the electronic device 306 is identified by one of the device identifier 31 and the specific identifier 45, or is identified based on the specific identifier 45.

In some embodiments, in a configuration phase, the local computer 222 determines the item information table 33, and causes the reader 521 to write the item information table 33 to the electronic device 306. In addition, the device identifier 31 and the device serial number 313 can be a tag identifier and a tag serial number, respectively. The device memory 336 can be the same as the tag memory 34.

The information table 35 has a first storage capacity quantified with a first capacity value, and includes an authentication information 350, an encryption key 352 and an other information 354. The authentication information 350 includes an item code 357, a user serial number 355 and an item expiration date (not shown). The encryption key 352 includes a sub-information 353. The other information 354 includes an item serial number 358 and a PC information 351. The plurality of information elements 491, 492, . . . 49P have a first total information element number. For instance, the first capacity value is equal to a word length of the information table 35.

In some embodiments, the information table 39 has a second storage capacity AT11 quantified with a second capacity value, and includes a plurality of information elements [63:48]_374, [47:32]_374, . . . [15:0]_375, [15:0]_37E, . . . [15:0]_37K and [15:0]_37J with a second total information element number equal to the first total information element number, wherein the plurality of information elements 491, 492, . . . 49P have an information content the same as that of the plurality of information elements [63:48]_374, [47:32]_374, . . . [15:0]_375, [15:0]_37E, . . . [15:0]_37K and [15:0]_37J, and the plurality of information elements [63:48]_374, [47:32]_374, . . . [15:0]_375, [15:0]_37E, . . . [15:0]_37K and [15:0]_37J are arranged according to a second order different from the first order YP11. For instance, the second capacity value is equal to a word length of the information table 39.

The encryption key 352 is derived from a predetermined value VP11. The predetermined value VP11 is equal to one of the second capacity value and the second total information element number. The plurality of information elements [63:48]_374, [47:32]_374, . . . [15:0]_375, [15:0]_37E, . . . [15:0]_37K and [15:0]_37J include an authentication information 371, a communication target indicator 37S and an other information 372. The other information 372 includes a start control table 3721. The specific portion 331 of the item information table 33 records an application code information 332.

In some embodiments, the local computer 222 stores a system maintenance information G3, wherein the system maintenance information G3 includes a computer type, an authentication type, the information table 49, a specific system constant, the predetermined value, the first and the second capacity values, the password mask 22A1, a password mask 2271, a hash table 229 and an order adjustment table 22C.

The sub-information 253 represents one of the predetermined value and the specific system constant. The communication target indicator 37S includes at least one of a phone number and an email address, and is used to link to a specific external device 79. The specific external device 79 is a mobile device. The electronic device 306 is applied to a specific application function 41. The item code 357 indicates the specific application function 41 for the electronic device 306 to be applied to.

In some embodiments, the local computer 222 is configured to perform the specific application function 41 for using the application code information 332, and control the actuating mechanism 42 near to an object 43 using the electronic device 306. The specific application function 41 includes at least one selected from a group consisting of a finance function, an access control function, a cash paying function, a credit function, a counter service function, a transport charge function, a communication function, a logistics function, a production management function, a work attendance management function, an authentication function, a goods sale management function, a parking charge function, a supply chain function, an item level tracking function, an assets management function and a combination thereof.

The local computer 222 authenticates the electronic device 306 in an authentication phase after the configuration phase, generates a transaction message G1 for the specific application function 41 according to the application code information 332 after the authentication phase, and sends the transaction message G1 to the specific external device 79 according to the communication target indicator 37S.

In some embodiments, the information table 49 is an original information table. The local computer 222 obtains the specific identifier 45 from the electronic device 306 through the reader 521, and generates the information table 39 according to the obtained specific identifier 45, the password mask 22A1 and the information table 49. The specific identifier 45 has a binary value having M bits, wherein M>1. The local computer 222 selects N bits from the M bits according to the password mask 22A1 to generate a value K81, wherein N>1.

The local computer 222 encodes the value K81 to generate a control signal K82. The local computer 222 performs an order adjustment operation (such as 22C2) according to the order adjustment table 22C, the information table 49 and the control signal K82 to generate the information table 39; for instance, the information table 39 is equal to the information table $39_2$.

In some embodiments, the local computer 222 performs an authentication operation to authenticate the electronic device 306 in the authentication phase. The authentication operation reads the information table 35 of the electronic device 306 via the reader 521. The authentication operation decrypts the encryption key 352 to determine whether the sub-information 353 represents one of the predetermined value and the specific system constant in order that the local computer 222 authenticates the electronic device 306 for a confirmation that the electronic device 306 is compatible with the system 203 and is an anti-counterfeiting device.

When the local computer 222 determines one of the predetermined value and the specific system constant which the sub-information 353 represents, the local computer 222 confirms that the authentication operation passes. The local computer 222 reads the information table 39 of the electronic device 306 via the reader 521 after the electronic device 306 passes the authentication operation.

In some embodiments, the local computer 222 transforms the information table 39 into an information table 59 according to the specific identifier 45, the password mask 22A1 and the information table 39 by performing a reverse order adjustment operation, wherein the information table 59 includes a plurality of information elements having an information content the same as that of the plurality of information elements 491, 492, . . . 49P, and the plurality of information elements of the information table 59 are arranged according to a third order the same as the first order YP11. The local computer 222 performs the reverse order adjustment operation according to the order adjustment table 22C, the information table 39 and the control signal K82 to generate the information table 59.

The information table 39 is started to be stored in a memory block RB2 in the device memory 336 at a first specific time. The memory block RB2 originally stores an information table 69 at a second specific time before the first specific time. The local computer 222 reads the information table 69 via the reader 521 at a third specific time between the first and the second specific times, and configures the read information table of the information table 69 to form the information table 49.

Embodiments

1. A method of building an item information table in an RFID tag using encrypted keys for a radio frequency identification tag item processing system (RFID TIPS), the RFID tag including a tag identifier and a tag memory, the tag memory being divided into memory sectors and blocks, the tag identifier including a tag serial number and a manufacturer identifier, the RFID TIPS allocating an RFID tag data structure and a set of system constants in its working memory, the set of system constants including length of first information table, length of second information table, first password mask, and hash table, the RFID tag data structure including Reserved Memory (RM) block, Tag Identifier (TID) block, Unique Item Identifier (UII) block, and User Memory (UM) block, the UII block including first memory block and second memory block, the TID block including a tag identifier, the tag identifier including a tag serial number and a manufacturer identifier, an item information table being stored the RFID tag data structure according to a plural authentication steps, the item information table including first information table, second information table, item kill password and item access password, first information table being stored the first memory block, second information table being stored the second memory block, an item kill password and an item access password being stored the RM block, the first information table including first authenticating information, first encrypted key and first other information, the first authenticating information including item code, user serial number and item expiration date, the first encrypted key including an encrypted second sub-information, the first other information including item serial number and first PC information, the second information table including a receiving brief message phone number and second other information, the second other information including a start control table, the second sub-information indicating the length of the second information table, the method comprising steps of:

reading the tag identifier of the RFID tag and storing it in the tag identifier of the RFID tag data structure which includes a tag serial number and a manufacturer identifier;

creating the item code, the item serial number, and the user serial number;

setting the item expiration date;

setting the second sub-information and creating the first encrypted key;

setting the first PC information to include the length of first information table;

obtaining the receiving brief message phone number and parameter values of the second other information in the second information table, the parameter values includes signal values of the start control table;

creating the item kill password and the item access password according to the tag serial number, the first password mask, and the hash table; and storing the first information table, the second information table, the item kill password, and the item access password in the RFID tag.

2. The method of Embodiment 1, wherein creating the item code, the item serial number, and the user serial number according to a set of encoding and serializing method, and the method further comprises steps of:

concatenating the item code and the item serial number to become an organization identifier which includes the name, code number, or business unified serial number of company or organization, or concatenating the item code and the item serial number to become a community identifier which includes the name, code number, or business unified serial number of community or association, or creating the item code which includes RFID business sub-code, RFID device sub-code, RFID selecting enable function sub-code, RFID function sub-code, RFID deployment country sub-code, and any combination of above sub-codes, wherein:

the RFID business sub-code includes (1) finance, (2) transportation, (3) logistics, (4) supply chain, (5) item level tracking, (6) access control and asset management, (7) scientific technology, and (8) system reserved fields;

the RFID device sub-code includes device made of an RFID tag, or assembled other device with an RFID tag, including (1) nonconductive adhesive label device, (2) nonconductive plastic packaged device having a thickness with its shape as card, box, round, polygon, or symbolizing an event, people, or region, (3) display unit or mobile device for receiving and display a brief message or image, (4) device assembled an RFID tag with other nonconductive material including wood, leather, non-fabric, or a nonconductive packaging material attaching to an metal layer;

the RFID selecting enable function sub-code includes user selected enable functions for a RFID business sub-code, the user selected enable functions includes when business sub-code is finance, (1) to enable finance, credit, counter service, access control, item level tracking, and pay cash, (2) or to enable finance, credit, counter service, pay cash, sending brief message, access control, and item level tracking, (3) or to enable finance, credit, counter service, pay cash, select monetary base for cash card balance, access control, and item level tracking, (4) or to enable finance, credit, counter service, pay cash, and system reserved functions;

the RFID function sub-code includes integrated RFID functions in applying an RFID tag to a RFID business sub-code, when RFID business sub-code is finance, the integrated RFID functions includes finance, credit, counter service, pay cash, send brief message, select monetary base for cash card balance, passive UHF long read distance, passive UHF short read distance, passive UHF short read distance with high memory capacity, HF short read distance, HF short read distance with high memory capacity, semi-passive UHF long read distance, access control, and item level tracking, when RFID business sub-code is transportation, the integrated RFID functions includes semi-passive UHF far read distance (50 to 100 meters) for locating while moving, semi-passive UHF far read distance with high memory capacity (above 8K words), passive UHF long read distance (above 5 to 10 meters) for locating, passive UHF long read distance with high memory capacity (above 64K words), passive UHF near read distance (below 50 to 100 millimeters), passive UHF near read distance with high memory capacity, passive HF short read distance (below 5 to 10 millimeters) for access control and locating, passive HF short read distance with high memory capacity;

the RFID deployment country sub-code includes the divided countries and regions for a RFID business sub-code according to the deployed country of an RFID tag;

creating the item serial number and the user serial number comprises:

generating code number according to sub-code including organization for a RFID business sub-code of the item code;

generating code number according to sub-codes including area, location, building, and floor for a RFID business sub-code of the item code; and when not using the item code and the item serial number, generating the user serial number includes setting a serial number starting from 1, or a system code number indicating finance authenticating card system, finance cash authenticating card system, credit cash authenticating card system, finance credit cash authenticating card system, finance access control authenticating card system, finance cash access control authenticating card system, credit cash access control authenticating card system, finance credit cash access control authenticating card system, or creating the user serial number comprises:

generating a serial number starting from 1 for the item code and the item serial number, or generating code number according to sub-codes of the user serial number including user group and discount rate.

3. The method of Embodiments 1-2, wherein setting the second sub-information and creating the first encrypted key further comprises steps of:

setting the second sub-information includes setting to be the length of the second information table or its code number, or other system constant; and creating the first encrypted key including a set of operations on the tag serial number, the user serial number, the second sub-information, and/or a combination of the above, the set of operations comprises:

the first encrypted key being the sum of the tag serial number, the user serial number, and the second sub-information, or the first encrypted key being the sum of the tag serial number, and the second sub-information, or the set of operations including sum, subtract, multiply, logic, and/or a combination of the above, or the first encrypted key resulting from prior operations being 3 words long, of which only its rightmost 2 or 1 word can be extracted as the final first encrypted key.

4. The method of Embodiments 1-3, wherein obtaining the values of parameters in the second information table further includes obtaining values of parameters in the second other information, the parameters includes a start control table which includes access control signal values used for a community or SME, and is stored in different memory sector or block of the RFID tag data structure, the method further comprises steps of:

making each and every bit of the start control table corresponding to a start signal to an access control area, when the corresponding bit value being a 1, indicating passing through the access control area is allowed, and proceeding to start, display, and record the electric devices for passing through the access control area which includes sending a brief message to the receiving brief message phone number, when the corresponding bit value being a 0, indicating passing through the access control area is not allowed, and proceeding to start, display, and record the electric devices for not passing through the access control area which includes sending a brief message to the receiving brief message phone number, the start control table being allocated to the UII block is used for centralized managing the passing through and start of electric devices of plural access control areas;

the start control table being allocated to other memory block of the RFID tag including the UM block is also used for centralized managing the passing through and start of electric devices of plural access control areas; and setting unused bits in the start control table to a default value 0.

5. The method of Embodiments 1-4, wherein creating the item kill password and the item access password further includes a method of obtaining a set of hash values, the method comprises steps of:

generating a specific bit from the tag serial number and the first password mask as a controlling signal to the hash table, when the value of specific bit being an odd number, obtaining a first kill password value and a first access password value, and setting the first kill password to the first kill password value and the first access password to the first access password value, when the value of specific bit being an even number, obtaining a second kill password value and a second access password value, and setting the second kill password to the second kill password value and the second access password to the second access password value; or generating P specific bits from the tag serial number and the first password mask as controlling signals to a hash table;

obtaining a set of item kill password value and item access password value from the hash table by the P specific bits, the hash table including at most 2P set of item kill password value and item access password value; and setting the set of item kill password value and item access password value to the item kill password and the item access password respectively.

6. A method of authenticating an RFID tag using encrypted key for a radio frequency identification tag item processing system (RFID TIPS) according to Embodiment 1-5, the RFID TIPS including a set of system constants which including length of first information table, length of second information table, and hash table, the RFID tag including a tag identifier and an item information table which being built in accordance with a plural authentication steps, the item information table including first information table and second information table, the first information table including first authenticating information, first encrypted key and first other information, the first authenticating information including item code, user serial number and item expiration date, the first other information including item serial number and first PC information, the second information table including a receiving brief message phone number and second other information, the method comprising steps of:

selecting and inventorying the RFID tag based on the item code and the item serial number;

reading the first information table including first encrypted key and item expiration date;

verifying the length of the first information table and the item expiration date;

reading the tag identifier which includes a tag serial number and a manufacturer identifier;
decrypting the first encrypted key to obtain the second sub-information;
verifying the second sub-information to authenticate the RFID tag for anti-counterfeiting and belonging to the same system;
reading the second information table based on the second sub-information;
using the second other information and the receiving brief message phone number; and
ending the communication dialog with the RFID tag.

7. The method of Embodiments 1-6, wherein decrypting the first encrypted key further comprises steps of:
performing a set of operations being the reverse to the encrypting operations on the first encrypted key, the tag serial number, the user serial number to obtain the second sub-information, the set of operations comprises:
obtaining the second sub-information by subtracting the tag serial number and the user serial number from the first encrypted key, or
obtaining the second sub-information by subtracting the tag serial number from the first encrypted key, or
obtaining the second sub-information by performing a set of operations being the reverse to the encrypting operations including add, sum, subtract, multiply, logic, and/or a combination of the above.

8. A method according to Embodiments 1-7, the RFID TIPS allocating an RFID tag data structure and a set of system constants in its working memory, the set of system constants including length of first information table, length of second information table, first password mask, second password mask, hash table, and adjust ordering table, and the second information table being stored in the RFID tag data structure including receiving brief message phone number and second other information, the second other information including a RFID access control table, the second sub-information indicating the length of the second information table, the method of building the item information table comprising steps of:
reading the tag identifier of the RFID tag and storing it in the tag identifier of the RFID tag data structure which includes a tag serial number and a manufacturer identifier;
creating the item code, the item serial number, and the user serial number;
setting the item expiration date;
setting the second sub-information and creating the first encrypted key;
setting the first PC information to include the length of first information table;
obtaining parameter values of the second information table which including the receiving brief message phone number, and parameter values of the second other information which including signal values of the RFID access control table;
creating the item kill password and the item access password according to the tag serial number, the first password mask, and the hash table;
creating a second information table with parameter values stored in different ordering according to the tag serial number, the second password mask, and the original second information table; and
storing the first information table, the second information table, the item kill password, and the item access password in the RFID tag.

9. The method of Embodiments 1-8, wherein creating a second information table with parameter values stored in different ordering further includes a method of obtaining a set of adjust ordering operation, the method comprises steps of:
generating a N specific bits from the tag serial number and the second password mask as controlling signals to the adjust ordering table;
obtaining a set of adjust ordering operation from the adjust ordering table according to the N specific bits, the adjust ordering table including at most 2N sets of adjust ordering operation; and
performing the set of adjust ordering operation on the parameters of the second information table to obtain a new second information table with parameter values stored in different ordering.

10. The method of Embodiments 1-9, wherein obtaining the parameter values of the second information table further includes obtaining parameter values of second other information, the second other information includes a RFID access control table which includes access control signal values used for organizations of cross countries, regions, and cities, stored in different memory sector or block of the RFID tag data structure, the method further comprises steps of:
making each and every bit of the RFID access control table corresponding to a start signal to an access control area, when the corresponding bit value being a 1, indicating passing through the access control area is allowed, and proceeding to start, display, and record the electric devices for passing through the access control area which includes sending a brief message to the receiving brief message phone number, when the corresponding bit value being a 0, indicating passing through the access control area is not allowed, and proceeding to start, display, and record the electric devices for not passing through the access control area which includes sending a brief message to the receiving brief message phone number, the RFID access control table being allocated to the UII block is used for centralized managing the passing through and start of electric devices of plural access control areas;
the RFID access control table being allocated to other memory block of the RFID tag including the UM block is also used for centralized managing the passing through and start of electric devices of plural access control areas; and
setting unused bits in the RFID access control table to a default value 0.

11. A method of authenticating an RFID tag using encrypted key for a radio frequency identification tag item processing system (RFID TIPS) according to Embodiments 1-10, the RFID TIPS including a set of system constants which including length of first information table, length of second information table, hash table, and adjust ordering table, the RFID tag including a tag identifier and an item information table which being built in accordance with a plural authentication steps, the item information table including first information table and second information table, the first information table including first authenticating information, first encrypted key and first other information, the first authenticating information including item code, user serial number and item expiration date, the first other information including item serial number and first PC information, the second information table including a receiving brief message phone number and second other information, the method comprising steps of:
selecting and inventorying the RFID tag based on the item code and the item serial number;
reading the first information table including first encrypted key and item expiration date;

verifying the length of the first information table and the item expiration date;

reading the tag identifier which includes a tag serial number and a manufacturer identifier;

decrypting the first encrypted key to obtain the second sub-information;

verifying the second sub-information to authenticate the RFID tag for anti-counterfeiting and belonging to the same system;

reading the second information table based on the second sub-information;

obtaining the original second information table by performing a set of unadjust ordering operation;

using the second other information and the receiving brief message phone number; and ending the communication dialog with the RFID tag.

12. The method of Embodiments 1-11, wherein obtaining the original second information table by performing a set of unadjust ordering operation further comprises a method of obtaining a set of adjust ordering operation, the method comprises steps of:

generating a N specific bits from the tag serial number and the second password mask as controlling signals to the adjust ordering table;

obtaining a set of adjust ordering operation from the adjust ordering table according to the N specific bits, the adjust ordering table includes at most 2N sets of adjust ordering operation; and performing the set of unadjust ordering operation being the reverse of adjust ordering operation on the parameters of the second information table to obtain a second information table with parameter values stored in its original order.

13. A method according to Embodiments 1-12, the RFID TIPS allocating an RFID tag data structure and a set of system constants in its working memory, the set of system constants including length of first information table, length of second information table, first password mask, second password mask, CompType, AuthenticationType, hash table, and adjust ordering table, and the second information table being stored in the RFID tag data structure including second authentication information, receiving brief message phone number and second other information, the second authentication information including an user password, the second other information including a RFID access control table, the second sub-information indicating the length of the second information table, the method of building the item information table comprising steps of:

reading the tag identifier of the RFID tag and storing it in the tag identifier of the RFID tag data structure which including a tag serial number and a manufacturer identifier;

creating the item code, the item serial number, and the user serial number;

setting the item expiration date;

setting the second sub-information and creating the first encrypted key;

setting the first PC information to include the length of first information table;

obtaining parameter values of the second information table which including the receiving brief message phone number, the user password, and signal values of the RFID access control table;

creating the item kill password and the item access password according to the tag serial number, the first password mask, and the hash table;

creating a new second information table with parameter values stored in different ordering according to the tag serial number, the second password mask, and the original second information table; and storing the first information table, the new second information table, the item kill password, and the item access password in the RFID tag.

14. A method of authenticating an RFID tag using encrypted key for a radio frequency identification tag item processing system (RFID TIPS) according to Embodiments 1-13, the RFID TIPS including a set of system constants which including length of first information table, length of second information table, CompType, AuthenticationType, hash table, and adjust ordering table, the RFID tag including a tag identifier and an item information table which being built in accordance with a plural authentication steps, the item information table including first information table and second information table, the first information table including first authenticating information, first encrypted key and first other information, the first authenticating information including item code, user serial number and item expiration date, the first other information including item serial number and first PC information, the second information table including second authentication information, receiving brief message phone number and second other information, the second authentication information including an user password, the method comprising steps of:

selecting and inventorying the RFID tag based on the item code and the item serial number;

reading the first information table including first encrypted key and item expiration date;

verifying the length of the first information table and the item expiration date;

reading the tag identifier which includes a tag serial number and a manufacturer identifier;

decrypting the first encrypted key to obtain the second sub-information;

verifying the second sub-information to authenticate the RFID tag for anti-counterfeiting and belonging to the same system;

reading the second information table based on the second sub-information;

obtaining the original second information table by performing a set of unadjust ordering operation;

authenticating the second authentication information for using the second other information and the receiving brief message phone number; and ending the communication dialog with the RFID tag.

15. The method of Embodiments 1-14, wherein authenticating the second authentication information comprises steps of:

requesting user to enter an authenticating password through a numerical key pad;

selecting an authenticating information from the second authentication information according to CompType and AuthenticationType; and comparing the authenticating password to the authenticating information.

16. A method according to Embodiments 1-15, the RFID TIPS allocating an RFID tag data structure and a set of system constants in its working memory, the set of system constants including length of first information table, length of second information table, length of third information table, first password mask, second password mask, CompType, AuthenticationType, hash table, and adjust ordering table, and an item information table being stored in the RFID tag data structure, the item information table including first information table, second information table, third information table, item kill password and item access password, the first information table being stored in the first memory block, the second information table being stored in the second memory block, the third information table being stored in the UM block, an item kill password and an item access password being stored in the RM block, the first information table including first authenticating information, first encrypted key and first other information, the first authenticating information including item code, user serial number and item expiration date, the first encrypted key including an encrypted second sub-information, the first other information including item serial number and first PC information, the second information table including second authenticating information, second encrypted key, and second other information, the second encrypted key including an encrypted third sub-information, the second sub-information indicating the length of the second information table, the third sub-information indicating the length of the third information table, the method of building the item information table comprising steps of:

reading the tag identifier of the RFID tag and storing it in the tag identifier of the RFID tag data structure which including a tag serial number and a manufacturer identifier;

creating the item code, the item serial number, and the user serial number;

setting the second sub-information and creating the first encrypted key;

setting the first PC information to include the length of first information table;

obtaining parameter values of the second information table including the default values of plural passwords;

setting the third sub-information and creating the second encrypted key;

creating the item kill password and the item access password according to the tag serial number, the first password mask, and the hash table;

creating a new second information table with parameter values stored in different ordering according to the tag serial number, the second password mask, and the original second information table;

obtaining parameter values of the third information table; and storing the first information table, the new second information table, the item kill password, and the item access password in the RFID tag.

17. The method of Embodiments 1-16, wherein setting the third sub-information and creating the second encrypted key further comprises steps of:

setting the third sub-information includes setting to be the length of the third information table or its code number, or other system constant; and creating the second encrypted key including a set of arithmetic and logic operations on the tag serial number, the user serial number, and/or a combination of the above, the set of operations includes:

the second encrypted key being the sum of the tag serial number, and the third sub-information, or the second encrypted key being equal to the third sub-information, or the second encrypted key resulting from prior operations being 3 words long, of which only its rightmost 2 or 1 word can be extracted as the final second encrypted key.

18. The method of Embodiments 1-17, wherein the second information table further comprises:

a second authentication information and a second other information, the second authentication information comprises savings account password, counter service password, credit account password, compare failed count, cash card balance, and any arbitrary ordering of parameters, the second other information includes savings account number, credit account number, cash card information, and any arbitrary ordering of parameters;

the cash card information comprises cash card store category, cash card merchant serial number, cash card balance monetary base, cash card use status, and cash card getting on station number;

creating the cash card store category comprises creating store business sub-code, store organization sub-code, store branch sub-code, and any arbitrary combination of sub-codes, wherein the store business sub-code comprises transportation service, food and drink, retails, department stores, household appliance, entertainment, distribution channel, and other reserved store category, the store organization sub-code for store business sub-code being retails includes 7-11 chain convenient stores, all family chain stores, all family chain stores, Evergreen Fresh Produce company, South North Multigrain company, Prosper Drink company, Everyday Automatic Vending company, and other reserved store organization, the store organization sub-code for store business sub-code being transportation service comprises Taipei transportation company, Capital transportation company, Doo Doo Doo Parking Lot Company, Keelung transportation company, and other reserved store organization, the store branch sub-code comprises creating store branches for the store organization sub-code in the store business sub-code, wherein for the Doo Doo Doo Parking Lot Company in transportation service comprises Taipei Shilin branch, Taoyuan Chungli branch, Taichung Qingshui branch, Tainan Yungkang branch, Taoyuan International Airport branch, and other reserved store branch; and creating cash card merchant serial number comprises generating store merchant serial number for a store categorized by the cash card store category, which comprises generating store merchant serial number from 1 to a maximum number 65,635, or from 1D to 9999D for a retail store in retails business, or generating public transport route number from 1D to 9999D for a transport company in transportation service business, or generating on-line game number from 1D to 9999D for an on-line game company in entertainment business.

19. The method of Embodiments 1-18, wherein the second information table further comprises:

a second authentication information and a second other information, the second authentication information comprises savings account password, counter service password, credit account password, compare failed count, cash card balance, and any arbitrary ordering of parameters, the second other information comprises savings account number, credit account number, cash card information, and any arbitrary ordering of parameters;

the cash card information comprises cash card store category, cash card merchant serial number, cash card balance monetary base, cash card use status, and cash card getting on station number, or the cash card information comprises cash card store category, cash card merchant serial number, cash card balance monetary base, cash card use status, cash card merchant unit price, cash card merchant weight, and cash card merchant purchasing amount; and the cash card balance monetary base comprises select monetary exchange function inspection sub-code, assign cash card balance width and precision format sub-code, monetary base sub-code, wherein the select monetary exchange function inspection sub-code indicates the use status of the cash card balance monetary base which comprises the select monetary exchange function not enabled, the select monetary exchange function not selected, the select monetary exchange function selected, the assign cash card balance width and precision format selected, the select monetary exchange function enabled, and other system reserved use, the assign cash card balance width and precision format sub-code indicates the cash card balance as a 32 bit floating variable which comprises assign width to 7 digits and decimal point to 0 digit, assign width to 7 digits and decimal point to 1 digit, assign width to 7 digits and decimal point to 2 digits, and other system reserved use, the monetary base sub-code indicates the monetary base selected for the cash card balance which comprises US dollar, British pound, RMB, Euro dollar, Hong Kong dollar, Japanese yen, New Taiwan dollar, VND, and other system reserved use.

20. The method of Embodiments 1-19, an item information table is stored in an RFID tag for a Finance Credit cash Authentication Card, the RFID tag includes Reserved Memory (RM) block, Tag Identifier (TID) block, Unique Item Identifier (UII) block, and User Memory (UM) block, the UII block includes first memory block and second memory block, the TID block includes a tag identifier, the tag identifier includes a tag serial number and a manufacturer identifier, the item information table includes first information table, second information table, third information table, item kill password and item access password, an item kill password and an item access password are stored in the RM block, the first information table being stored in the first memory block, the second information table is stored in the second memory block, the third information table is stored in the third memory block, first information table and second information table are stored in the UII block, the first information table includes item code, item serial number, user serial number, first encrypted key, first PC information, the first encrypted key includes an encrypted second sub-information, the second information table includes savings account password, counter service password, credit account password, compare failed count, cash card balance, second encrypted key, savings account number, credit account number, cash card store category, cash card merchant serial number, cash card balance monetary base, cash card use status, cash card getting on station number, and any arbitrary ordering of parameters, the UM block stores third information table which includes transfer account number 1, transfer account number 2, transfer account number 3, transfer account number 4, transfer account number 5, transfer account number 6, the second encrypted key includes an encrypted third sub-information, the second sub-information indicating the length of the second information table, the third sub-information indicating the length of the third information table, variations of the item information table further comprises:

the word length of some parameters in first information table, second information table, and third information table vary between 3 words and 1 word for different applications, wherein variations comprises:

extracting the rightmost 1 or 2 words of the 3 word first encrypted key to get a 1 or 2 word first encrypted key;

substituting the 3 word second encrypted key with a receiving brief message phone number;

extracting the rightmost 1 or 2 words of the 3 word second encrypted key to get a 1 or 2 word second encrypted key;

increasing the item code from 1 word to 2 words; and increasing the item serial number from 1 word to 2 words; and the third information table includes a transfer account table, it also includes a RFID access control table, a receiving brief message phone number table, or a combination of the above, wherein variations comprises:

substituting portion of the transfer account table with access control area code numbers;

substituting portion of the transfer account table with receiving brief message phone number table which comprises 4 word receiving brief message phone numbers; and substituting portion of the transfer account table with access control area code numbers and receiving brief message phone number table.

21. A method of authenticating an RFID tag using encrypted key for a radio frequency identification tag item processing system (RFID TIPS) according to Embodiments 1-20, the RFID TIPS including a set of system constants which including length of first information table, length of second information table, length of third information table, CompType, AuthenticationType, hash table, and adjust ordering table, the RFID tag including a tag identifier and an item information table which being built in accordance with a plural authentication steps, the item information table including first information table and second information table, the first information table including first authenticating information, first encrypted key and first other information, the first authenticating information including item code, and user serial number, the first other information including item serial number and first PC information, the second information table including second authentication information, second encrypted key and second other information, the method comprising steps of:

selecting and inventorying the RFID tag based on the item code;

reading the first information table;

reading the tag identifier which includes a tag serial number and a manufacturer identifier;

decrypting the first encrypted key to obtain the second sub-information;

verifying the second sub-information to authenticate the RFID tag for anti-counterfeiting and belonging to the same system;

reading the second information table based on the second sub-information;

obtaining the original second information table by performing a set of unadjust ordering operation;

authenticating the second authentication information for using the second other information; and ending the communication dialog with the RFID tag.

22. The method of Embodiments 1-21, wherein decrypting the second encrypted key comprises steps of:

performing a set of operations being the reverse to the encrypting operations on the second encrypted key, the tag serial number, and their arbitrary combination to obtain the third sub-information, the set of operations includes:

obtaining the third sub-information by subtracting the tag serial number from the second encrypted key, or equating the third sub-information to the second encrypted key;

when the second encrypted key is not used, it is substituted with a receiving brief message phone number, and the third sub-information indicating length of the third information table.

23. The method of Embodiments 1-22, wherein third information table is stored in the UM block, the item information table further includes a third information table which includes a transfer account table, or a receiving brief message phone number table, or a combination of the above, the method further comprises steps of:

reading the second information table and obtaining the second encrypted key by performing a set of unadjust ordering operation;

decrypting the second encrypted key to obtain the third sub-information;

reading and using the third information table based on the third sub-information; and ending the communication dialog with the RFID tag.

24. The method of Embodiments 1-23, wherein the set of system constants further includes a travel route station number table, a travel route information table, a ticket rate and fare table, and a merchant unit price table, the method of authenticating the second authentication information further includes a method of authenticating user password, a method of authenticating cash card balance, a method of using cash card information for measurable merchant, a method of using cash card information for non-measurable merchant, a method of using cash card information for public long distance transportation system, and a method of using cash card balance monetary base, wherein:

the method of authenticating user password comprises steps of:

requesting user to enter an authenticating password through an input device which includes a numerical key pad;

selecting an authenticating information from the second authentication information which includes a credit account password, a savings account password, and a counter service password according to CompType and AuthenticationType; and comparing the authentication password to the authentication information; and permitting to use the authentication information after passing the comparing the authentication password to the authentication information;

the method of authenticating cash card balance comprises processing flow states of:

when using the cash card balance for paying the expense amount, the processing flow includes states comprises verifying first if the cash card balance≥the expense amount, paying cash again, insufficient cash card balance, cash advance a fixed amount from user's credit account number;

the method of using cash card information for measurable merchant comprises processing flow states of:

proceeding to a pay expense amount preprocessing according to cash card store category and cash card merchant serial number, the processing flow states comprises authenticating the authentication cash card for anti-counterfeiting and belonging to the same system, writing a measurable merchant information of a start measuring time, distance, weight, or flow amount into the authentication cash card;

when presenting the authentication cash card for paying cash, the processing flow states comprises again authenticating the authentication cash card for anti-counterfeiting and belonging to the same system in accordance with a plural authentication steps, displaying the measured merchant information of time, distance, weight, or flow amount, obtaining unit price of time, distance, weight, or flow amount for the measured merchant from the merchant unit price table, converting the merchant consuming information of measured merchant into cash expense amount;

subtracting the cash expense amount from the cash card balance of the authentication cash card, displaying and recording the transaction, and/or sending a summary to the receiving brief message phone number;

the method of using cash card information for non-measurable merchant comprises processing flow states of:

proceeding to a pay expense amount preprocessing according to cash card store category and cash card merchant serial number, reading merchant consuming information of a non-measured merchant comprising merchant barcode, its code number, or its name;

when presenting the authentication cash card for paying cash, the processing flow states comprises authenticating the authentication cash card for anti-counterfeiting and belonging to the same system in accordance with a plural authentication steps, displaying unit price of the non-measurable merchant from the merchant unit price table, obtaining quantity of the non-measurable merchant, converting the merchant consuming information of non-measurable merchant into cash expense amount;

subtracting the cash expense amount from the cash card balance of the authentication cash card, displaying and recording the transaction, and/or sending a summary to the receiving brief message phone number;

the method of using cash card information for public long distance transportation system comprises processing flow states of:

when taking public long distance transportation system, using cash card store category, cash card merchant serial number, user serial number(Rate), cash card getting on station number(Last Station ID, LastSID), cash card use status(Status), and cash card balance(Balance) for tracking the use of the authentication cash card, the processing flow states comprises authenticating the authentication cash card for anti-counterfeiting and belonging to the same system in accordance with a plural authentication steps, checking Status and proceeding to a getting on procedure, a getting off procedure, and an authentication cash card use exception procedure, wherein the getting on procedure and the getting off procedure comprises flow states of waiting for use, has gotten on, Fare has been paid, preparing to get off, obtaining Fare based on Rate and LastSID, inspect Balance Fare, insufficient Balance when getting off, and entering a credit card account for cash advance, the authentication cash card use exception procedure includes flow states of displaying Status and insufficient Balance, incomplete getting off procedure, incomplete getting on procedure, or entering an authenticating user status mode, and authenticating user status by checking the entered user number and authentication password, after passing the authenticating user number and authentication password successfully, then selecting to execute a system function which includes entering date and driver serial number, setting travel route number, loading travel route information table, loading ticket rate and fare table, inquiring travel route and its ticket rate and fare, reading total collected amount, reading each collected amount, reading each cash advance record, resetting Status and LastSID of an authentication cash card to a constant including 0 to restore its use, canceling a collected amount, clearing a collected amount record, inquiring travel route timetable, inquiring travel route station number record, and self-test of RFID TIPS;

obtaining an en route station number, or its code number, or its GPS coordinates via second radio channel of a radio network connecting device which comprises the radio channel connected to a mobile radio network through a Wi-Fi access point, or reading an en route station number, or its code number included in a semi-passive long distance RFID tag from another RFID reader;

connecting to a radio network via second radio channel of a radio network connecting device, the method of using the second radio channel comprises:

upon detecting a station name or number ahead matching the next station name or its number, or route mark or its number in the travel route information table, then display or announce the approaching station name or route mark, and sending a brief message or email to a RFID authentication system and RFID information system;

upon detecting current station number or route mark dropping out, or no passenger getting off, then display or announce the expected next station name;

connecting to a radio network via a radio network connecting device, sending a geographic location information and an onsite working information wirelessly to a RFID authentication system and RFID information system for backend processing, wherein the geographic location information comprises time, travel route, vehicle serial number, driver serial number, authenticating exception state of a authentication cash card and its tag serial number, GPS coordinates, the onsite working information comprises a brief message, a shot image, or both a brief message and a shot image;

the method of using cash card balance monetary base comprises processing flow states of:

when using the cash card balance monetary base for paying expense amount, the sub-codes of the cash card balance monetary base comprises select monetary exchange function inspection sub-code, assign cash card balance width and precision format sub-code, monetary base sub-code are used for tracking processing flow states which comprises checking the select monetary exchange function inspection sub-code to ensure the select monetary exchange function has been enabled, again checking the monetary base of the consuming amount and setting in the monetary base sub-code of the cash card balance monetary base are the same, authenticating cash card balance≥consuming amount, paying cash again, insufficient cash card balance, cash advance a fixed amount from user credit account number, converting consuming amount to have the same monetary base as set for the cash card balance monetary base; and the method of authenticating the second authentication information further comprises steps of:

authenticating the second authentication information which includes comparing second authentication information to second authentication password;

when passing the authenticating the second authentication information, permits to read and use second other information;

when failing the authenticating the second authentication information, checks if the failed compare count≥a preset maximal value, when it is false, then increases the failed compare count by 1, when it is true, then starts a kill tag procedure and ends the communication dialog with the RFID tag.

25. A method of building an item information table in an RFID tag using encrypted keys for a radio frequency identification tag item processing system (RFID TIPS) according to Embodiments 1-24, the RFID tag including a tag identifier and a tag memory, the tag memory being divided into memory sectors and blocks, the tag identifier including a tag serial number and a manufacturer identifier, the RFID TIPS allocating an RFID tag data structure and a set of system constants in its working memory, the set of system constants including first password mask, length of first information table, length of second information table, length of third information table, and hash table, the RFID tag data structure including tag identifier, first memory block, second memory block, third memory block, and reserved memory (RM) block, and an item information table being stored in the RFID tag data structure, the item information table including first information table, second information table, third information table, item kill password and item access password, the first information table being stored in the first memory block, the second information table being stored in the second memory block, the third information table being stored in the third memory block, an item kill password and an item access password being stored in the RM block, the first information table including first authenticating information, first encrypted key and first other information, the first authenticating information including item code and user serial number, the first encrypted key including an encrypted second sub-information, the first other information including item serial number, first PC information, the second information table including second authenticating information and second other information, the first PC information indicating the length of the first information table, the second sub-information indicating the length of the second information table, the third sub-information indicating the length of the third information table, the method of building the item information table comprising steps of:

reading the tag identifier of the RFID tag and storing it in the tag identifier of the RFID tag data structure which includes a tag serial number and a manufacturer identifier;

creating the item code, the item serial number, and the user serial number;

setting the second sub-information and creating the first encrypted key;

creating the item kill password and the item access password;

obtaining parameter values of the second information table and the third information table;

storing the item kill password and the item access password in the RM block;

storing the first information table, the second information table, the item kill password, and the item access password, and the third information table in the RFID tag.

26. A method of authenticating an RFID tag using encrypted key for a radio frequency identification tag item processing system (RFID TIPS) according to Embodiments 1-25, the RFID TIPS including a set of system constants which including first password mask, length of first information table, length of second information table, length of third information table, and hash table, the RFID tag including a tag identifier and an item information table which being built in accordance with a plural authentication steps, the item information table including first information table and second information table, the first information table including first authenticating information, first encrypted key and first other information, the first authenticating information including item code and user serial number, the second information table including a second other information, the method comprising steps of:

selecting and inventorying the RFID tag;

reading the first information table;

verifying the length of the first information table;

reading the tag identifier which includes a tag serial number and a manufacturer identifier;

decrypting the first encrypted key to obtain second sub-information;

verifying the second sub-information to authenticate the RFID tag for anti-counterfeiting and belonging to the same system;

reading the second information table based on the second sub-information; and using the second other information.

27. The method of Embodiments 1-26, wherein the second information table further includes second authentication information, the second authentication information includes savings account password, counter service password, credit account password, cash card balance, and any arbitrary ordering of parameters, the second other information further includes savings account number, credit account number, cash card information, and any arbitrary ordering of parameters, the item information table further includes a third information table which includes a transfer account number table, a RFID access control table, a receiving brief message phone number table, or a combination of the above, a third sub-information indicating length of the third information table, the method of building the item information table further comprises steps of:

selecting and inventorying the RFID tag based on the item code;

reading the first information table;

decrypting the first encrypted key to obtain the second sub-information;

reading the second information table based on the second sub-information;

authenticating the second authentication information for using the second other information;

reading and using the third information table based on the third sub-information; and ending the communication dialog with the RFID tag.

28. A method of accessing the ordering adjusted information in an RFID tag for a radio frequency identification tag item processing system (RFID TIPS) according to Embodiments 1-27, the RFID TIPS including a password mask and an adjust ordering table, the RFID tag including a tag identifier and a memory, the tag identifier including a tag serial number and a manufacturer identifier, the memory being divided into memory sectors and blocks, an information table being stored in a memory block, an address pointer being used to access a data set of M words in the information table, the adjust ordering table including N adjust ordering control bits, the adjust ordering table including at most 2N sets of arithmetic, logic, and/or displacement operation for adjusting the address pointer, which including making the data set in the information table rotate left, rotate right, swap, or move to different memory sector or block, the method of accessing the ordering adjusted information including method of storing the ordering adjusted information and method of reading the ordering adjusted information, wherein:

the method of storing the ordering adjusted information (abbr. adjusted WRITE/adjusted block WRITE) comprising steps of:

reading the tag identifier which including a tag serial number;

extracting a N specific bits from the tag serial number as N adjust ordering control bits of the adjust ordering table based on AND logic operation of the tag serial number and the password mask;

selecting a set of adjust ordering operation from the adjust ordering table for adjusting the address pointer based on the N adjust ordering control bits; and writing a data set of M words into a memory block pointed by the adjusted address pointer; and the method of reading the ordering adjusted information (abbr. adjusted READ/adjusted block READ) comprising steps of:

reading the tag identifier which includes a tag serial number;

extracting a N specific bits from the tag serial number as N adjust ordering control bits of the adjust ordering table based on AND logic operation of the tag serial number and the password mask;

selecting a set of adjust ordering operation from the adjust ordering table for adjusting the address pointer based on the N adjust ordering control bits;

reading a data set of M words from a memory location pointed by the adjusted address pointer.

29. A method of building an item information table in an RFID tag using encrypted key for a radio frequency identification tag item processing system (RFID TIPS) according to Embodiments 1-28, the RFID tag including a tag identifier and a tag memory, the tag memory being divided into memory sectors and blocks, the tag identifier including a tag serial number and a manufacturer identifier, the RFID TIPS allocating an RFID tag data structure and a set of system constants in its working memory, the set of system constants including a system code number and a system number, the system code number indicating item information table system built in an RFID tag, the RFID tag data structure including an encrypted key memory block where a first information table being stored, the RFID tag data structure including an item information table which including first information table, the first information table including first encrypted key and user serial number, the user serial number indicating the system code number, the second sub-information indicating the system number, the method comprising steps of:

reading the tag identifier of the RFID tag and storing it in the tag identifier of the RFID tag data structure;

creating the item code, the item serial number, and the user serial number;

setting the second sub-information and creating the first encrypted key; and storing the first information table in the RFID tag.

30. A method of authenticating an RFID tag using encrypted key for a radio frequency identification tag item processing system (RFID TIPS) according to Embodiments 1-29, the RFID TIPS including a set of system constants which including a system code number and a system number, the RFID tag including a tag identifier and an item information table which being built in accordance with a plural authentication steps, the item information table including first information table which including first encrypted key and user serial number, the user serial number indicating the system code number, the system code number indicating the item information table system built in an RFID tag, the method comprising steps of:

selecting and inventorying the RFID tag;

reading the tag identifier which includes a tag serial number and a manufacturer identifier;

reading the first information table;

decrypting the first encrypted key to obtain the second sub-information; and verifying the second sub-information to authenticate the RFID tag for anti-counterfeiting and belonging to the same system.

31. A method of building an item information table in an RFID tag using encrypted keys for a radio frequency identification tag item processing system (RFID TIPS) according to Embodiments 1-30, the RFID tag including a tag identifier and a tag memory, the tag memory being divided into memory sectors and blocks, the tag identifier including a tag serial number and a manufacturer identifier, the RFID TIPS allocating an RFID tag data structure and a set of system constants in its working memory, the set of system constants including length of first information table, length of second information table, the RFID tag data structure including tag identifier (TID) block, first memory block and second memory block, and an item information table being stored in the RFID tag data structure, the item information table including tag identifier, first information table and second information table, the tag identifier storing a tag serial number and a manufacturer identifier, the first memory block storing first information table, the second memory block storing second information table, the first information table including first authenticating information, first encrypted key and first other information, the first authenticating information including item code, user serial number and item expiration date, the first encrypted key including an encrypted second sub-information, the first other information including item serial number, the second information table includes a receiving brief message phone number and second other information, the second other information including a RFID access control table, the second sub-information indicating the length of the second information table, the method comprising steps of:

reading the tag identifier of the RFID tag and storing it in the tag identifier of the RFID tag data structure which includes a tag serial number and a manufacturer identifier;

creating the item code, the item serial number, and the user serial number;

setting the item expiration date;

obtaining the receiving brief message phone number and parameter values of the second other information in the second information table, the parameter values include signal values of the RFID access control table;

setting the second sub-information and creating the first encrypted key; and storing the first information table and the second information table in the RFID tag.

32. A method of authenticating an RFID tag using encrypted key for a radio frequency identification tag item processing system (RFID TIPS) according to Embodiments 1-31, the RFID TIPS including a set of system constants which including length of first information table and length of second information table, the RFID tag including a tag identifier and an item information table which being built in accordance with a plural authentication steps, the item information table including first information table and second information table, the first information table including first authenticating information, first encrypted key and first other information, the first authenticating information including item code, user serial number and item expiration date, the second information table including a receiving brief message phone number and second other information, the method comprising steps of:

selecting and inventorying the RFID tag;

reading the first information table;

verifying the length of the first information table and the item expiration date;

reading the tag identifier which includes a tag serial number and a manufacturer identifier;

decrypting the first encrypted key to obtain the second sub-information;

verifying the second sub-information to authenticate the RFID tag for anti-counterfeiting and belonging to the same system;

reading the second information table based on the second sub-information;

using the second other information and the receiving brief message phone number; and ending the communication dialog with the RFID tag.

33. A method according to Embodiments 1-32, the RFID TIPS allocating an RFID tag data structure and a set of system constants in its working memory, the second information table including second authenticating information, receiving brief message phone number, and second other information, the second authenticating information including a user password, the second other information including a start control table, the second sub-information indicating the length of the second information table, the method of building the item information table comprising steps of:

reading the tag identifier of the RFID tag and storing it in the tag identifier of the RFID tag data structure which includes a tag serial number and a manufacturer identifier;

creating the item code, the item serial number, and the user serial number;

setting the item expiration date;

obtaining parameter values of the second information table which includes the receiving brief message phone number, and parameter values include the user password and signal values of the start control table;

setting the second sub-information and creating the first encrypted key;

storing the first information table and the second information table in the RFID tag.

34. A method of authenticating an RFID tag using encrypted key for a radio frequency identification tag item processing system (RFID TIPS) according to Embodiments 1-33, the RFID TIPS including a set of system constants which including length of first information table and length of second information table, the RFID tag including a tag identifier and an item information table which being built in accordance with a plural authentication steps, the item information table including first information table and second information table, the first information table including first authenticating information, first encrypted key and first other information, the first authenticating information including item code, user serial number and item expiration date, the second information table including receiving brief message phone number and second other information, the method comprising steps of:

selecting and inventorying the RFID tag;

reading the first information table;

verifying the length of the first information table and the item expiration date;

reading the tag identifier which includes a tag serial number and a manufacturer identifier;

decrypting the first encrypted key to obtain the second sub-information;

verifying the second sub-information to authenticate the RFID tag for anti-counterfeiting and belonging to the same system;

reading the second information table based on the second sub-information;

authenticating the second authentication information for using the second other information and the receiving brief message phone number; and ending the communication dialog with the RFID tag.

35. A method of building an item information table in an RFID tag using encrypted key for a radio frequency identification tag item processing system (RFID TIPS) according to Embodiments 1-34, the RFID tag including a tag identifier and a tag memory, the tag memory being divided into memory sectors and blocks, the tag identifier including a tag serial number and a manufacturer identifier, the RFID TIPS allocating an RFID tag data structure and a set of system constants in its working memory, the set of system constants including first password mask, length of first information table, length of second information table, length of third information table, CompType, AuthenticationType, and adjust ordering table, the RFID tag data structure including tag identifier, first memory block, second memory block, and third memory block, and an item information table being stored in the RFID tag data structure, the item information table including first information table, second information table, third information table, the first memory block storing the first information table, the second memory block storing the second information table, the third memory block storing the third information table, the first information table including first authenticating information, first encrypted key and first other information, the first authenticating information including item code, user serial number and expiration date, the first encrypted key including an encrypted second sub-information, the first other information including item serial number, the second information table including second authenticating information, receiving brief message phone number and second other information, the second authentication information including savings account password, counter service password, credit account password, compare failed count, cash card balance, and any arbitrary ordering of parameters, the second other information including savings account number, credit account number, cash card information, and any arbitrary ordering of parameters, the cash card information including cash card store category, cash card merchant serial number, cash card balance monetary base, cash card use status, and cash card getting on station number, the third information table including a transfer account table, a RFID access control table, a receiving brief message phone number table, or a combination of the above, the second sub-information indicating the length of the second information table, the third sub-information indicating the length of the third information table, the method of building the item information table comprising steps of:

reading the tag identifier of the RFID tag and storing it in the tag identifier of the RFID tag data structure which includes a tag serial number and a manufacturer identifier;

creating the item code, the item serial number, and the user serial number;

setting the item expiration date;

obtaining parameter values of the second information table which includes the receiving brief message phone number and default values for passwords;

setting the second sub-information and creating the first encrypted key;

creating a new second information table with parameter values stored in different ordering according to the tag serial number, the second password mask, and the original second information table;

obtaining parameter values of the third information table; and storing the first information table, the second information table, and the third information table in the RFID tag.

36. A method of authenticating an RFID tag using encrypted key for a radio frequency identification tag item processing system (RFID TIPS) according to Embodiments 1-35, the RFID TIPS including a set of system constants which including first password mask, length of first information table, length of second information table, length of third information table, CompType, AuthenticationType, and adjust ordering table, the RFID tag including a tag identifier and an item information table which being built in accordance with a plural authentication steps, the item information table including first information table and second information table, the first information table including first authenticating information, first encrypted key and first other information, the first authenticating information including item code, user serial number and expiration date, the second information table including second authenticating information, receiving brief message phone number and second other information, the second sub-information indicating the length of the second information table, the third sub-information indicating the length of the third information table, the method comprising steps of:

selecting and inventorying the RFID tag;

reading the first information table;

verifying the length of the first information table and the item expiration date;

reading the tag identifier which includes a tag serial number and a manufacturer identifier;

decrypting the first encrypted key to obtain second sub-information;

verifying the second sub-information to authenticate the RFID tag for anti-counterfeiting and belonging to the same system;

reading the second information table based on the second sub-information;

obtaining the original second information table by performing a set of unadjust ordering operation;

authenticating the second authentication information for using the second other information and the receiving brief message phone number;

reading and using the second other information based on the third sub-information; and ending the communication dialog with the RFID tag.

37. A method of building an item information table in an RFID tag using encrypted keys for a radio frequency identification tag item processing system (RFID TIPS) according to Embodiments 1-36, the RFID tag including a tag identifier and a tag memory, the tag memory being divided into memory sectors and blocks, the tag identifier including a tag serial number and a manufacturer identifier, the RFID TIPS allocating an RFID tag data structure and a set of system constants in its working memory, the set of system constants including length of first information table, length of second information table, length of third information table, CompType, and AuthenticationType, the RFID tag data structure including tag identifier, first memory block, second memory block, and third memory block, and an item information table being stored in the RFID tag data structure, the item information table including first information table, second information table, third information table, the first information table being stored in the first memory block, the second information table being stored in the second memory block, the third information table being stored in the third memory block, the first information table including first authenticating information, first encrypted key and first other information, the first authenticating information including item code, user serial number and expiration date, the first encrypted key including an encrypted second sub-information, the first other information including item serial number, the second information table including second authenticating information, second encrypted key and second other information, the second authentication information including savings account password, counter service password, credit account password, compare failed count, cash card balance, and any arbitrary ordering of parameters, the second encrypted key including an encrypted third sub-information, the second other information including savings account number, credit account number, cash card information, and any arbitrary ordering of parameters, the cash card information including cash card store category, cash card merchant serial number, cash card balance monetary base, cash card use status, and cash card getting on station number, the third information table including a transfer account table, or a RFID access control table, or a receiving brief message phone number table, or a combination of the above, the second sub-information indicating the length of the second information table, the third sub-information indicating the length of the third information table, the method of building the item information table comprising steps of:

reading the tag identifier of the RFID tag and storing it in the tag identifier of the RFID tag data structure which includes a tag serial number and a manufacturer identifier;

creating the item code, the item serial number, and the user serial number;

setting the item expiration date;

obtaining plural parameter values of the second information table including default values for passwords;

setting the second sub-information and creating the first encrypted key;

obtaining parameter values of the third information table which includes the receiving brief message phone number table;

setting the third sub-information and creating the second encrypted key; and storing the first information table, the second information table, and the third information table in the RFID tag.

38. A method of authenticating an RFID tag using encrypted key for a radio frequency identification tag item processing system (RFID TIPS) according to Embodiments 1-37, the RFID TIPS including a set of system constants which including length of first information table, length of second information table, length of third information table, CompType, and AuthenticationType, the RFID tag including a tag identifier and an item information table which being built in accordance with a plural authentication steps, the item information table including first information table and second information table, the first information table including first authenticating information, first encrypted key and first other information, the first authenticating information including item code, user serial number and expiration date, the second information table including second authenticating information, second encrypted key and second other information, the method comprising steps of:

selecting and inventorying the RFID tag;

reading the first information table;

verifying the length of the first information table and the item expiration date;

reading the tag identifier which includes a tag serial number and a manufacturer identifier;

decrypting the first encrypted key to obtain second sub-information;

verifying the second sub-information to authenticate the RFID tag for anti-counterfeiting and belonging to the same system;

reading the second information table based on the second sub-information;

authenticating the second authentication information for using the second other information;

decrypting the second encrypted key to obtain third sub-information;

reading and using the second other information based on the third sub-information including selecting a receiving brief message phone number from the receiving brief message phone number table; and ending the communication dialog with the RFID tag.

39. A method according to Embodiments 1-38, the RFID TIPS allocating an RFID tag data structure and a set of system constants in its working memory, the set of system constants further including a second password mask and an adjust ordering table, the method of building the item information table comprising steps of:

reading the tag identifier of the RFID tag and storing it in the tag identifier of the RFID tag data structure which includes a tag serial number and a manufacturer identifier;

creating the item code, the item serial number, and the user serial number;

setting the item expiration date;

obtaining plural parameter values of the second information table including default values for passwords;

setting the second sub-information and creating the first encrypted key;

creating a new second information table with parameter values stored in different ordering according to the tag serial number, the second password mask, and the original second information table;

obtaining parameter values of the third information table which includes the receiving brief message phone number table;

setting the third sub-information and creating the second encrypted key; and storing the first information table, the second information table, and the third information table in the RFID tag.

40. A method of authenticating an RFID tag using encrypted key for a radio frequency identification tag item processing system (RFID TIPS) according to Embodiments 1-39, the RFID TIPS including a set of system constants which including second password mask, length of first information table, length of second information table, length of third information table, CompType, AuthenticationType, and adjust ordering table, the RFID tag including a tag identifier and an item information table which being built in accordance with a plural authentication steps, the item information table including first information table and second information table, the first information table including first authenticating information, first encrypted key and first other information, the first authenticating information including item code, user serial number and expiration date, the second information table including second authenticating information, second encrypted key and second other information, the method comprising steps of:

selecting and inventorying the RFID tag;

reading the first information table;

verifying the length of the first information table and the item expiration date;

reading the tag identifier which includes a tag serial number and a manufacturer identifier;

decrypting the first encrypted key to obtain second sub-information;

verifying the second sub-information to authenticate the RFID tag for anti-counterfeiting and belonging to the same system;

reading the second information table based on the second sub-information;

obtaining the original second information table by performing a set of unadjust ordering operation;

authenticating the second authentication information for using the second other information;

decrypting the second encrypted key to obtain third sub-information;

reading and using the second other information based on the third sub-information including selecting a receiving brief message phone number from the receiving brief message phone number table; and ending the communication dialog with the RFID tag.

41. A method of using a radio frequency identification tag item processing system (RFID TIPS) in a radio frequency identification information system (RFID IS) according to Embodiments 1-40, the RFID IS including a radio frequency identification authentication system (RFID AS), a database device, an internet, a wireless mobile network device, and an RFID tag, the RFID AS including RFID TIPS and other processing system, the RFID TIPS including a reader, a local computer, a numerical keypad, an antenna, a display, a RFID channel, a local computer network environment, a RFID environment, and a set of system constant values, the RFID tag including a tag identifier and a tag memory, the tag identifier including a tag serial number and a manufacturer identifier, the RFID tag being a device with item information table built in its tag memory, tag kill password and tag access password also being built in it, the item information table including first information table, second information table and third information table, the first information table including first authenticating information, first encrypted key and first other information, the first authenticating information including item code, user serial number and item expiration date, the first encrypted key including an encrypted second sub-information, the first other information including item serial number and first PC information, the first PC information indicating the length of the first information table, the second sub-information indicating the length of the second information table, the method of using the RFID TIPS comprising steps of:

the tag item operating system of local computer being started;

establishing the connection of local computer, accessing a local computer network environment, accessing a RFID environment, and setting a set of system constant values being executed;

the RFID TIPS being started to verify the local computer network environment including a database device;

the RFID TIPS selecting an item processing mode based on item processing mode (IPMode) which including item operation (OPERATION), item service (SERVICE), and item test (TEST), wherein:

when IPMode=OPERATION, the item processing mode comprising steps of:

starting the reader including setting the RFID environment;

reading an RFID tag by select, inventory and query report instructions according to item code;

receiving a first information table including an encrypted key, item code, item serial number and user serial number;

verifying the length of the first information table to ensure the selected RFID tag matching the system select conditions and reading the tag identifier;

when passing the verifying the length of the first information table, selecting an item application category according to RFID business sub-code of the item code and computer type (CompType), the CompType including pay cash, smart cashier, counter service computer, workstation, aATM, nuFAD, logistics, supply chain, access control, item level tracking, transportation, technology, and system reserved uses, the item application category includes access control, supply chain, (logistics and other business applications), pay cash, and (Finance, counter service, aATM or nuFAD), wherein:

when item application category being access control, proceeding to perform an access control item processing procedure which including decrypting the encrypted key to authenticate the RFID tag for anti-counterfeiting and belonging to the same system; recording the event which includes sending a brief message or email to a receiving brief message phone number; ending the communication dialog with the RFID tag;

when item application category being supply chain, proceeding to perform a supply chain item processing procedure which including decrypting the encrypted key to authenticate the RFID tag for anti-counterfeiting and belonging to the same system; recording the event which including sending a brief message or email to a receiving brief message phone number; ending the communication dialog with the RFID tag;

when item application category being logistics and other business applications, proceeding to perform an item processing procedure for logistics and other business applications which including decrypting the encrypted key to authenticate the RFID tag for anti-counterfeiting and belonging to the same system; recording the event which including sending a brief message or email to a receiving brief message phone number; ending the communication dialog with the RFID tag;

when item application category being pay cash, proceeding to perform a pay cash item processing procedure which including decrypting the encrypted key to authenticate the RFID tag for anti-counterfeiting and belonging to the same system; using cash card balance to pay expense amount and add cash to cash card balance; recording the event which including sending a brief message or email to a receiving brief message phone number; ending the communication dialog with the RFID tag;

when item application category being (Finance, counter service, aATM or nuFAD), proceeding to perform an item processing procedure for Finance, counter service, aATM or nuFAD application which including decrypting the encrypted key to authenticate the RFID tag for anti-counterfeiting and belonging to the same system; comparing the authentication information to the entered authentication password; reading a second information table when passing the plural authenticating steps; obtaining the original second information table which including a savings account number by performing a set of unadjust ordering operation; using the savings account number for a deposit, withdraw, or transfer transaction; recording the event which including sending a brief message or email to a receiving brief message phone number; ending the communication dialog with the RFID tag;

when IPMode=SERVICE, the item processing mode comprising steps of:

selecting an item service type (ServiceType), the ServiceType including build tag item, inquire tag item, and modify tag item, wherein:

when ServiceType being build tag item, proceeding to perform a build tag item processing procedure which including building an item information table in a new RFID tag based on item code and item serial number, recording the event, and ending the communication dialog with the RFID tag;

when ServiceType being inquire tag item, proceeding to perform a inquire tag item processing procedure which including inquiring an item information table in an RFID tag based on item code and item serial number, recording the event which including sending a brief message or email to a receiving brief message phone number, and ending the communication dialog with the RFID tag;

when ServiceType being modify tag item, proceeding to perform a modify tag item processing procedure which including modifying an item information table in an RFID tag based on item code and item serial number, recording the event which including sending a brief message or email to a receiving brief message phone number, and ending the communication dialog with the RFID tag; and when IPMode=TEST, the item processing mode comprising steps of:

selecting an item test type (TestType) according to the RFID business sub-code of the item code, the TestType including financial industry and other test industries, the other test industries including access control, supply chain, logistics, item level tracking, transportation, technology, and system reserved uses, wherein:

when TestType being financial industry, proceeding to perform a financial industry item processing procedure which including building and testing an item information table in an RFID tag which includes start the reader, test of building an item information table, test of writing the item information table, test of reading the item information table, test of authenticating the RFID tag for anti-counterfeiting, test of comparing the authentication password, test of adjust ordering of an information table, test of unadjust ordering of an information table, test to pay cash by the cash card balance and select its monetary base, test of generating a test report, and ending the communication dialog with the RFID tag; and when TestType being other test industries, proceeding to perform an other test industry item processing procedure which including building and testing an item information table in an RFID tag memory, recording the event, and ending the communication dialog with the RFID tag.

42. The method of Embodiments 1-41, wherein establishing the connection of local computer, accessing a local computer network environment, accessing a RFID environment, and setting a set of system constant values being executed further comprises:

establishing the connection of local computer which includes connecting the local computer by way of cable, radio, or both cable and radio to internet and mobile radio network through an internet service provider for accessing a common database device, and sending a brief message or email;

accessing a local computer network environment which includes name of the local computer, or its code number, and its internet address, name of the other computer, or its code number, and its internet address, name of the database device, or its code number, and its internet address;

accessing a RFID environment includes location serial number of the reader and its session number, channel band, connecting frequency, pulse width, modulation mode, bit transmitting speed, and antenna port number, its location serial number and its transmit power level;

setting a set of system constant values which includes a set of internal parameter values and a set of exterior parameter values, the set of internal parameter values includes a local computer type (CompType), the CompType includes pay cash, smart cashier, counter service computer, workstation, aATM, nuFAD, logistics, supply chain, access control, item level tracking, transportation, technology, and system reserved uses, the set of exterior parameter values includes item processing mode (IPMode), service type (ServiceType), test type (TestType), first password mask, second password mask, length of first information table, length of second information table, length of third information table, maximum compare failed count, AuthenticationType, hash table, and adjust ordering table, wherein the IPMode includes item operation (OPERATION), item service (SERVICE), and item test (TEST), the ServiceType includes build tag item, inquire tag item, and modify tag item, the TestType includes financial industry and other industry, the AuthenticationType includes credit account authentication, savings account authentication, finance authentication, logistics authentication, supply chain authentication, and access control authentication.

43. A device used in a radio frequency identification information system (RFID IS) according to Embodiments 1-42, the device including a radio frequency identification tag item processing system (RFID TIPS) and an RFID tag, the device comprising characteristics of:

the RFID tag comprising characteristics of:

the RFID tag including a tag identifier and a tag memory, an interface and communication controlling circuit, and an antenna, the tag identifier which including a tag serial number and a manufacturer identifier, the tag memory being divided into memory sectors and blocks, comprising characteristics of:

the interface and communication controlling circuit including UHF communication interface protocol, HF communication interface protocol, other UHF communication interface protocol, or combination of a UHF communication interface protocol and a HF communication interface protocol for establishing communication with a reader of the RFID TIPS and sending information to each other;

the antenna including UHF antenna, HF inductive coil, or combination of a UHF antenna and a HF inductive coil;

the tag memory storing an item information table which being built in accordance with a plural authentication steps, the item information table including first information table, second information table and third information table, wherein:

the first information table including item code, item serial number, user serial number, and first encrypted key, comprising characteristics of:

the first encrypted key being an unique key created by combining the tag identifier, item serial number and the user serial number, used by the RFID TIPS to authenticate the RFID tag for anti-counterfeiting and belonging to the same system;

the item code, item serial number and user serial number being a set of encoded parameters, used by the RFID TIPS to select and inventory RFID tag for establishing communication, wherein the item code including RFID business sub-code, RFID device sub-code, RFID selecting enable function sub-code, RFID function sub-code, RFID deployment country sub-code, and any combination of above sub-codes, the item serial number including organization of a RFID business sub-code;

the second information table including second authentication information, receiving brief message phone number, and second other information, comprising characteristics of:

the ordering of parameters stored in the second information table being adjusted based on the tag identifier for eavesdropping of parameters in the information table; and the receiving brief message phone number being used for receiving the brief message sent from the RFID TIPS; and the third information table including a transfer account table, a RFID access control table, a receiving brief message phone number table, or a combination of the above;

the RFID TIPS comprising characteristics of:

the RFID TIPS including a reader, an antenna, a local computer, a numerical key pad unit, and a display unit, comprising characteristics of:

the reader including a UHF reader, a HF reader, or combination of a UHF reader and a HF reader;

the reader including an interface and communication controlling circuit which including UHF communication interface protocol, HF communication interface protocol, other UHF communication interface protocol, or combination of a UHF communication interface protocol and a HF communication interface protocol for establishing communication with an RFID tag and sending information to each other;

the antenna including UHF antenna, HF inductive coil, or combination of a UHF antenna and a HF inductive coil;

the local computer including device for executing the RFID TIPS' program, accessing database device, and communicating transaction brief message;

the numerical key pad unit including device for entering information required by the RFID TIPS; and the display unit including device for receiving and displaying output messages from the RFID TIPS.

44. A system using a radio frequency identification tag item processing system (RFID TIPS) according to Embodiments 1-43, the system including a radio frequency identification information system (RFID IS) which including an RFID tag, an radio frequency identification authentication system (RFID AS), a network connecting device, an internet, a database device, and a mobile radio network device, the system comprising characteristics of:

the RFID tag comprising characteristics of the RFID tag as described in Embodiment 43;

the RFID AS including a RFID TIPS and a network join, comprising characteristics of:

the RFID TIPS comprising the RFID TIPS as described in claim 43 for establishing communication with the RFID tag, the network join connecting the RFID TIPS with the network connecting device, the RFID TIPS being joined with internet and mobile radio network device via the network join and the network connecting device; and the network join including device to provide a radio network channel, the RFID TIPS being joined with internet and mobile radio network device wirelessly via the network join and the network connecting device;

the network connecting device joining the RFID AS and internet;

the internet including devices and systems joining the network connecting device, database device, and mobile radio network device, which including joining mobile radio network, local area network (LAN) of RFID AS, wireless LAN, or/and composite LAN;

the database device including characteristics of permitting the connecting with the RFID IS for add, inquire, modify or delete its transaction information; and the mobile radio network device including mobile radio device and system subscribed to a mobile radio network.

45. The system of Embodiments 1-44, wherein the system includes a radio frequency identification information system (RFID IS) which includes an RFID tag, a radio frequency identification authentication system (RFID AS), a network connecting device, an internet, a database device, and a mobile radio network device, using the system includes characteristics of:

the RFID AS including a RFID TIPS and a network join, using the RFID TIPS comprises characteristics of:

the RFID TIPS building an item information table with encoded parameters in an RFID tag in accordance with a plural authentication steps, wherein the item information table includes first information table, second information table and third information table, comprises characteristics of:

the first information table includes first authenticating information, first encrypted key and first other information, the second information table includes different parameters for different RFID business, the parameters including second authentication information, savings account number, credit account number, cash card balance information, receiving brief message phone number, RFID access control table, item level tracking table, product manufacturing information table, receiving brief message phone number table, start control table, or a combination of the above; creating item kill password and item access password according to the tag identifier of the RFID tag; and adjusting ordering of parameters in the second information table according to the tag identifier of the RFID tag;

the RFID TIPS authenticating an RFID tag in accordance with a plural authentication steps, comprises characteristics of:

selecting and inventorying the RFID tag based on the item code, item serial number and user serial number for reading its first information table; reading the tag identifier which includes a tag serial number and a manufacturer identifier; decrypting the first encrypted key to authenticate the device for anti-counterfeiting and belonging to the same system; obtaining the original second information table by performing a set of unadjust ordering operation; and authenticating the second authentication information for using the second other information including sending a brief message to the receiving brief message phone number;

the network join connecting the RFID TIPS with the network connecting device, the RFID TIPS is joined with internet and mobile radio network device via the network join and the network connecting device, using the RFID TIPS and its characteristics are comprises but not limited to the systems of:

a RFID authentication system, wherein authenticating an authentication card to proceed a financial service which includes select cash card balance monetary base, pay cash, and sending a brief transaction message, the RFID tag of the authentication card includes an item information table which includes first information table, second information table and third information table, wherein the second information table includes a set of authentication passwords, a cash card monetary information, and a receiving brief message phone number, the set of authentication passwords includes a counter service password, the cash card monetary information includes cash card balance and cash card balance monetary base;

an authentication Automatic Teller Machine (aATM), wherein authenticating an authentication card to proceed an unmanned financial service which includes transfer an amount of cash to the authentication card, change the receiving brief message phone number, select cash card balance monetary base, pay cash, and sending a brief transaction message, the RFID tag of the authentication card includes an item information table which includes first information table, second information table and third information table, wherein the second information table includes a set of authentication passwords, a cash card monetary information, and a receiving brief message phone number;

a driveway toll management system, wherein authenticating an authentication card to proceed a driveway toll service which includes long distance toll collecting, sending brief transaction message, the RFID tag of the authentication card includes an item information table which includes first information table and second information table, wherein the second information table includes a cash card monetary information and a receiving brief message phone number, the cash card monetary information includes a cash card balance;

a RFID access control management system, wherein authenticating an authentication card to proceed a controlled area access service which includes long distance driveway control, controlled area access, starting electric facilities in an access controlled area, and sending brief transaction message, the RFID tag of the authentication card includes an item information table which includes first information table and second information table, wherein the second information table includes a start control table and a receiving brief message phone number;

a financial access control management system, wherein authenticating an authentication card to proceed a financial or controlled area access service which includes financial service, controlled area access, pay cash, and sending a brief transaction message, the RFID tag of the authentication card includes an item information table which includes first information table, second information table and third information table, wherein the second information table includes a set of authentication passwords, a cash card monetary information, and a receiving brief message phone number, the third information table includes a transfer account table, a RFID access control table, and a receiving brief message phone number table;

a RFID timekeeping authentication system, wherein authenticating an authentication card to proceed a controlled area access service which includes timekeeping employee's work hours, controlled area access, and sending brief transaction message, the RFID tag of the authentication card includes an item information table which includes first information table and second information table, wherein the second information table includes an authentication password, a RFID access control table and a receiving brief message phone number; and a RFID product manufacturing authentication system, wherein authenticating an authentication card or adhesive tag to proceed an item level tracking service which includes process management, testing, and QC sampling for product manufacturing, the RFID tag of the authentication card or adhesive tag includes an item information table which includes first information table and second information table, wherein the second information table includes a set of authentication passwords, a product code, a process code number, a lot number, a quantity, a current process station name or number and a receiving brief message phone number;

the network join further including device to provide a radio network channel, the RFID TIPS is joined with internet and mobile radio network device wirelessly via the network join and the network connecting device, making of the RFID TIPS comprises but not limited to the systems of:

a wireless RFID authentication reader, which configures local computer, reader, reader antenna, display unit, and key pad unit all in a device enclosed by a plural pieces of plastic case; and a handheld wireless RFID authentication reader, which configures local computer, reader, reader antenna, display unit, and key pad unit all in a device enclosed by a plural pieces of plastic case, one piece further having a plain surface platform, or its shape of a handle or stand;

the RFID AS including a RFID TIPS and a network join, the RFID TIPS further includes a second radio channel, using the RFID AS and its characteristics comprises but not limited to the systems of:

a RFID merchant vending authentication system, wherein authenticating an authentication card to proceed a vending fee collect service which includes measuring the weight or volume of a vending merchant, the RFID tag of the authentication card includes an item information table which includes first information table and second information table, wherein the second information table includes an authentication password, a cash card monetary information, and a receiving brief message phone number, the cash card monetary information includes cash card balance, merchant unit price, purchasing amount, and merchant weight or volume;

a parking lot fee collect system, wherein authenticating an authentication card to proceed a parking lot fee collect service which includes measuring the parking time period, the RFID tag of the authentication card includes an item information table which includes first information table and second information table, wherein the second information table includes an authentication password, a cash card monetary information and a receiving brief message phone number, the cash card monetary information includes cash card balance, entering time, parking category and discount, and parking lot use state;

a radio transportation toll collecting system, wherein authenticating an authentication card to proceed a transportation toll collecting service which includes measuring the travel distance, pay cash, sending brief transaction message, the RFID tag of the authentication card includes an item information table which includes first information table and second information table, wherein the second information table includes an authentication password, a cash card monetary information and a receiving brief message phone number, the cash card monetary information includes cash card balance, cash card use state, and travel start station name or number;

the RFID AS further including devices and systems of an other processing system and a network join, the other processing system includes processing system being the same as a RFID TIPS, the other processing system further includes other devices including reader, electronic scale, barcode scanner, network scanner, network camera, fluid meter, or GPS coordinate locating device, using the other processing system and its characteristics comprises but not limited to the systems of:

an asset management authentication system, wherein authenticating an authentication card to proceed an asset management service which includes controlled area access authentication, asset management system authentication, and sending brief transaction message, the RFID tag of the authentication card includes an item information table which includes first information table and second information table, wherein the second information table includes an authentication password, a RFID access control table and a receiving brief message phone number;

a RFID cross-area access control management system, wherein authenticating an authentication card to proceed a controlled area access service which includes cross-area long distance driveway control, cross-area controlled area access, starting electric facilities in an access controlled area, and sending brief transaction message, the RFID tag of the authentication card includes an item information table which includes first information table and second information table, wherein the second information table includes an authentication password, a RFID access control table and a receiving brief message phone number;

a network used financial authenticating device (nuFAD), wherein authenticating an authentication card to proceed a financial service which includes transfer an amount of cash to the authentication card, change the receiving brief message phone number, select cash card balance monetary base, pay cash, and sending a brief transaction message, the RFID tag of the authentication card includes an item information table which includes first information table, second information table and third information table, wherein the second information table includes a set of authentication passwords, a cash card monetary information, and a receiving brief message phone number;

using the database device comprises characteristics of:

adding, inquiring, modifying or deleting name or code number of RFID IS, name or code number of RFID AS, name or code number of RFID TIPS, parameters or its code number used in item information table of electronic table;

inquiring name or code number, address, and telephone number of company or organization based on business unified serial number;

inquiring name or code number, area, location, building and building floors and building rooms, address and telephone number of community;

inquiring account balance and account information based on country, bank and its branch name, savings account number and password;

inquiring name or code number of business store and its branch, name or code number of merchant, name or code number of transportation company, its travel route, station and timetable, name or code number of merchant, name or code number of airline company, its travel route, flight number and flight schedule, name or code number of railroad company, its travel route, station and timetable, name or code number of mass rapid transit (MRT) system, its travel route, station and timetable, name or code number of travel company, its travel route, station and timetable; and adding, inquiring, modifying or deleting transaction information from RFID AS or RFID TIPS, the transaction information including financial transaction information, controlled area access information, merchant purchasing information, and product manufacturing information; and using the mobile radio network device comprises characteristics of:

an authenticated mobile phone or a display unit using GSM, GPRS service;

an authenticated mobile phone or a display unit using GSM, GPRS and internet service; and a mobile device including a display unit with IP address or a receiving brief message phone number which receives brief message, image, or both brief message and image via internet.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A system for securing an electronic tag, wherein the electronic tag to be authenticated in an authentication phase stores an encryption key and a first information table including a first plurality of information elements, the electronic tag includes a first memory block storing the first information table, the first memory block has a specific storage capacity quantified with a predetermined capacity value, and the encryption key is derived from the predetermined capacity value, the system comprising:

a reader; and an operation device coupled to the reader, and configured via the reader to:

authenticate the electronic tag by decrypting the encryption key in the authentication phase; and read the first information table according to the predetermined capacity value after the authentication phase.

2. The system according to claim 1, wherein:

the electronic tag is a radio frequency identification (RFID) tag, and the system is an electronic tag item processing system;

the operation device is an electronic tag item operation device, and includes:

a local computer configured to obtain the encryption key from the electronic tag through the reader, authenticate the electronic tag by decrypting the obtained encryption key in the authentication phase, and read the first information table from the electronic tag via the reader after the authentication phase;

a keyboard coupled to the local computer; and a display unit coupled to the local computer, wherein the local computer controls the reader, the keyboard and the display unit, and controls the electronic tag via the reader; and the reader includes a reader antenna and an interface and communication controlling circuit coupled to the reader antenna and the local computer, wherein the reader antenna includes at least one of a UHF antenna and an HF inductive coil.

3. The system according to claim 1, wherein:

the electronic tag includes a tag memory, a tag antenna and an interface and communication controlling circuit coupled to the tag antenna and the tag memory, wherein the tag antenna includes at least one of a UHF antenna and an HF inductive coil;

the tag memory includes the first memory block, and stores a tag identifier and an item information table;

the tag identifier includes a tag serial number and a manufacturer identifier;

the item information table includes the first information table, a second information table, an item kill password, an item access password and a specific portion;

in a configuration phase, the operation device determines the item information table, and causes the reader to write the item information table into the electronic tag;

the tag memory further includes a second memory block storing the second information table, wherein the second memory block has a first storage capacity quantified with a first capacity value, and the second information table includes a first authentication information, the encryption key and a first other information;

the first authentication information includes an item code, a user serial number and an item expiration date;

the encryption key includes a sub-information;

the first other information includes an item serial number and a protocol control information;

the first plurality of information elements have a first total information element number, and are arranged according to a first order;

the predetermined capacity value is associated with the first total information element number;
the first plurality of information elements include a second authentication information, a communication target indicator and a second other information;
the second other information includes a start control table;
the specific portion of the item information table records an application code information;
the operation device stores a system maintenance information including a computer type, an authentication type, a third information table, a specific system constant, the predetermined capacity value, the first capacity value, a first password mask, a second password mask, a hash table and an order adjustment table;
the sub-information represents one of the predetermined value and the specific system constant;
the communication target indicator includes at least one of a phone number and an email address, and is used to link to a specific external device;
the electronic tag is applied to a specific application function;
the operation device is configured to perform the specific application function for using the application code information, and control an actuating mechanism near an object by using the electronic tag;
the specific application function includes at least one selected from a group consisting of a finance function, an access control function, a cash paying function, a credit function, a counter service function, a transport charge function, a communication function, a logistics function, a production management function, a work attendance management function, an authentication function, a goods sale management function, a parking charge function, a supply chain function, an item level tracking function, an assets management function and a combination thereof; and
the operation device is configured to authenticate the electronic tag in the authentication phase after the configuration phase, generate a transaction message for the specific application function according to the application code information after the authentication phase, and send the transaction message to the specific external device according to the communication target indicator.

4. The system according to claim 3, wherein:
the specific external device is a mobile device;
the third information table is an original information table, and includes a second plurality of information elements arranged according to a second order different from the first order, wherein the second plurality of information elements have a second total information element number equal to the first total information element number, and includes an information content the same as that of the first plurality of information elements;
the electronic tag has a specific identifier;
the operation device adjusts the second order to generate the first information table according to the specific identifier, the first password mask and the third information table;
the specific identifier is the tag serial number, and has a binary value having M bits, wherein M>1;
the operation device selects N bits from the M bits according to the first password mask to generate a first value, wherein N>1;
the operation device encodes the first value to generate a control signal;
the operation device performs an order adjustment operation according to the order adjustment table, the third information table and the control signal to generate the first information table, and writes the generated first information table to the electronic tag via the reader in the configuration phase;
the operation device performs an authentication operation to authenticate the electronic tag in the authentication phase;
the authentication operation reads the second information table of the electronic tag via the reader;
the authentication operation decrypts the encryption key to determine whether the sub-information represents one of the predetermined value and the specific system constant in order that the operation device authenticates the electronic tag for a confirmation that the electronic tag is an anti-counterfeiting tag and compatible with the system;
when the sub-information represents one of the predetermined value and the specific system constant, the operation device confirms that the authentication operation passes;
the operation device reads the first information table of the electronic tag via the reader after the electronic tag passes the authentication operation;
the operation device transforms the first information table into a fourth information table according to the specific identifier, the first password mask and the first information table by performing a reverse order adjustment operation, wherein the fourth information table includes a third plurality of information elements having an information content the same as that of the second plurality of information elements, and the third plurality of information elements are arranged according to a third order the same as the second order; and
the operation device performs the reverse order adjustment operation according to the order adjustment table, the first information table and the control signal to generate the fourth information table.

5. The system according to claim 3, wherein:
the item code indicates the specific application function for the electronic tag to be applied to;
the specific application function includes at least one selected from a group consisting of the finance function, the credit function, the counter service function, the cash paying function, a short-message sending function, an email sending function, a monetary base selecting function for a cash card balance, the access control function, the item level tracking function, a specific UHF access distance operation function, a specific HF access distance operation function and a combination thereof;
the specific UHF access distance operation function is one selected from a group consisting of a passive UHF long access distance operation function, a passive UHF short access distance operation function, a passive UHF short access distance operation function with a relatively high memory capacity, an HF short access distance operation function, a semi-passive UHF long access distance operation function, a semi-passive UHF far access distance operation function for positioning while the electronic tag moves, a semi-passive UHF far access distance operation function with a relatively high memory capacity, a passive UHF long access distance operation function for positioning, a passive UHF long access distance operation function with a relatively high memory capacity, a passive UHF near access distance operation function, a passive UHF near access distance operation function with a relatively high memory capacity;

the specific HF access distance operation function is one selected from a group consisting of an HF short access distance operation function, an HF short access distance operation function with a relatively high memory capacity, a passive HF short access distance operation function for an access control and positioning, and a passive HF short access distance operation function with a relatively high memory capacity; and the operation device determines the encryption key according to the sub-information and at least one of the tag serial number and the user serial number by using a specific operation, wherein the specific operation is one selected from a group consisting of:

a first operation that sets the encryption key to be equal to a first sum of the tag serial number, the user serial number and the sub-information;

a second operation that sets the encryption key to be equal to a second sum of the tag serial number and the sub-information;

a third operation that sets the encryption key to be equal to a result obtained from an arithmetic operation applied to the sub-information and at least one of the tag serial number and the user serial number; and a fourth operation that extracts a specific number of bits from one selected from a group consisting of the first sum, the second sum and the result to generate a binary value and sets the encryption key to be equal to the binary value.

6. The system according to claim 3, wherein:

the operation device determines the item kill password and the item access password according to the tag serial number, the second password mask and the hash table;

the tag serial number has a binary value having M bits, wherein M>1;

the item kill password and the item access password are determined in one of a first state and a second state, wherein:

when the item kill password and the item access password are determined in the first state:

the operation device selects a specific bit from the binary value according to the second password mask to generate a first value;

the operation device encodes the first value to generate a first control signal;

when the first control signal carries an odd number, the operation device performs a first encryption operation according to the hash table and the odd number to generate a first kill password value and a first access password value, and sets the item kill password and the item access password to be respectively equal to the first kill password value and the first access password value; and when the first control signal carries an even number, the operation device performs a second encryption operation according to the hash table and the even number to generate a second kill password value and a second access password value, and sets the item kill password and the item access password to be respectively equal to the second kill password value and the second access password value; and when the item kill password and the item access password are determined in the second state:

the operation device selects N bits from the M bits according to the second password mask to generate a second value, wherein N>1;

the operation device encodes the second value to generate a second control signal;

the operation device performs a third encryption operation according to the hash table and the second control signal to generate a third kill password value and a third access password value; and the operation device sets the item kill password and the item access password to be respectively equal to the third kill password value and the third access password value;

the second authentication information includes a cash card balance included in the application code information;

the specific application function is the cash paying function, and is provided for using the cash card balance;

the operation device uses a default target indicator to preset the communication target indicator before the configuration phase;

the operation device receives a first user input to determine the communication target indicator in the configuration phase;

the operation device receives a second user input to change the communication target indicator after the electronic tag is authenticated to be genuine and compatible with the system;

the operation device performs the specific application function via the reader according to the item code after the authentication phase; and the operation device updates the cash card balance of the electronic tag via the reader by performing the specific application function to result in a cash card balance update, and generates the transaction message according to the cash card balance update so as to send the transaction message to the specific external device.

7. The system according to claim 3, wherein:

the start control table includes a plurality of bits respectively used to control a plurality of start signals, and is included in the application code information;

the specific application function is the access control operation, and is provided for using the start control table;

the plurality of bits include a specific bit used to control a specific one of the plurality of start signals, wherein the specific start signal controls the actuating mechanism to determine whether the object is allowed to pass through a specific access control area handled by the actuating mechanism;

the specific bit represents one of an enabling state and a disabling state;

when the specific bit represents the enabling state, the actuating mechanism allows the object to pass through the specific access control area;

when the specific bit represents the disabling state, the actuating mechanism disallows the object to pass through the specific access control area; and the operation device detects the specific bit via the reader to obtain a specific bit value, and generates the transaction message according to the specific bit value so as to send the transaction message to the specific external device.

8. The system according to claim 3, wherein:

the tag memory further stores a measurable parameter information included in the application code information, and including at least one selected from a group consisting of a used time, a distance, a location, a weight, a traffic flow, a cash card balance, a public transport station number, and an airline landing location number;

the specific application function is the transport charge function, and is provided for using the measurable parameter information; and the operation device converts the measurable parameter information into a charge amount by performing the specific application function to make a transaction, and generates the transaction message according to the transaction so as to send the transaction message to the specific external device, wherein the system has a system information, and the transaction message is generated further according to the system maintenance information and the system information.

9. An electronic tag to be authenticated by a system in an authentication phase, the electronic tag comprising:

a tag memory storing an encryption key and including a first memory block storing a first information table including a first plurality of information elements, wherein:

the first memory block has a specific storage capacity quantified with a predetermined capacity value;

the first information table is read according to the predetermined capacity value by the system after the authentication phase; and the encryption key is derived from the predetermined capacity value, and decrypted by the system in the authentication phase for authentication of the electronic tag.

10. The electronic tag according to claim 9, wherein:

the electronic tag is a radio frequency identification (RFID) tag;

the tag memory stores a tag identifier and an item information table;

the tag identifier includes a tag serial number and a manufacturer identifier;

the item information table includes the first information table, a second information table, an item kill password, an item access password and a specific portion;

the tag memory further includes a second memory block storing the second information table, wherein the second memory block has a first storage capacity quantified with a first capacity value, and the second information table includes a first authentication information, the encryption key and a first other information;

the first authentication information includes an item code, a user serial number and an item expiration date;

the encryption key includes a sub-information;

the first other information includes an item serial number and a protocol control information;

the first plurality of information elements have a first total information element number, wherein the predetermined capacity value is associated with the first total information element number;

the first plurality of information elements include a second authentication information, a communication target indicator and a second other information, and are arranged according to a first order;

the second other information includes a start control table;

the specific portion of the item information table records an application code information;

the sub-information represents the predetermined value;

the communication target indicator includes at least one of a phone number and an email address, and is used to link to a specific device by the system being an electronic tag item processing system;

the electronic tag is applied to a specific application function, wherein the electronic tag item processing system uses the application code information for the specific application function, and controls an actuating mechanism near to an object by using the electronic tag;

the item code is associated with the specific application function; and the electronic tag item processing system generates a transaction message for the specific application function according to the application code information after the authentication phase, and sends the transaction message to the specific device according to the communication target indicator.

11. The electronic tag according to claim 10, wherein:

the first information table is determined according to the tag serial number, a first password mask and a third information table, wherein the third information table includes a second plurality of information elements with a second total information element number equal to the first total information element number, the first plurality of information elements have an information content the same as that of the second plurality of information elements, and the second plurality of information elements are arranged according to a second order different from the first order;

the encryption key is determined according to the sub-information and at least one of the tag serial number and the user serial number;

the item kill password and the item access password are determined according to the tag serial number, a second password mask and a hash table; and the first information table is transformed into a fourth information table according to the tag serial number, the first password mask and the first information table after the authentication phase, wherein the fourth information table includes a third plurality of information elements respectively the same as the second plurality of information elements, and the third plurality of information elements are arranged according to a third order the same as the second order.

12. The electronic tag according to claim 10, wherein:

the start control table includes a plurality of bits respectively used to control a plurality of start signals, and is included in the application code information;

the specific application function is an access control function and is associated with the start control table;

the electronic tag item processing system performs the specific application function according to the item code after the authentication phase;

the plurality of bits include a specific bit used to control a specific one of the plurality of start signals, wherein the specific start signal controls the actuating mechanism to determine whether the object is allowed to pass through a specific access control area handled by the actuating mechanism;

the specific bit represents one of an enabling state and a disabling state;

when the specific bit represents the enabling state, the actuating mechanism allows the object to pass through the specific access control area;

when the specific bit represents the disabling state, the actuating mechanism disallows the object to pass through the specific access control area;

the specific bit is detected to obtain a specific bit value;

the electronic tag item processing system generates the transaction message according to the specific bit value so as to send the transaction message to the specific device; and the encryption key is decrypted to determine whether the sub-information represents the predetermined value in order that the electronic tag item processing system authenticates the electronic tag for a confirmation that the electronic tag is an anti-counterfeiting tag and compatible with the electronic tag item processing system.

13. A method for securing an electronic tag, wherein the electronic tag to be authenticated in an authentication phase stores an encryption key and includes a first memory block storing a first information table including a first plurality of information elements, the first memory block has a specific storage capacity quantified with a predetermined capacity value, and the encryption key is derived from the predetermined capacity value, the method comprising steps of:
 authenticating the electronic tag by decrypting the encryption key in the authentication phase; and
 reading the first information table according to the predetermined capacity value after the authentication phase.

14. The method according to claim 13, wherein:
the electronic tag is a radio frequency identification (RFID) tag, and includes a tag memory;
the tag memory includes the first memory block, and stores an application code information, a tag identifier and an item information table;
the tag identifier includes a tag serial number and a manufacturer identifier;
the item information table includes the first information table, a second information table, a third information table, an item kill password, an item access password and a specific portion;
the tag memory further includes a second memory block storing the second information table, wherein the second memory block has a first storage capacity quantified with a first capacity value, and the second information table includes a first authentication information, the encryption key and a first other information;
the first authentication information includes an item code, a user serial number and an item expiration date;
the encryption key includes a sub-information;
the first other information includes an item serial number and a protocol control information;
the first plurality of information elements have a first total information element number, wherein the predetermined capacity value is associated with the first total information element number;
the first plurality of information elements include a second authentication information, a communication target indicator and a second other information, and are arranged according to a first order;
the communication target indicator includes at least one of a phone number and an email address, and is used to link to a specific external device by an electronic tag item processing system, wherein the specific external device is a mobile device;
the second other information includes a start control table;
the specific portion of the item information table records an application code information, and includes at least one selected from a group consisting of the second authentication information, the second other information and the third information table;

the method further comprises steps of:
 providing a system maintenance information including a computer type, an authentication type, a fourth information table, a specific system constant, the predetermined capacity value, the first capacity value, the first password mask, a second password mask, a hash table and an order adjustment table;
 in a configuration phase, determining the item information table, and writing the item information table into the electronic tag;
 providing a specific application function for using the application code information;
 applying the electronic tag to the specific application function; and
 authenticating the electronic tag in the authentication phase after the configuration phase;
the sub-information represents one of the predetermined value and the specific system constant;
the specific application function includes at least one selected from a group consisting of a finance function, an access control function, a cash paying function, a credit function, a counter service function, a transport charge function, a communication function, a logistics function, a production management function, a work attendance management function, an authentication function, a goods sale management function, a parking charge function, a supply chain function, an item level tracking function, an assets management function, and a combination thereof; and
the method further comprises steps of:
 generating a transaction message for the specific application function according to the application code information after the authentication phase;
 sending the transaction message to the specific external device according to the communication target indicator; and
 controlling an actuating mechanism near an object using the electronic tag; and
 the transaction message includes a transaction processing abstract, and is represented in a form including at least one of a short message and an image.

15. The method according to claim 14, wherein:
the second authentication information further includes a cash card balance included in the application code information;
the specific application function is the cash paying function, and is provided for using the cash card balance;
the step of determining the item information table in the configuration phase comprises a sub-step of determining the communication target indicator by receiving a first user input; and
the method further comprises steps of:
 presetting the communication target indicator by using a default target indicator before the configuration phase;
 changing the communication target indicator by receiving a second user input after the electronic tag is authenticated to be genuine and compatible with the electronic tag item processing system;
 performing the specific application function according to the item code after the authentication phase by the electronic tag item processing system;
 updating the cash card balance by performing the specific application function to result in a cash card balance update; and
 generating the transaction message according to the cash card balance update so as to send the transaction message to the specific external device.

16. The method according to claim 14, wherein:
the start control table includes a plurality of bits respectively used to control a plurality of start signals, and is included in the application code information;
the specific application function is the access control function, and is provided for using the start control table;
the plurality of bits includes a specific bit used to control a specific start signal in the plurality of start signals, wherein the specific start signal controls the actuating mechanism to determine whether the object is allowed to pass through a specific access control area handled by the actuating mechanism;
the specific bit represents one of an enabling state and a disabling state; and
the method further comprises steps of:
when the specific bit represents the enabling state, causing the actuating mechanism to allow the object to pass through the specific access control area;
when the specific bit represents the disabling state, causing the actuating mechanism to disallow the object to pass through the specific access control area;
detecting the specific bit to obtain a specific bit value; and
generating the transaction message according to the specific bit value so as to send the transaction message to the specific external device.

17. The method according to claim 14, wherein:
the tag memory further stores a measurable parameter information included in the application code information, wherein the measurable parameter information includes at least one selected from a group consisting of a used time, a distance, a location, a weight, a traffic flow, a cash card balance, a public transport station number, and an airline landing location number;
the specific application function is the transport charge function, and is provided for using the measurable parameter information; and
the method further comprises steps of:
converting the measurable parameter information into a charge amount by performing the specific application function to make a transaction; and
generating the transaction message according to the transaction so as to send the transaction message to the specific external device, wherein the system has a system information, and the transaction message is generated further according to the system parameter information and the system information.

18. The method according to claim 14, wherein:
the fourth information table is an original information table, and includes a second plurality of information elements with a second total information element number equal to the first total information element number, wherein the first plurality of information elements have an information content the same as that of the second plurality of information elements, and the second plurality of information elements are arranged according to a second order different from the first order;
the step of determining the item information table comprises a sub-step of determining the first information table according to the tag serial number, the first password mask and the fourth information table;
the specific identifier has a binary value having M bits, wherein M>1;
the sub-step of determining the first information table comprises sub-steps of:
selecting N bits from the M bits according to the first password mask to generate a first value, wherein N>1;
encoding the first value to generate a control signal; and
adjusting the first order by performing an order adjustment operation according to the order adjustment table, the fourth information table and the control signal to generate the first information table;
the step of authenticating the electronic tag is performed by performing an authentication operation, and comprises sub-steps of:
reading the second information table of the electronic tag; and
decrypting the encryption key to determine whether the sub-information represents one of the predetermined value and the specific system constant; and
the method further comprises steps of:
when the authentication operation determines one of the predetermined value and the specific system constant that the sub-information represents, confirming that the electronic tag passes the authentication operation;
reading the first information table of the electronic tag after the electronic tag passes the authentication operation; and
transforming the first information table into a fifth information table according to the specific identifier, the first password mask and the first information table by performing a reverse order adjustment operation, wherein the fifth information table includes a third plurality of information elements having an information content the same as that of the second plurality of information elements, and the third plurality of information elements are arranged according to a third order the same as the second order; and
the step of transforming the first information table into the fifth information table comprising a sub-step of performing the reverse order adjustment operation according to the order adjustment table, the first information table and the control signal to generate the fifth information table.

19. The method according to claim 14, wherein:
the item code indicates the specific application function for the electronic tag to be applied to;
the specific application function includes at least one selected from a group consisting of the finance function, the credit function, the counter service function, the cash paying function, a short-message sending function, an email sending function, a monetary base selecting function for a cash card balance, the access control function, the item level tracking function, a specific UHF access distance operation function, a specific HF access distance operation function and a combination thereof;
the specific UHF access distance operation function is one selected from a group consisting of a passive UHF long access distance operation function, a passive UHF short access distance operation function, a passive UHF short access distance operation function with a relatively high memory capacity, an HF short access distance operation function, a semi-passive UHF long access distance operation function, a semi-passive UHF far access distance operation function for positioning while the electronic tag moves, a semi-passive UHF far access distance operation function with a relatively high memory capacity, a passive UHF long access distance operation function for positioning, a passive UHF long access distance operation function with a relatively high memory capacity, a passive UHF near access distance operation function, a passive UHF near access distance operation function with a relatively high memory capacity;

the specific HF access distance operation function is one selected from a group consisting of an HF short access distance operation function, an HF short access distance operation function with a relatively high memory capacity, a passive HF short access distance operation function for an access control and positioning, and a passive HF short access distance operation function with a relatively high memory capacity; and the step of determining the item information table comprises a sub-step of determining the encryption key according to the sub-information and at least one of the tag serial number and the user serial number by using a specific operation, wherein the specific operation is one selected from a group consisting of:
 a first operation that sets the encryption key to be equal to a first sum of the tag serial number, the user serial number and the sub-information;
 a second operation that sets the encryption key to be equal to a second sum of the tag serial number and the sub-information;
 a third operation that sets the encryption key to be equal to a result obtained from an arithmetic operation applied to the sub-information and at least one of the tag serial number and the user serial number; and
 a fourth operation that extracts a specific number of bits from one selected from a group consisting of the first sum, the second sum and the result to generate a binary value and sets the encryption key to be equal to the binary value.

20. The method according to claim 14, wherein the step of determining the item information table comprises a sub-step of determining the item kill password and the item access password according to the tag serial number, the second password mask and the hash table, wherein:
 the tag serial number has a binary value having M bits, wherein M>1; and
 the sub-step of determining the item kill password and the item access password is performed in one of a first state and a second state, wherein:
  when the sub-step of determining the item kill password and the item access password is performed in the first state, the sub-step of determining the item kill password and the item access password comprises sub-steps of:
   selecting a specific bit from the binary value according to the second password mask to generate a first value;
   encoding the first value to generate a first control signal;
   when the first control signal carries an odd number, performing a first encryption operation according to the hash table and the odd number to generate a first kill password value and a first access password value, and setting the item kill password and the item access password to be respectively equal to the first kill password value and the first access password value; and
   when the first control signal carries an even number, performing a second encryption operation according to the hash table and the even number to generate a second kill password value and a second access password value, and setting the item kill password and the item access password to be respectively equal to the second kill password value and the second access password value; and
  when the sub-step of determining the item kill password and the item access password is performed in the second state, the sub-step of determining the item kill password and the item access password comprises sub-steps of:
   selecting N bits from the M bits according to the second password mask to generate a second value, wherein N>1;
   encoding the second value to generate a second control signal;
   performing a third encryption operation according to the hash table and the second control signal to generate a third kill password value and a third access password value; and
   setting the item kill password and the item access password to be respectively equal to the third kill password value and the third access password value.

* * * * *